US012710437B2

(12) United States Patent
Hayama et al.

(10) Patent No.: US 12,710,437 B2
(45) Date of Patent: Aug. 18, 2026

(54) SPECIMEN TESTING SYSTEM, RACK TRANSPORTATION SYSTEM, RACK TRANSPORTATION CONTROL DEVICE, AND RACK TRANSPORTATION METHOD

(71) Applicant: Sysmex Corporation, Kobe (JP)

(72) Inventors: Hidetaka Hayama, Kobe (JP); Yuichiro Ohmae, Kobe (JP); Toshiki Sato, Kobe (JP); Hiroyuki Tsuji, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 688 days.

(21) Appl. No.: 18/151,285

(22) Filed: Jan. 6, 2023

(65) Prior Publication Data

US 2023/0228780 A1 Jul. 20, 2023

(30) Foreign Application Priority Data

Jan. 14, 2022 (JP) ................................ 2022-004693
Jan. 14, 2022 (JP) ................................ 2022-004694
Jan. 14, 2022 (JP) ................................ 2022-004695

(51) Int. Cl.
*G01N 35/04* (2006.01)
*G01N 1/28* (2006.01)
(Continued)

(52) U.S. Cl.
CPC ........... *G01N 35/04* (2013.01); *G01N 1/2813* (2013.01); *G01N 35/0092* (2013.01);
(Continued)

(58) Field of Classification Search
CPC .. G01N 35/04; G01N 1/2813; G01N 35/0092; G01N 35/026; G01N 35/10;
(Continued)

(56) References Cited

U.S. PATENT DOCUMENTS

2012/0301358 A1 11/2012 Haechler
2013/0197690 A1* 8/2013 Suzuki ............... G01N 35/0092 700/216

(Continued)

FOREIGN PATENT DOCUMENTS

CN 215401296 U 1/2022
JP H10-132828 A 5/1998

(Continued)

OTHER PUBLICATIONS

Japanese Office Action ("JPOA") issued on Feb. 7, 2023 in a counterpart Japanese patent application No. 2022-004694.

(Continued)

*Primary Examiner* — John McGuirk
(74) *Attorney, Agent, or Firm* — Crowell & Moring LLP

(57) ABSTRACT

Disclosed is a specimen testing system that includes: a specimen rearrangement unit configured to transfer a specimen container held in a first rack to a second rack; a specimen processing unit configured to process a specimen in the specimen container held in the second rack; a specimen storage unit configured to transfer the specimen container having been processed by the specimen processing unit from the second rack to a specimen container storage instrument for storage; a transportation unit configured to transport the second rack among the specimen rearrangement unit, the specimen processing unit, and the specimen storage unit; and a transportation control unit programmed to control the transportation unit. The transportation control unit is programmed to control bidirectional transportation of the second rack between the specimen rearrangement unit and the specimen storage unit.

8 Claims, 34 Drawing Sheets

(51) Int. Cl.
*G01N 35/00* (2006.01)
*G01N 35/02* (2006.01)
*G01N 35/10* (2006.01)

(52) U.S. Cl.
CPC .......... *G01N 35/026* (2013.01); *G01N 35/10* (2013.01); *G01N 2035/00752* (2013.01); *G01N 2035/041* (2013.01); *G01N 2035/0412* (2013.01); *G01N 2035/0424* (2013.01); *G01N 2035/0465* (2013.01); *G01N 2035/1051* (2013.01)

(58) Field of Classification Search
CPC ... G01N 2035/00752; G01N 2035/041; G01N 2035/0412; G01N 2035/0465; G01N 2035/1051; G01N 2035/0413
See application file for complete search history.

(56) References Cited

U.S. PATENT DOCUMENTS

| | | | | |
|---|---|---|---|---|
| 2014/0037517 | A1* | 2/2014 | Takai .................... | B65G 65/00 209/552 |
| 2014/0212248 | A1 | 7/2014 | Takai et al. | |
| 2019/0329983 | A1 | 10/2019 | Itoh | |
| 2020/0256883 | A1 | 8/2020 | Sugiyama et al. | |

FOREIGN PATENT DOCUMENTS

| | | | |
|---|---|---|---|
| JP | 2000-088860 | A | 3/2000 |
| JP | 2002-357612 | A | 12/2002 |
| JP | 2003-066050 | A | 3/2003 |
| JP | 3470048 | B2 | 11/2003 |
| JP | 2004-061169 | A | 2/2004 |
| JP | 2004-077395 | A | 3/2004 |
| JP | 2006-038881 | A | 2/2006 |
| JP | 2008-076185 | A | 4/2008 |
| JP | 2009186201 | A * | 8/2009 |
| JP | 4733315 | B2 | 7/2011 |
| JP | 2012-093313 | A | 5/2012 |
| JP | 2013-140141 | A | 7/2013 |
| JP | 2014-029275 | A | 2/2014 |
| JP | 2014-062760 | A | 4/2014 |
| JP | 2014-149162 | A | 8/2014 |
| JP | 2014-167458 | A | 9/2014 |
| JP | 2015-068727 | A | 4/2015 |
| JP | WO2013/099538 | A1 | 4/2015 |
| JP | 2015-087306 | A | 5/2015 |
| JP | 5715378 | B2 | 5/2015 |
| JP | 2017-515100 | A | 6/2017 |
| JP | 6166001 | B2 | 7/2017 |
| JP | 6189697 | B2 | 8/2017 |
| JP | 6266614 | B2 | 1/2018 |
| JP | WO2016/174949 | A1 | 3/2018 |
| JP | 2019-520586 | A | 7/2019 |
| JP | 6580130 | B2 | 9/2019 |
| JP | 2019-174397 | A | 10/2019 |
| JP | 2020-128913 | A | 8/2020 |
| JP | 6764343 | B2 | 9/2020 |
| JP | WO2019/138700 | A1 | 1/2021 |
| JP | 6827099 | B2 | 2/2021 |
| WO | 2011/040203 | A1 | 4/2011 |
| WO | 2012/043261 | A1 | 4/2012 |
| WO | 2014/042011 | A1 | 3/2014 |
| WO | 2014/196342 | A1 | 12/2014 |
| WO | 2015/149055 | A2 | 10/2015 |
| WO | 2016/174949 | A1 | 11/2016 |
| WO | 2018/013345 | A1 | 1/2018 |

OTHER PUBLICATIONS

Japanese Office Action ("JPOA") issued on Feb. 7, 2023 in a counterpart Japanese patent application No. 2022-004695.
Extended European search report ("EESR") issued on Jun. 15, 2023 in a related European patent application No. 23150652.8.
Extended European search report ("EESR") issued on Jun. 9, 2023 in a counterpart European patent application No. 23150663.5.
Japanese Office Action ("JPOA") issued on Jul. 18, 2023 in a counterpart Japanese patent application No. 2022-004695.
Office Action issued in U.S. Appl. No. 18/151,274, dated Nov. 19, 2025 (41 pages).

* cited by examiner

FIG. 3

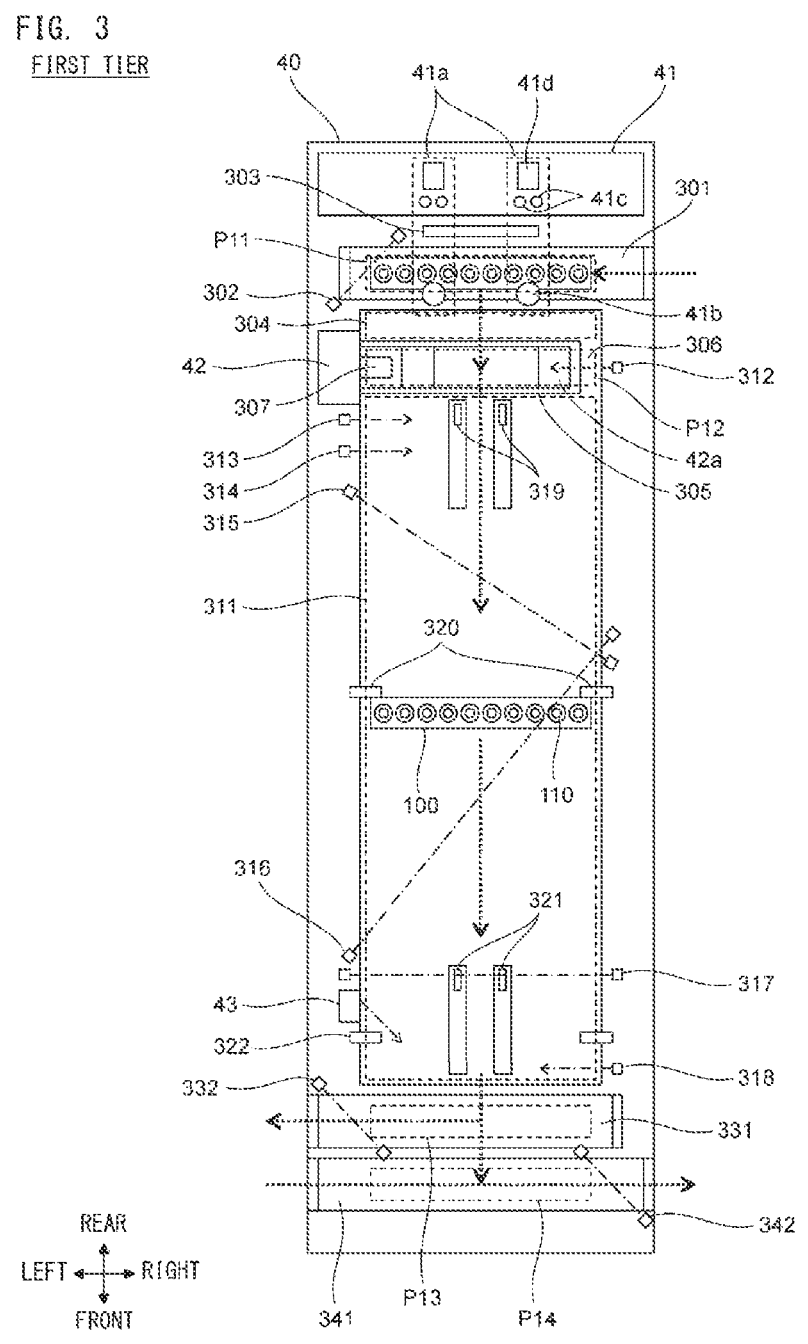

FIRST TIER 40
41a
41d
41
303
41c
301
P11
302
41b
304
306
42
312
307
P12
313
42a
314
319
305
315
311
320
100
110
316
321
317
43
322
318
332
331
342
REAR
LEFT
RIGHT
FRONT
341
P13
P14

SECOND TIER
40
120
121
110
44
352
42
351
P15
363
42a
364
369
45
361
101
100
367
362
365
366
368
REAR
LEFT
RIGHT
FRONT

FIG. 6

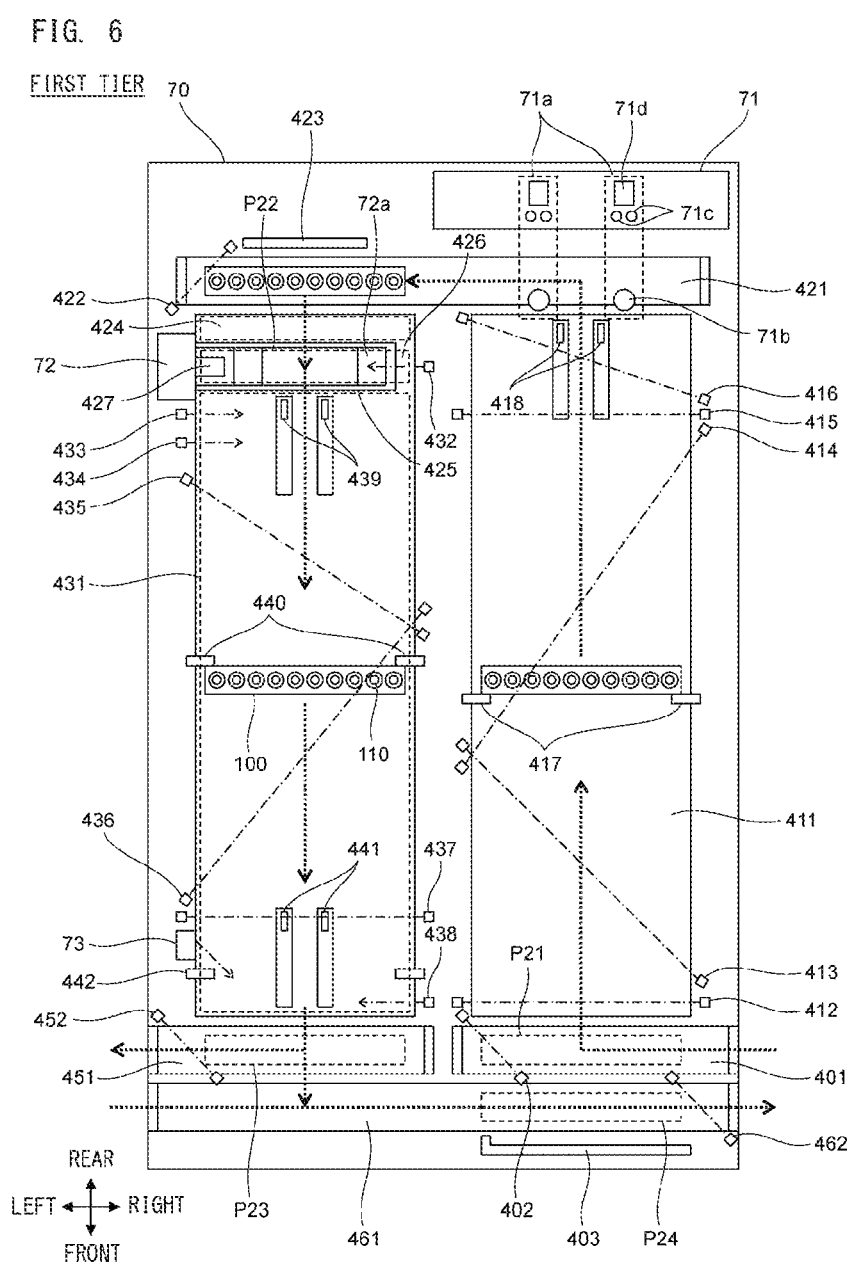

FIRST TIER 70 423 71a 71d 71 P22 72a 426 71c 421 422 424 71b 72 416 427 418 415 433 432 414 434 439 425 435 431 440 100 110 417 411 436 441 437 73 438 P21 442 413 452 412 451 401 462 REAR LEFT RIGHT FRONT P23 461 402 403 P24

FIG. 11

40
45
120
121
110
610
P15
100
110
620
630
640
REAR
LEFT
RIGHT
FRONT

Figure 15:
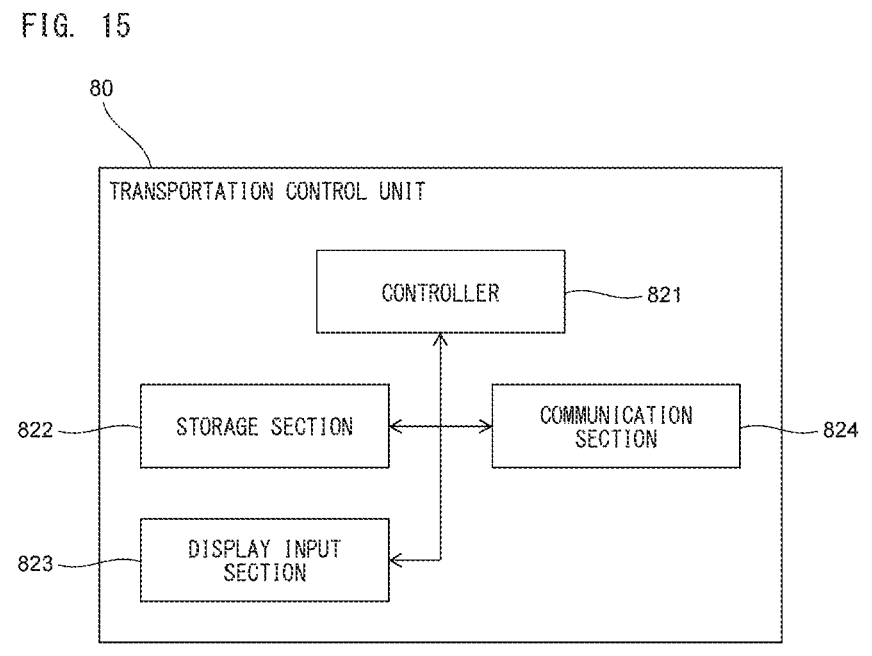

80
TRANSPORTATION CONTROL UNIT
CONTROLLER
821
822
STORAGE SECTION
COMMUNICATION SECTION
824
823
DISPLAY INPUT SECTION 900
901
902
903
904
STORE
TRANSPORTATION UNIT
TRANSPORTATION UNIT
SPECIMEN REARRANGEMENT UNIT
TRANSPORTATION UNIT
COLLECTION UNIT
FEEDING UNIT
SPECIMEN REARRANGEMENT UNIT
SPECIMEN STORAGE UNIT
SUPPLY UNIT

TRANSFER FROM RACK
TRANSFER TO RACK
M11
M12
M13
M14
M15
M16
M17
M18
M21
M22
M23
M24
M25
M26
P12
P13
P14
P15
100
110
120
301
311
42
361,362

PATH FOR MOVING RACK AFTER REARRANGEMENT
PATH FOR MOVING EMPTY RACK
11
20
31
32
12
40
51
52
61
62
70
13
REAR
RIGHT
LEFT
FRONT

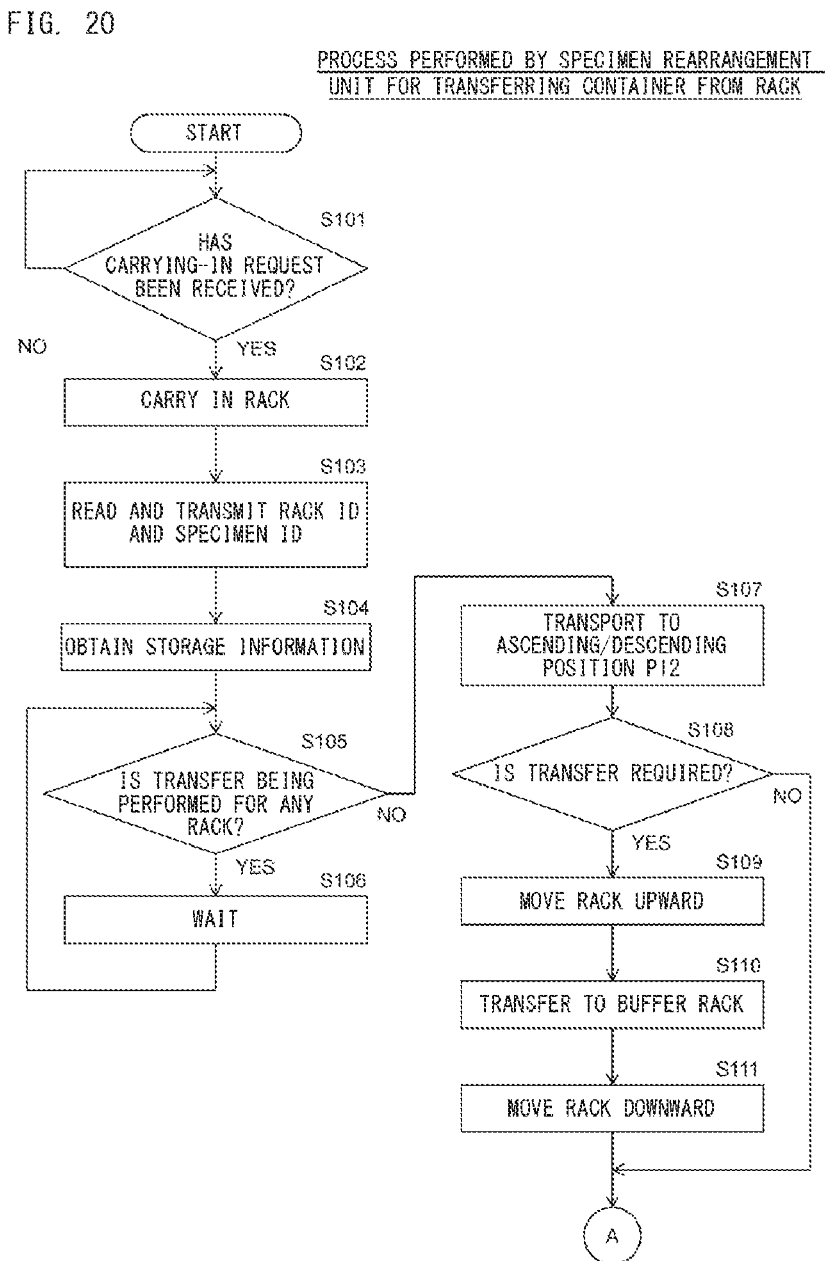
FIG. 20
PROCESS PERFORMED BY SPECIMEN REARRANGEMENT UNIT FOR TRANSFERRING CONTAINER FROM RACK
START
S101
HAS CARRYING-IN REQUEST BEEN RECEIVED?
NO
YES
S102
CARRY IN RACK
S103
READ AND TRANSMIT RACK ID AND SPECIMEN ID
S104
OBTAIN STORAGE INFORMATION
S105
IS TRANSFER BEING PERFORMED FOR ANY RACK?
NO
YES
S106
WAIT
S107
TRANSPORT TO ASCENDING/DESCENDING POSITION P12
S108
IS TRANSFER REQUIRED?
NO
YES
S109
MOVE RACK UPWARD
S110
TRANSFER TO BUFFER RACK
S111
MOVE RACK DOWNWARD
A

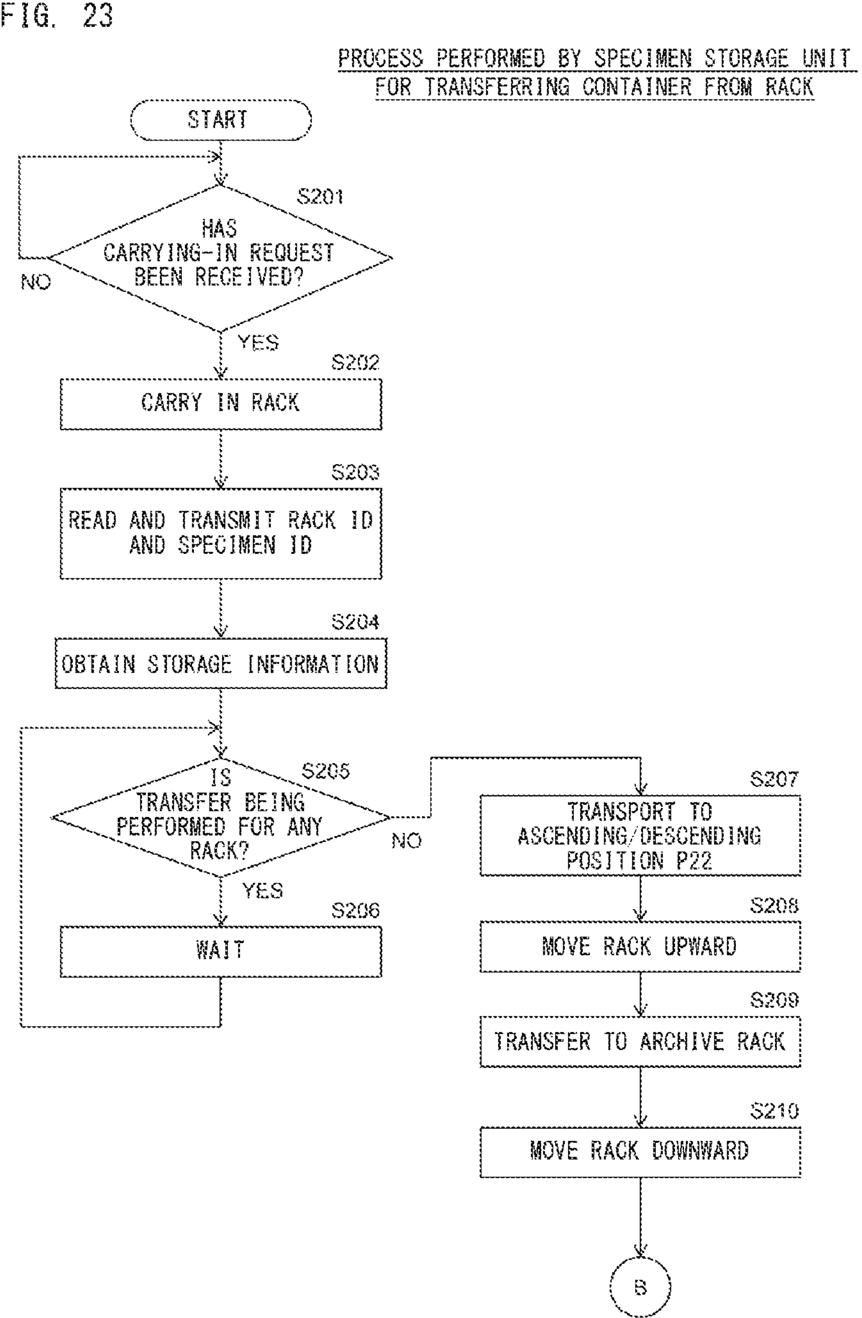
FIG. 23
PROCESS PERFORMED BY SPECIMEN STORAGE UNIT FOR TRANSFERRING CONTAINER FROM RACK
START
S201
HAS CARRYING-IN REQUEST BEEN RECEIVED?
NO
YES
S202
CARRY IN RACK
S203
READ AND TRANSMIT RACK ID AND SPECIMEN ID
S204
OBTAIN STORAGE INFORMATION
S205
IS TRANSFER BEING PERFORMED FOR ANY RACK?
NO
YES
S206
WAIT
S207
TRANSPORT TO ASCENDING/DESCENDING POSITION P22
S208
MOVE RACK UPWARD
S209
TRANSFER TO ARCHIVE RACK
S210
MOVE RACK DOWNWARD
B

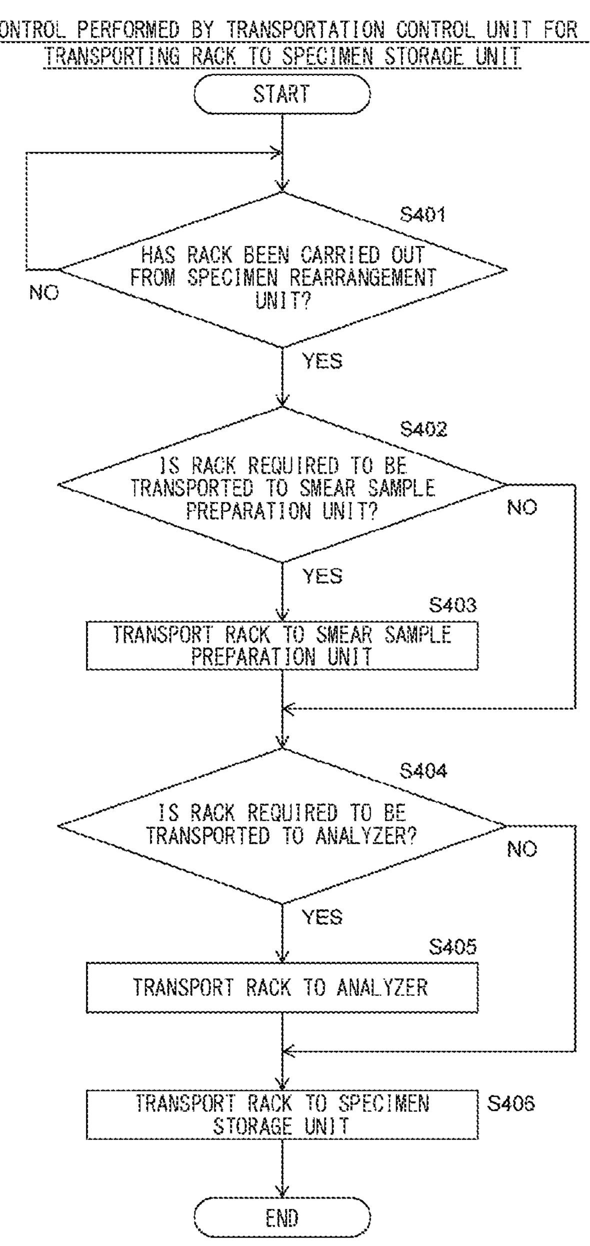
FIG. 27
CONTROL PERFORMED BY TRANSPORTATION CONTROL UNIT FOR TRANSPORTING RACK TO SPECIMEN STORAGE UNIT
START
S401
HAS RACK BEEN CARRIED OUT FROM SPECIMEN REARRANGEMENT UNIT?
NO
YES
S402
IS RACK REQUIRED TO BE TRANSPORTED TO SMEAR SAMPLE PREPARATION UNIT?
NO
YES
S403
TRANSPORT RACK TO SMEAR SAMPLE PREPARATION UNIT
S404
IS RACK REQUIRED TO BE TRANSPORTED TO ANALYZER?
NO
YES
S405
TRANSPORT RACK TO ANALYZER
TRANSPORT RACK TO SPECIMEN STORAGE UNIT
S406
END (MEASUREMENT UNIT 32)
TRANSPORTATION UNIT 31
TRANSPORTATION UNIT 12
SPECIMEN REARRANGEMENT UNIT 40
(SMEAR SAMPLE PREPARATION UNIT 52)
TRANSPORTATION UNIT 51
(ANALYZER 62)
TRANSPORTATION UNIT 61
SPECIMEN STORAGE UNIT 70
COLLECTION UNIT 13
MEASUREMENT
REARRANGEMENT
RESERVE
STORAGE COLLECTION UNIT 13
SPECIMEN STORAGE UNIT 70
(ANALYZER 62) TRANSPORTATION UNIT 61
(SMEAR SAMPLE PREPARATION UNIT 52) TRANSPORTATION UNIT 51
SPECIMEN REARRANGEMENT UNIT 40
TRANSPORTATION UNIT 12
(MEASUREMENT UNIT 32) TRANSPORTATION UNIT 31
MEASUREMENT
REARRANGEMENT
PREPARATION
STORAGE
RESERVE
RESERVE MODIFICATION
1
2
80
1b (11,12,13,20,31,51,61,80)
70
13
11
20
33
32
31
30
32
31
12
40
1a
52
51
62
61
REAR
RIGHT
LEFT
FRONT (ANALYZER 62) TRANSPORTATION UNIT 61
(SMEAR SAMPLE PREPARATION UNIT 52) TRANSPORTATION UNIT 51
SPECIMEN REARRANGEMENT UNIT 40
TRANSPORTATION UNIT 12
(MEASUREMENT UNIT 32) TRANSPORTATION UNIT 31
SUPPLY UNIT 20 FEEDING UNIT 11
COLLECTION UNIT 13
SPECIMEN STORAGE UNIT 70
MEASUREMENT
REARRANGEMENT
STORAGE
RESERVE (ANALYZER 62)
TRANSPORTATION UNIT 61
(SMEAR SAMPLE PREPARATION UNIT 52)
TRANSPORTATION UNIT 51
SPECIMEN REARRANGEMENT UNIT 40
TRANSPORTATION UNIT 12
(MEASUREMENT UNIT 32)
TRANSPORTATION UNIT 31
SUPPLY UNIT 20
FEEDING UNIT 11
COLLECTION UNIT 13
SPECIMEN STORAGE UNIT 70
MEASUREMENT
REARRANGEMENT
ANALYSIS
STORAGE
RESERVE
RESERVE

SPECIMEN TESTING SYSTEM, RACK TRANSPORTATION SYSTEM, RACK TRANSPORTATION CONTROL DEVICE, AND RACK TRANSPORTATION METHOD

RELATED APPLICATIONS

This application claims priority to Japanese Patent Application No. 2022-004695, filed on Jan. 14, 2022, Japanese Patent Application No. 2022-004694, filed on Jan. 14, 2022, and Japanese Patent Application No. 2022-004693, filed on Jan. 14, 2022, the entire contents of which are incorporated herein by reference.

BACKGROUND OF THE INVENTION

1. Field of the Invention

The present invention relates to a specimen testing system, a rack transportation system, a rack transportation control device, and a rack transportation method.

2. Description of the Related Art

In a specimen testing system, a specimen rearrangement unit for transferring a specimen container held in a rack to another rack, and a specimen storage unit for storing specimen containers having been processed, can be disposed. For example, Japanese Laid-Open Patent Publication No. 2020-128913 discloses a specimen processing system that includes a transfer station for sorting and transferring specimen containers from a transfer source rack to a transfer destination rack, a testing station for performing a test for the specimen containers stored in the transfer destination rack, and a storage for storing the transfer destination rack that has therein the specimen containers for which the test has ended. In this specimen processing system, the transfer station, the testing station, and the storage are connected by a backbone transportation line. Furthermore, the specimen processing system includes a station for supplying empty racks to the transfer station, and the empty racks are transported to the transfer station through an under transportation path disposed just below the backbone transportation line.

In the specimen processing system disclosed in Japanese Laid-Open Patent Publication No. 2020-128913, an operator needs to refill, with empty racks, the station for supplying empty racks to the transfer station. Such an operation is bothersome for the operator.

SUMMARY OF THE INVENTION

The scope of the present invention is defined solely by the appended claims, and is not affected to any degree by the statements within this summary.

A specimen testing system (1) according to the present invention includes: a specimen rearrangement unit (40) configured to transfer a specimen container (110) held in a first rack (100) to a second rack (100); a specimen processing unit (52, 62) configured to process a specimen in the specimen container (110) held in the second rack (100); a specimen storage unit (70) configured to transfer the specimen container (110) having been processed by the specimen processing unit (52, 62) from the second rack (100) to a specimen container storage instrument (130) for storage; a transportation unit (11, 12, 13, 20, 31, 51, 61) configured to transport the second rack (100) among the specimen rearrangement unit (40), the specimen processing unit (52, 62), and the specimen storage unit (70); and a transportation control unit (80) programmed to control the transportation unit (11, 12, 13, 20, 31, 51, 61). The transportation control unit (80) is programmed to control bidirectional transportation of the second rack (100) between the specimen rearrangement unit (40) and the specimen storage unit (70).

A rack transportation system (1*b*) according to the present invention includes a transportation unit (11, 12, 13, 20, 31, 51, 61) configured to transport a second rack (100) among a specimen rearrangement unit (40) configured to transfer a specimen container (110) held in a first rack (100) to the second rack (100), a specimen processing unit (52, 62) configured to process a specimen in the specimen container (110) held in the second rack (100), and a specimen storage unit (70) configured to transfer the specimen container (110) having been processed by the specimen processing unit (52, 62) from the second rack (100) to a specimen container storage instrument (130) for storage; and a transportation control unit (80) programmed to control the transportation unit (11, 12, 13, 20, 31, 51, 61). The transportation control unit (80) is programmed to control bidirectional transportation of the second rack (100) between the specimen rearrangement unit (40) and the specimen storage unit (70).

A rack transportation control device (80) according to the present invention is a rack transportation control device (80) programmed to control transportation of a second rack (100) among a specimen rearrangement unit (40) configured to transfer a specimen container (110) held in a first rack (100) to the second rack (100), a specimen processing unit (52, 62) configured to process a specimen in the specimen container (110) held in the second rack (100), and a specimen storage unit (70) configured to transfer the specimen container (110) having been processed by the specimen processing unit (52, 62) from the second rack (100) to a specimen container storage instrument (130) for storage. The rack transportation control device (80) includes a transportation control unit configure to control the transportation unit (80), wherein the transportation control unit (80) controls bidirectional transportation of the second rack (100) between the specimen rearrangement unit (40) and the specimen storage unit (70).

A rack transportation method according to the present invention is a rack transportation method for transporting a second rack (100) among a specimen rearrangement unit (40) configured to transfer a specimen container (110) held in a first rack (100) to the second rack (100), a specimen processing unit (52, 62) configured to process a specimen in the specimen container (110) held in the second rack (100), and a specimen storage unit (70) configured to transfer the specimen container (110) having been processed by the specimen processing unit (52, 62) from the second rack (100) to a specimen container storage instrument (130) for storage. The rack transportation method includes: transporting the second rack (100) from the specimen rearrangement unit (40) to the specimen storage unit (70); and transporting the second rack (100) from the specimen storage unit (70) to the specimen rearrangement unit (40).

BRIEF DESCRIPTION OF THE DRAWINGS

FIG. 3 is a plan view schematically showing a configuration of a first tier of a specimen rearrangement unit according to the embodiment;

FIG. 6 is a plan view schematically showing a configuration of a first tier of a specimen storage unit according to the embodiment;

FIG. 11 is a plan view schematically showing a configuration of a container transfer mechanism of the specimen rearrangement unit according to the embodiment;

FIG. 13 is a block diagram illustrating a configuration of the specimen rearrangement unit according to the embodiment;

FIG. 15 is a block diagram illustrating a configuration of a transportation control unit according to the embodiment;

FIG. 20 is a flow chart showing a process performed by the specimen rearrangement unit for transferring a container from a rack to a buffer rack, according to the embodiment;

FIG. 23 is a flow chart showing a process performed by the specimen storage unit for transferring a container from a rack to an archive rack 130, according to the embodiment;

FIG. 27 is a flow chart showing control performed by the transportation control unit for transporting a rack from the specimen rearrangement unit to the specimen storage unit, according to the embodiment;

DETAILED DESCRIPTION OF THE PREFERRED EMBODIMENTS

Figure 1:
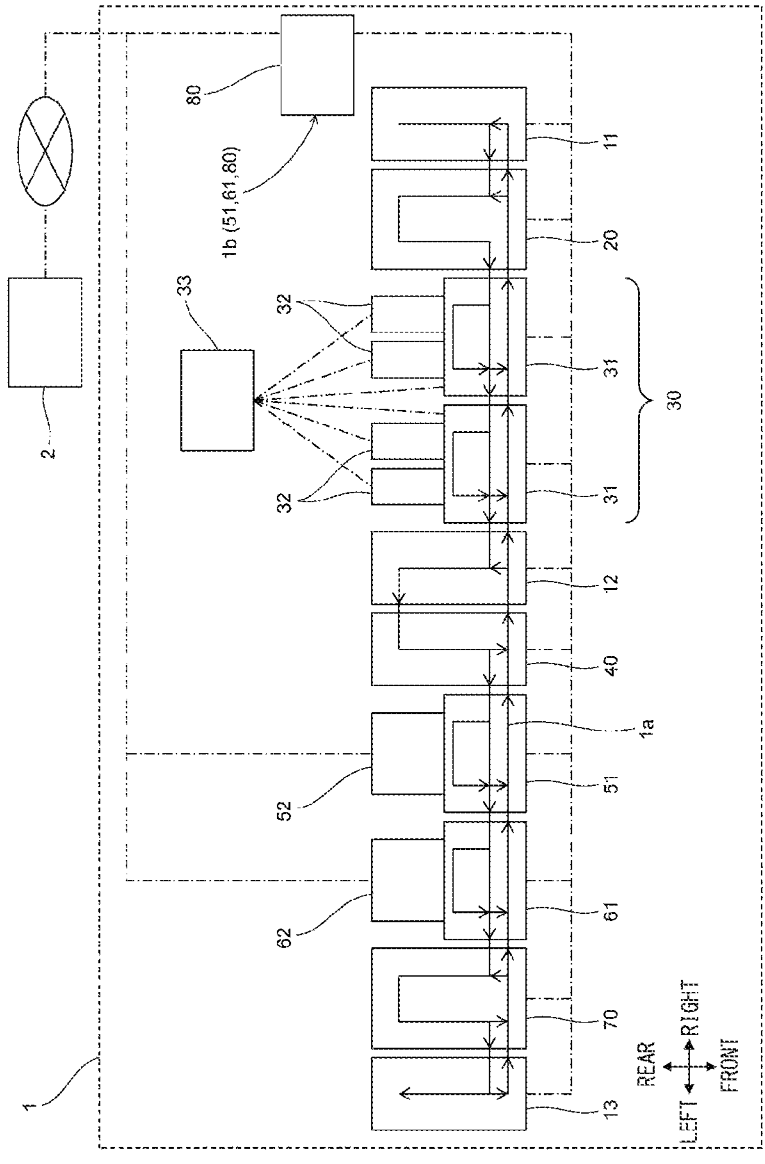
FIG. 1 schematically illustrates a configuration of a specimen testing system according to an embodiment.

FIG. 1 schematically illustrates a configuration of a specimen testing system 1.

FIG. 1 illustrates the configuration of the specimen testing system 1 in a planar view, and indicates the front, the rear, the left, and the right directions in the planar view. The left direction represents the downstream-side direction and the succeeding-side direction, and the right direction represents the upstream-side direction and the preceding-side direction. An operator accesses the specimen testing system 1 from the front side of the specimen testing system 1. The front side of the specimen testing system 1 corresponds to the side in front of the operator.

The specimen testing system 1 includes a feeding unit 11, a transportation unit 12, a collection unit 13, a supply unit 20, a blood cell counting unit 30 for counting blood cells contained in a specimen, a specimen rearrangement unit 40, a transportation unit 51, a smear sample preparation unit 52, a transportation unit 61, an analyzer 62 for measuring measurement items such as CRP, HbA1c, and ESR, a specimen storage unit 70, and a transportation control unit 80. In the blood cell counting unit 30, one transportation unit 31 and two measurement units 32 form one set, and the blood cell counting unit 30 includes one control unit 33, and two sets each including the one transportation unit 31 and the two measurement units 32.

The control unit 33 is connected to the transportation units 31, the measurement units 32, and a host computer 2 so as to be able to communicate therewith. The smear sample preparation unit 52 is connected to the transportation unit 51 and the host computer 2 so as to be able to communicate therewith. The analyzer 62 is connected to the transportation unit 61 and the host computer 2 so as to be able to communicate therewith. The transportation control unit 80 is connected to the feeding unit 11, the transportation unit 12, the collection unit 13, the supply unit 20, the transportation units 31, the specimen rearrangement unit 40, the transportation units 51, 61, the specimen storage unit 70, and the host computer 2 so as to be able to communicate therewith. In FIG. 1, a communication cable for allowing communication among the units is indicated by an alternate long and short dash line.

The specimen testing system 1 automatically measures a specimen, and performs analysis based on measurement data. A specimen is, for example, whole blood collected from a subject. A container 110 (see FIG. 2) containing the specimen is transported in a state where the container 110 is held in a rack 100, the specimen is suctioned from the container 110 by the measurement unit 32, the smear sample preparation unit 52, and the analyzer 62, and the specimen is, for example, measured. The transportation control unit 80 controls each of the units connected to the transportation control unit 80 so as to transport the rack 100 to a target unit.

Figure 2:
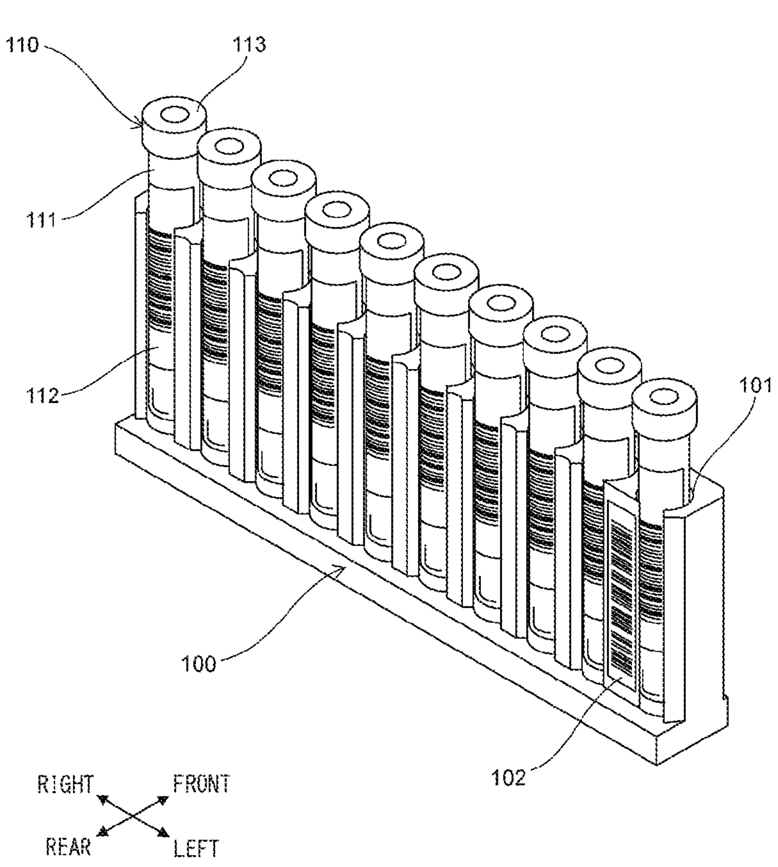
FIG. 2 is a perspective view of structures of a rack and a container according to the embodiment.

FIG. 2 is a perspective view of structures of the rack 100 and the container 110.

The rack 100 has ten holes 101 in which the containers 110 can be held, and a bar code label 102. The bar code label 102 is adhered to a surface on the rear side of the rack 100. On the bar code label 102, a bar code indicating a rack ID is printed as identification information that allows individual identification of the rack 100.

The container 110 incudes a trunk portion 111, a bar code label 112, and a lid portion 113. The trunk portion 111 is formed as a tubular container having an opened upper end, and stores a specimen therein. The bar code label 112 is adhered to the side surface of the trunk portion 111. On the bar code label 112, a bar code indicating a specimen ID is printed as identification information that allows individual identification of the contained specimen. The lid portion 113 is disposed at the upper end of the trunk portion 111 so as to seal the inside of the trunk portion 111. The lid portion 113 is configured to allow piercers disposed at the measurement units 32, the smear sample preparation unit 52, and the analyzer 62 to penetrate therethrough in the up-down direction.

With reference to FIG. 1, in the specimen testing system 1, the feeding unit 11, the supply unit 20, the two transportation units 31, the transportation unit 12, the specimen rearrangement unit 40, the transportation unit 51, the transportation unit 61, the specimen storage unit 70, and the collection unit 13 are aligned in line toward the left direction in order, respectively, so as to be adjacent to each other. The rack 100 is transported mutually between the two adjacent units.

Each of the feeding unit 11, the supply unit 20, the transportation units 31, the transportation unit 12, the specimen rearrangement unit 40, the transportation units 51, 61, the specimen storage unit 70, and the collection unit 13 has a rack transportation path 1*a* for transporting the rack 100. The rack transportation path 1*a* is indicated by an arrow in FIG. 1, and the direction of the arrow indicates a direction in which the rack 100 can be transported in the rack transportation path 1*a*. The rack transportation paths 1*a* of the units are connected to each other at the front position of each unit. The rack transportation path 1*a* is formed of, for example, a conveyor belt that moves in the left-right direction, and a plate member having the upper surface parallel to the horizontal plane.

The transportation units 12, 31, 51, and 61 transport the rack 100 among the measurement units 32, the smear sample preparation unit 52, the analyzer 62, the specimen rearrangement unit 40, and the specimen storage unit 70. A rack transportation system 1*b* is configured by the transportation units 12, 31, 51, 61 and the transportation control unit 80.

In the configuration illustrated in FIG. 1, an operator sets, in the rack 100, the containers 110 each of which contains a specimen to be tested, and sets the rack 100 in the feeding unit 11. Thus, the rack 100 is transported along the rack transportation path 1*a*, and the specimen is suctioned by a target unit according to a test item set for the specimen, thereby testing the specimen. When all of the necessary tests have ended, the rack 100 is collected by the collection unit 13.

With reference to FIG. 1, transportation of the rack 100 from the feeding unit 11 to the collection unit 13 will be described. In the following description, the rack 100 that is put in the feeding unit 11 by an operator is referred to as a first rack, and the rack 100 having the containers 110 transferred from the first rack by the specimen rearrangement unit 40 is referred to as a second rack.

The feeding unit 11 carries out the rack 100 (first rack) put by the operator to the supply unit 20.

The supply unit 20 reads the rack ID and the specimen IDs for the rack 100 (first rack) carried in from the feeding unit 11, and carries out the rack 100 (first rack) to the transportation unit 31 disposed adjacently on the left side.

The transportation unit 31 transports the rack 100 (first rack) carried in from the unit that is disposed adjacently on the right side, to the front of the measurement unit 32. The measurement unit 32 suctions a specimen from the container 110 held in the transported rack 100 (first rack), and counts blood cells in the specimen. The control unit 33 analyzes the specimen based on the measurement data obtained by each of the measurement units 32. The transportation unit 31 carries out the rack 100 (first rack) to the unit disposed adjacently on the left side.

The transportation unit 12 transports rearward the rack 100 (first rack) carried in from the transportation unit 31 that is disposed adjacently on the right side, and carries out the rack 100 (first rack) to the specimen rearrangement unit 40 at a rear position.

In the specimen rearrangement unit 40, the container 110 to be processed by the succeeding specimen processing unit, that is, the smear sample preparation unit 52 and/or the analyzer 62, is transferred from the rack 100 (first rack) carried in from the transportation unit 12, to an empty rack 100 (second rack) held in the specimen rearrangement unit 40. The specimen rearrangement unit 40 transports forward the rack 100 (second rack) that holds the transferred containers 110, and carries out the rack 100 (second rack) to the transportation unit 51 disposed adjacently on the left side, at a front position. The specimen rearrangement unit 40 transports forward the rack 100 (first rack) holding the containers 110 that are not required to be processed by the succeeding specimen processing unit and have not been transferred to the second rack, and carries out the rack 100 (first rack) to the transportation unit 51 disposed adjacently on the left side, at the front position. The rack 100 (first rack) that has become empty by transfer of all of the containers 110 is held in the specimen rearrangement unit 40.

The transportation unit 51 transports the rack 100 (second rack) holding the containers 110 to be processed by the smear sample preparation unit 52, among the racks 100 (first and second racks) carried in from the specimen rearrangement unit 40 that is disposed adjacently on the right side, to the front of the smear sample preparation unit 52. The smear sample preparation unit 52 suctions a specimen from the container 110 held in the transported rack 100 (second rack), and prepares a smear sample. The transportation unit 51 carries out the rack 100 (second rack) that has been processed by the smear sample preparation unit 52 to the transportation unit 61 disposed adjacently on the left side. The transportation unit 51 does not transport the rack 100 (first rack) that holds only the containers 110 for which smear samples are not required to be prepared by the smear sample preparation unit 52, to the front of the smear sample preparation unit 52, and carries out the rack 100 (first rack) to the transportation unit 61 disposed adjacently on the left side.

The transportation unit 61 transports the rack 100 (second rack) holding the containers 110 to be processed by the analyzer 62, among the racks 100 (first and second racks) carried in from the transportation unit 51 that is disposed adjacently on the right side, to the front of the analyzer 62. The analyzer 62 is, for example, a unit capable of measuring measurement items such as CRP, HbA1c, and ESR. The analyzer 62 suctions a specimen from the container 110 held in the transported rack 100 (second rack), and analyzes the specimen. The transportation unit 61 carries out the rack 100 (second rack) that has been processed by the analyzer 62 to the specimen storage unit 70 disposed adjacently on the left side. The transportation unit 61 does not transport the rack 100 (first rack) that holds only the containers 110 which do not require analysis by the analyzer 62, to the front of the analyzer 62, and carries out the rack 100 (first rack) to the specimen storage unit 70 disposed adjacently on the left side.

The specimen storage unit 70 transports the rack 100 (first and second racks) carried in from the transportation unit 61 that is disposed adjacently on the right side to an ascending/descending position P25 described below in the specimen storage unit 70, and transfers the containers 110 held in the rack 100 (first and second racks) to an archive rack 130 described below in the specimen storage unit 70. The specimen storage unit 70 carries out the empty rack 100 (first and second racks) to the transportation unit 61 disposed adjacently on the right side or the collection unit 13 disposed adjacently on the left side.

The collection unit 13 transports rearward the empty rack 100 (first and second racks) carried in from the specimen storage unit 70 that is disposed adjacently on the right side and reserves the empty rack 100.

The transportation control unit 80 determines a destination to which the rack 100 (first and second racks) is to be transported, and controls each unit that transports the rack 100 (first and second racks) so as to transport the rack 100 (first and second racks) to the determined destination.

Figure 4:
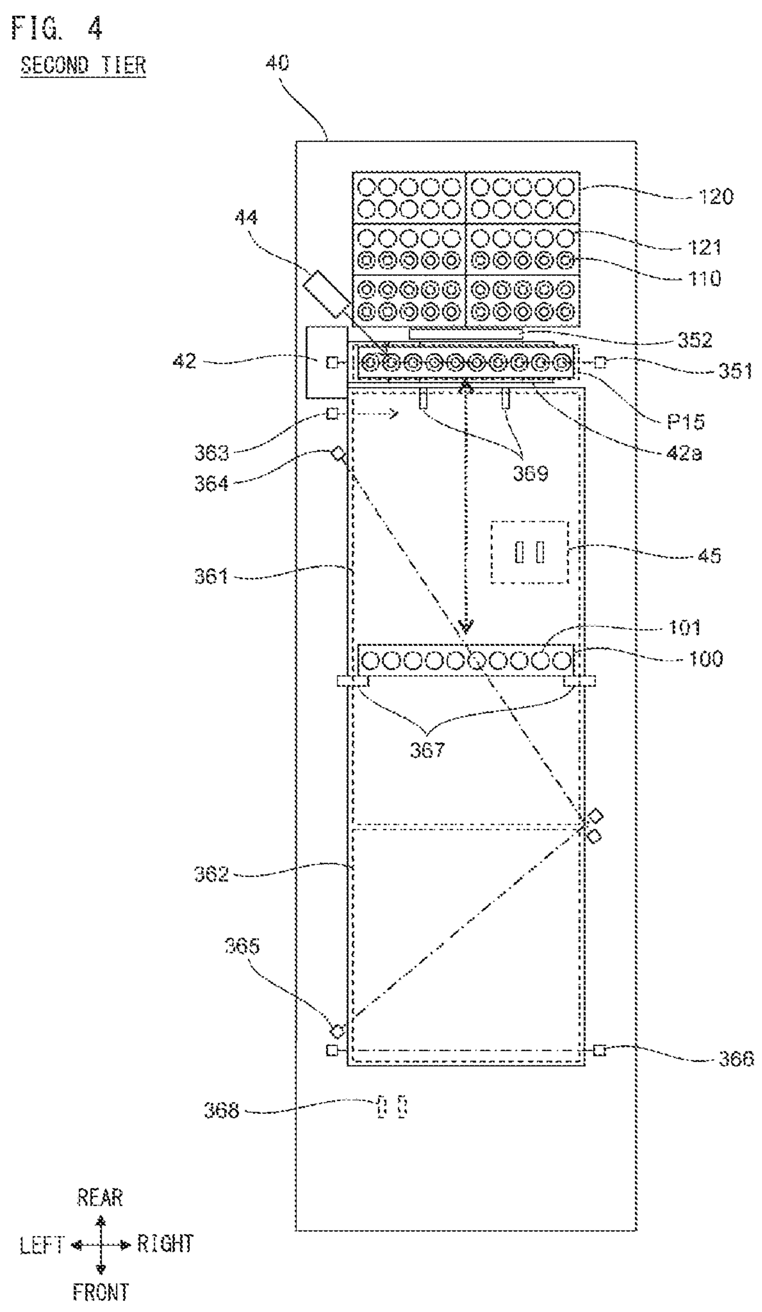
FIG. 4 is a plan view schematically showing a configuration of a second tier of the specimen rearrangement unit according to the embodiment.
Figure 5:
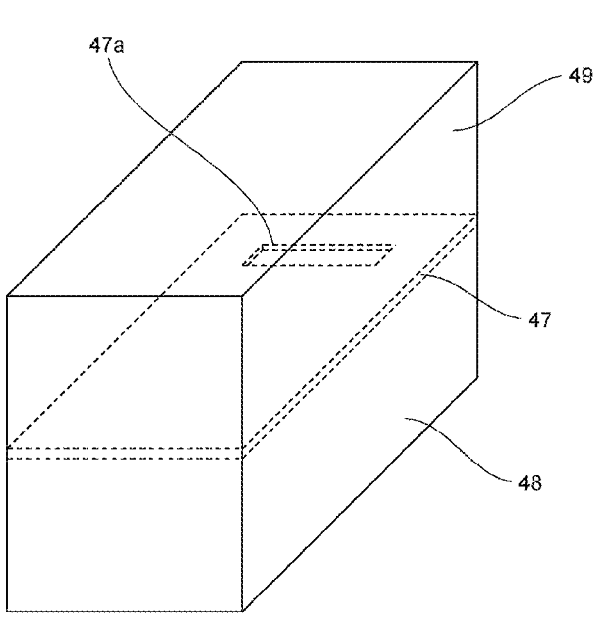
FIG. 5 is a perspective view schematically showing an outer appearance of the specimen rearrangement unit according to the embodiment.

FIGS. 3 and 4 are each a plan view schematically showing a configuration of the specimen rearrangement unit 40 for rearranging specimens. FIGS. 3 and 4 show a first tier and a second tier, respectively, of the specimen rearrangement unit 40. FIG. 5 is a perspective view schematically showing an outer appearance of the specimen rearrangement unit 40. As shown in FIG. 5, the specimen rearrangement unit 40 has a two-tiered structure. The inner portion of the specimen rearrangement unit 40 is divided into two tiers, that is, upper and lower tiers, by a partition 47 that forms a bottom of the second tier and a ceiling of the first tier. The lower tier is a first tier 48 and the upper tier is a second tier 49. The first tier 48 and the second tier 49 overlap each other in a planar view. The partition 47 has an opening 47*a* that allows one rack 100 to pass therethrough. The partition 47 may have, for example, an opening or a cut portion other than the opening 47*a*. The first tier 48 and the second tier 49 may not necessarily be formed by the partition 47, and may be structured by disposing a casing of the second tier 49 on a casing of the first tier 48.

With reference to FIG. 3, in the first tier of the specimen rearrangement unit 40, a reading unit 41, an ascending/descending mechanism 42, a reader 43, a carrying-in path 301, a sensor 302, a transportation mechanism 303, an intermediate path 304, an opening 305, a connection portion 306, a relay portion 307, a rack waiting region 311, sensors 312 to 318, transportation mechanisms 319 to 322, a carrying-out path 331, a sensor 332, a carrying-out path 341, and a sensor 342 are provided.

The transportation unit 12 that is disposed adjacent to the specimen rearrangement unit 40 to the right thereof transports the rack 100 rearward and carries out the rack 100 to the specimen rearrangement unit 40 at the rear position.

The carrying-in path 301 extends in the left-right direction and is disposed on the rear side of the specimen rearrangement unit 40. The carrying-in path 301 is implemented by a conveyor belt that moves in the left-right direction, and transports leftward the rack 100 carried out from the transportation unit 12. The rack 100 is carried into the carrying-in path 301 in the longitudinal direction (the left-right direction) of the rack 100. The sensor 302 is a transmission-type photoelectric sensor, and detects the rack 100 positioned at a carrying-in position P11 on the carrying-in path 301. The reading unit 41 reads the rack ID and the specimen IDs from the rack 100 positioned at the carrying-in position P11.

The reading unit 41 includes two movable portions 41*a* that move in the left-right direction. Each movable portion 41*a* includes a driving roller 41*b* for rotating the container 110 held in the rack 100 in the circumferential direction, two driven rollers 41*c* for pressing the container 110 from the side opposite to the driving roller 41*b* side so as to allow the container 110 to be rotatable, and a reader 41*d* for reading the specimen ID from the container 110 held between the driving roller 41*b* and the driven rollers 41*c*. The container 110 is rotated in the hole 101 by the driving roller 41*b* around a rotation axis extending in the vertical direction, whereby the bar cord is assuredly read. The rack ID is read by the reader 41*d* on the left side. The reader 41*d* is a bar code reader.

The transportation mechanism 303 includes a member for pushing the side surface of the rack 100, transports the rack 100 disposed at the carrying-in position P11 in the transverse direction (front-rear direction) of the rack 100, and transports the rack 100 via the intermediate path 304 to an ascending/descending position P12 of the ascending/descending mechanism 42, and the rack waiting region 311.

The intermediate path 304, the connection portion 306, the relay portion 307, and the rack waiting region 311 are each formed of a plate member having the upper surface parallel to the horizontal plane. The intermediate path 304 and the rack waiting region 311 are connected to each other via the connection portion 306. The connection portion 306, the relay portion 307, and the ascending/descending position P12 of the ascending/descending mechanism 42 are disposed between the intermediate path 304 and the rack waiting region 311.

The intermediate path 304 is disposed between the carrying-in position P11 and the ascending/descending position P12 at which the rack 100 in the first tier is disposed. The width, in the front-rear direction, of the intermediate path 304 is almost equal to the width, in the front-rear direction (transverse direction), of one rack 100. That is, the ascending/descending position P12 is positioned forward of the carrying-in path 301 so as to be spaced therefrom over about a distance equivalent to the width, in the front-rear direction, of one rack 100.

The rack waiting region 311 is a region where the rack 100 stays in a waiting state when another rack 100 stays in the transportation unit 51 disposed adjacently on the left side or the transportation unit 12 disposed adjacently on the right side, and the rack 100 cannot be carried out from a carrying-out position P13 or a carrying-out position P14, and the rack waiting region 311 is also a movement path for moving the rack 100 from the ascending/descending position P12 to the carrying-out position P13. The rack waiting region 311 is a rectangular region having long sides along the front-rear direction, and extends forward from the ascending/descending position P12 in the front-rear direction. The rack waiting region 311 has such a length that twenty racks 100 are aligned in the rack transverse direction between the ascending/descending position P12 of the rack 100 in the first tier and the carrying-out position P13 to the rack transportation path 1*a* of a unit disposed on the left side.

The rack waiting region 311 may be at least a region in which the racks 100 can stay in a waiting state. From the viewpoint of reducing an area in which the specimen testing system 1 is installed, the number of the racks 100 that can stay in a waiting state in the region is preferably greater than or equal to 10, more preferably greater than or equal to 15, and even more preferably greater than or equal to 20. From the viewpoint of reducing a length, in the front-rear direction, of the specimen testing system 1, the number of the racks 100 that can stay in a waiting state in the rack waiting region 311 may be 50 or less and preferably may be 40 or less.

The ascending/descending mechanism 42 is disposed between the intermediate path 304 and the rack waiting region 311. The ascending/descending mechanism 42 moves the rack 100 positioned at the ascending/descending position P12 upward to the second tier. The transportation mechanism 303 places the rack 100 on the carrying-in path 301 at the ascending/descending position P12. The sensor 312 is a reflection-type photoelectric sensor, and detects the rack 100 positioned at the ascending/descending position P12.

The opening 305 is formed between the intermediate path 304 and the rack waiting region 311. The opening 305 is a hole that penetrates in the up-down direction through the plate member forming the intermediate path 304, the connection portion 306, and the rack waiting region 311. The connection portion 306 is disposed to the right of the opening 305. The relay portion 307 is disposed at the left end in the opening 305. The lower surface of the rack 100 positioned at the ascending/descending position P12 is supported by the connection portion 306 and the relay portion 307. A support portion 42*a* of the ascending/descending mechanism 42 is disposed within the opening 305 in a planar view, and is shaped so as not to interfere with the connection portion 306 and the relay portion 307. The configuration of the ascending/descending mechanism 42 will be described below with reference to FIG. 9.

In a case where the rack 100 is moved upward from the first tier to the second tier, the ascending/descending mechanism 42 positions, in advance, the support portion 42*a* at a position lower than the rack waiting region 311. Thereafter, when the rack 100 has been transported to a position of the upper surface of each of the connection portion 306 and the relay portion 307, that is, the ascending/descending position P12, the ascending/descending mechanism 42 moves the support portion 42*a* upward to place the rack 100 on the upper surface of the support portion 42*a* and moves the rack 100 upward to the second tier. As described below, in the second tier, the containers 110 held in the rack 100 are rearranged. When the rearrangement of the containers 110 has ended, the ascending/descending mechanism 42 moves the support portion 42*a* downward, and positions the support portion 42*a* at a position lower than the rack waiting region 311. Thus, the rack 100 is positioned at the position of the upper surface of each of the connection portion 306 and the relay portion 307, that is, at the ascending/descending position P12.

The rack 100 positioned at the ascending/descending position P12 is transported along the rack waiting region 311 toward the front of the specimen rearrangement unit 40 in the transverse direction (front-rear direction) of the rack 100. The rack 100 returned to the ascending/descending position P12 is transported forward of the ascending/descending position P12 by the transportation mechanism 303. The rack 100 having the containers that are not required to be rearranged is not moved to the second tier and is transported forward of the ascending/descending position P12 after the rack 100 is positioned at the ascending/descending position P12.

In a case where, when the reading unit 41 ends reading of the rack 100 at the carrying-in position P11, no rack 100 is at the ascending/descending position P12 and no rack 100 is being moved upward to the second tier by the ascending/descending mechanism 42, the transportation mechanism 303 positions the rack 100 positioned at the carrying-in position P11, at the ascending/descending position P12. In a case where, when the reading unit 41 ends reading of the rack 100 at the carrying-in position P11, the rack 100 returned from the second tier or the rack 100 that is not required to be moved upward to the second tier is positioned at the ascending/descending position P12, the transportation mechanism 303 pushes out the rack 100 positioned at the carrying-in position P11 forward, and thus collectively transports forward the rack 100 at the carrying-in position P11 and the rack 100 at the ascending/descending position P12. Thus, the rack 100 positioned at the carrying-in position P11 is positioned at the ascending/descending position P12, and the rack 100 positioned at the ascending/descending position P12 is transported forward of the ascending/descending position P12.

In a case where, when the reading unit 41 ends reading of the rack 100 positioned at the carrying-in position P11, the rack 100 positioned at the carrying-in position P11 is not required to be moved upward to the second tier and another rack 100 is being moved upward to the second tier by the ascending/descending mechanism 42, the transportation mechanism 303 may transport the rack 100 positioned at the carrying-in position P11, forward of the ascending/descending position P12, through the ascending/descending position P12.

The sensors 313 to 318 each detect the rack 100 on the rack waiting region 311. A state of the racks 100 staying on the rack waiting region 311 is detected based on detection signals of the sensors 313 to 318. The sensors 313, 314, and 318 are reflection-type photoelectric sensors, and the sensors 315 to 317 are transmission-type photoelectric sensors.

The transportation mechanisms 319 to 322 move the rack 100 transported forward of the ascending/descending position P12 by the transportation mechanism 303, along the rack waiting region 311, in the transverse direction (front-rear direction) of the rack 100, and transport the rack 100 to the carrying-out position P13, P14. At this time, the rack 100 on the carrying-out position P13 is caused to stay in a waiting state at the carrying-out position P13 as appropriate according to a processing state on the succeeding side. The rack 100 on the carrying-out position P14 is caused to stay in a waiting state at the carrying-out position P14 as appropriate according to a processing state on the preceding side.

The transportation mechanism 319 has a member that protrudes upward from the upper surface of the rack waiting region 311 and pushes the lower portion of the rack 100, and further transports forward the rack 100 transported forward of the ascending/descending position P12. The transportation mechanism 320 includes a pair of members for pushing the side surface of the rack 100, and further transports forward the rack 100 transported forward by the transportation mechanism 319. The transportation mechanism 321 has the same configuration as the transportation mechanism 319, and further transports forward the rack 100 transported forward by the transportation mechanism 320. The transportation mechanism 322 has the same configuration as the transportation mechanism 320, and transports the rack 100 transported forward by the transportation mechanism 321 to the carrying-out path 331 or the carrying-out path 341. The reader 43 reads the rack ID of the rack 100 positioned near the front end of the rack waiting region 311. The reader 43 is a bar code reader.

The carrying-out path 331 is implemented by a conveyor belt that moves in the left-right direction, and carries out the rack 100 carried out from the rack waiting region 311 to the transportation unit 51 disposed adjacently on the left side. The sensor 332 is a transmission-type photoelectric sensor, and detects the rack 100 positioned at the carrying-out position P13 on the carrying-out path 331. The carrying-out path 341 is implemented by a conveyor belt that moves in the left-right direction, and carries out the rack 100 that is carried out from the transportation unit 51 disposed adjacently on the left side, and the rack 100 carried out through the carrying-out path 331 from the rack waiting region 311, to the transportation unit 12 disposed adjacently on the right side. The sensor 342 is a transmission-type photoelectric sensor, and detects the rack 100 positioned at the carrying-out position P14 on the carrying-out path 341.

With reference to FIG. 4, in the second tier of the specimen rearrangement unit 40, a reader 44, a container transfer mechanism 45, a sensor 351, a transportation mechanism 352, a rack reserving section 361, a rack setting section 362, sensors 363 to 366, a transportation mechanism 367, a sensor 368, a stopper 369, and a buffer rack 120 are provided.

The ascending/descending mechanism 42 positions the rack 100 moved upward from the ascending/descending position P12 in the first tier, at an ascending/descending position P15 at which the rack 100 in the second tier is disposed. The sensor 351 is a transmission-type photoelectric sensor, and detects the rack 100 positioned at the ascending/descending position P15. The reader 44 reads the rack ID of the rack 100 positioned at the ascending/descending position P15. The reader 44 is a bar code reader.

The container transfer mechanism 45 can transfer the container 110 between the rack 100 and the buffer rack 120. The container transfer mechanism 45 transfers the container 110, to the buffer rack 120 disposed in the second tier, from the rack 100 moved by the ascending/descending mechanism 42 from the ascending/descending position P12 in the first tier to the ascending/descending position P15 in the second tier. The container transfer mechanism 45 rearranges the containers 110 by using the buffer rack 120 such that the rack 100 holds only the containers 110 containing specimens to be processed by the succeeding units (the smear sample preparation unit 52 and the analyzer 62) or only the containers 110 containing specimens that are not required to be processed by the succeeding units. When the rearrangement of the containers 110 has ended, the ascending/descending mechanism 42 moves the rack 100 positioned at the ascending/descending position P15 downward to the first tier, and positions the rack 100 at the ascending/descending position P12.

The transportation mechanism 352 includes a member for pushing the side surface of the rack 100, and transports the rack 100 positioned at the ascending/descending position P15 to the rack reserving section 361. In a case where all of the containers 110 have been transferred to the buffer rack 120 from the rack 100 positioned at the ascending/descending position P15, the rack 100 becomes the rack 100 (hereinafter, referred to as "empty rack") that does not hold the containers 110. In this case, the transportation mechanism 352 transports the empty rack that has become empty at the ascending/descending position P15 to the rack reserving section 361.

The rack reserving section 361 and the rack setting section 362 are formed as a rear-side portion and a front-side portion, respectively, of a plate member having the upper surface parallel to the horizontal plane. The plate member of the rack reserving section 361 and the rack setting section 362 extends from the rear side to the front side in the front-rear direction. The upper portion of the rack setting section 362 is opened outward through an opening formed in the casing of the specimen rearrangement unit 40.

The sensors 363, 364 detect the rack 100 on the rack reserving section 361. A state of an empty rack reserved on the rack reserving section 361 is detected based on detection signals of the sensors 363, 364. The sensor 363 is a reflection-type photoelectric sensor, and the sensor 364 is a transmission-type photoelectric sensor. The sensors 365, 366 detect the rack 100 on the rack setting section 362. A state of an empty rack set on the rack setting section 362 is detected based on detection signals of the sensors 365, 366. The sensors 365, 366 are transmission-type photoelectric sensors.

The transportation mechanism 367 includes a pair of members for pushing the side surface of the rack 100, and transports the rack 100 on the rack reserving section 361 and the rack setting section 362 in the front-rear direction. The sensor 368 is a transmission-type photoelectric sensor, and detects that the transportation mechanism 367 is positioned at an originating position. When the transportation mechanism 367 moves a movement portion of the transportation mechanism 367 to the forefront position, the movement portion is positioned at the sensor 368. The sensor 368 detects that the transportation mechanism 367 is positioned at the originating position by detecting the movement portion.

The buffer rack 120 has a plurality of holes 121 in which the containers 110 containing specimens can be held. In the buffer rack 120 in FIG. 4, sixty holes 121 in total are formed in a grid-like shape such that six rows of the holes 121 are formed in the front-rear direction and ten lines of the holes 121 are formed in the left-right direction. In a case where a predetermined number N of the containers 110 are held in the buffer rack 120, or in a case where a predetermined time T elapses from a time when the first specimen has been stored in the buffer rack 120, the containers 110 are transferred from the buffer rack 120 to the rack 100 positioned at the ascending/descending position P15 such that only the containers 110 to be transported to the same destination are held in the rack 100. The predetermined number N can be, for example, set in a range of one to ten through a display input section 803 (see FIG. 13). The predetermined time T can be, for example, set in a range of one minute to 30 minutes through the display input section 803.

In a case where, when the container is transferred from the buffer rack 120 to the rack 100, the rack 100 to which the container is to be transferred is not at the ascending/descending position P15, the transportation mechanism 367 pushes the front surface of an empty rack on the forefront side among empty racks reserved in the rack reserving section 361 and the rack setting section 362, and pushes out a rearmost empty rack among the empty racks reserved in the rack reserving section 361 and the rack setting section 362 to the ascending/descending position P15. At this time, since the stopper 369 protrudes upward from the upper surface of the rack reserving section 361, the rearmost empty rack and an empty rack that is disposed adjacent to and forward of the rearmost empty rack are separated. Thereafter, the container 110 is transferred from the buffer rack 120 to the empty rack positioned at the ascending/descending position P15 by the container transfer mechanism 45.

When the transfer of the containers 110 to the rack 100 positioned at the ascending/descending position P15 has ended, the rack 100 is moved to the ascending/descending position P12 in the first tier by the ascending/descending mechanism 42, and carried out to the transportation unit 51 disposed adjacently on the left side or the transportation unit 12 disposed adjacently on the right side.

When the number of empty racks reserved in the rack reserving section 361 becomes less than or equal to a predetermined number, the transportation control unit 80 controls each unit so as to transport the rack 100 that has become empty since all of the containers 110 have been taken out by the specimen storage unit 70, through the transportation unit 12, to the specimen rearrangement unit 40. The specimen rearrangement unit 40 transports the empty rack carried in from the transportation unit 12 to the rack reserving section 361 in the second tier.

An operator may set empty racks in the rack setting section 362 at which the upper portion is opened outward, with reference to notification on the display input section 803 (see FIG. 13) indicating that the empty racks are insufficient. The transportation mechanism 367 transports the empty racks that have been set in the rack setting section 362 by the operator, to the rack reserving section 361 and the ascending/descending position P15 as appropriate.

The number of the empty racks reserved in the rack reserving section 361 and the rack setting section 362 is detected according to the number of steps of a stepping motor which is counted until return to the originating position detected by the sensor 368 from a drive position for positioning the empty rack at the ascending/descending position P15 when the transportation mechanism 367 transports the empty rack to the ascending/descending position P15. The number of steps of the stepping motor is counted by a rotary encoder or the like.

Figure 7:
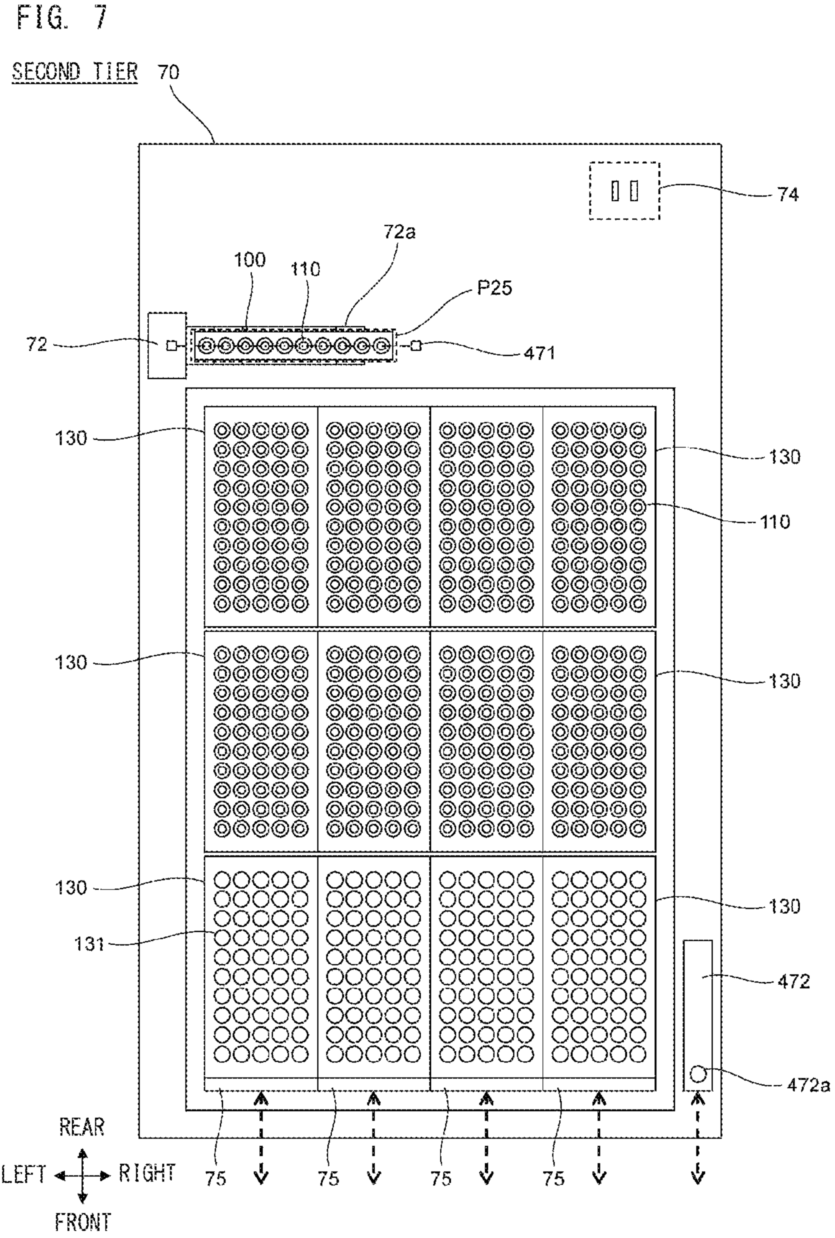
FIG. 7 is a plan view schematically showing a configuration of a second tier of the specimen storage unit according to the embodiment.
Figure 8:
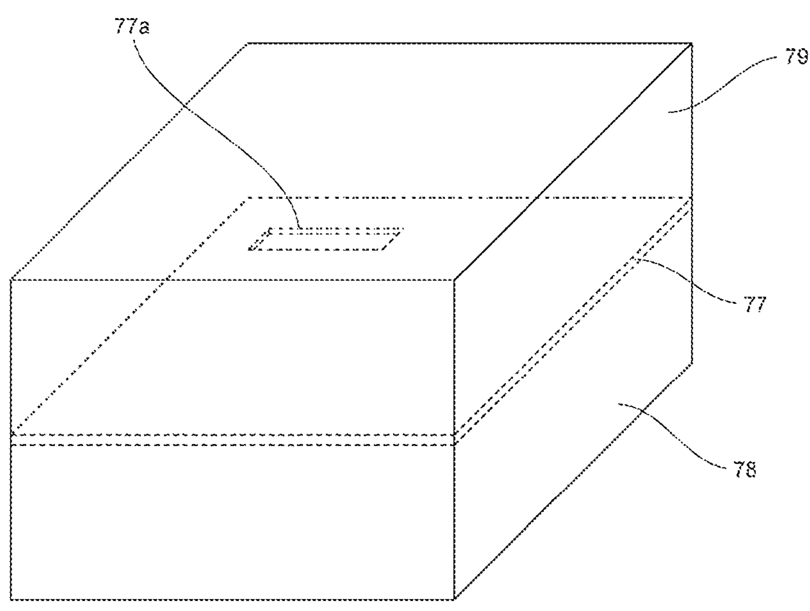
FIG. 8 is a perspective view schematically showing an outer appearance of the specimen storage unit according to the embodiment.

FIGS. 6 and 7 are each a plan view schematically showing a configuration of the specimen storage unit 70 for storing specimens. FIGS. 6 and 7 show the first tier and the second tier, respectively, of the specimen storage unit 70. FIG. 8 is a perspective view schematically showing an outer appearance of the specimen storage unit 70. As shown in FIG. 8, the specimen storage unit 70 has a two-tiered structure similarly to the specimen rearrangement unit 40. The inner portion of the specimen storage unit 70 is divided into two tiers, that is, upper and lower tiers, by a partition 77 that forms a bottom of the second tier and a ceiling of the first tier. The lower tier is a first tier 78 and the upper tier is a second tier 79. The first tier 78 and the second tier 79 overlap each other in a planar view. The partition 77 has an opening 77*a* that allows one rack 100 to pass therethrough. The partition 77 may have, for example, an opening or a cut portion other than the opening 77*a*. The first tier 78 and the second tier 79 may not necessarily be formed by the partition 77 and may be structured by disposing a casing of the second tier 79 on a casing of the first tier 78.

With reference to FIG. 6, in the first tier of the specimen storage unit 70, a reading unit 71, an ascending/descending mechanism 72, a reader 73, a carrying-in path 401, a sensor 402, a transportation mechanism 403, a movement path 411, sensors 412 to 416, transportation mechanisms 417, 418, a carrying-in path 421, a sensor 422, a transportation mechanism 423, an intermediate path 424, an opening 425, a connection portion 426, a relay portion 427, a rack waiting region 431, sensors 432 to 438, transportation mechanisms 439 to 442, a carrying-out path 451, a sensor 452, a carrying-out path 461, and a sensor 462 are provided.

The transportation unit 61 that is disposed adjacent to the specimen storage unit 70 to the right thereof carries out the rack 100, along the rack transportation path 1*a* (see FIG. 1) disposed on the front side, to the specimen storage unit 70, at a front position.

The carrying-in path 401 is implemented by a conveyor belt that moves in the left-right direction, and transports leftward the rack 100 carried out from the transportation unit 61. The sensor 402 is a transmission-type photoelectric sensor, and detects the rack 100 positioned at a carrying-in position P21 on the carrying-in path 401. The transportation mechanism 403 includes a member for pushing the side surface of the rack 100, and transports the rack 100 positioned at the carrying-in position P21 to the movement path 411.

The movement path 411 is formed by a plate member having the upper surface parallel to the horizontal plane, and extends from the front side to the rear side of the specimen storage unit 70 in the front-rear direction. The sensors 412 to 416 detect the rack 100 on the movement path 411. A state of the rack 100 staying on the movement path 411 is detected based on detection signals of the sensors 412 to 416. The sensors 412 to 416 are transmission-type photoelectric sensors.

The transportation mechanisms 417 and 418 move the rack 100 along the movement path 411 in the transverse direction (front-rear direction) of the rack 100, and transport the rack 100 to the carrying-in path 421. The transportation mechanism 417 includes a pair of members for pushing the side surface of the rack 100, and moves the rack 100 on the movement path 411 to the position of the sensor 415. The transportation mechanism 418 includes a member that protrudes upward from the upper surface of the movement path 411 and pushes the lower portion of the rack 100, and transports the rack 100 positioned at the sensor 415 to the right end of the carrying-in path 421.

The reading unit 71 reads the rack ID and the specimen IDs from the rack 100 positioned at the right end of the carrying-in path 421. The reading unit 71 has a configuration similar to the configuration of the reading unit 41 in FIG. 3. The reading unit 71 includes two movable portions 71*a*, and each movable portion 71*a* includes a driving roller 71*b*, two driven rollers 71*c*, and a reader 71*d*. The reader 71*d* is a bar code reader.

The carrying-in path 421 extends in the left-right direction and is disposed on the rear side of the specimen storage unit 70. The carrying-in path 421 is implemented by a conveyor belt that moves in the left-right direction, and moves leftward the rack 100 transported from the movement path 411. The sensor 422 is a transmission-type photoelectric sensor and detects the rack 100 positioned at the left end of the carrying-in path 421. The transportation mechanism 423 includes a member for pushing the side surface of the rack 100, and transports the rack 100 disposed at the left end of the carrying-in path 421 through the intermediate path 424 to the rack waiting region 431.

The intermediate path 424, the opening 425, the connection portion 426, the relay portion 427, the rack waiting region 431, the sensors 432 to 438, the transportation mechanisms 439 to 442, the ascending/descending mechanism 72, and the reader 73 have configurations similar to the configurations of the intermediate path 304, the opening 305, the connection portion 306, the relay portion 307, the rack waiting region 311, the sensors 312 to 318, the transportation mechanisms 319 to 322, the ascending/descending mechanism 42, and the reader 43, respectively, in FIG. 3. The width, in the front-rear direction, of the intermediate path 424 is almost equal to the width, in the front-rear direction (transverse direction), of one rack 100.

The rack waiting region 431 is a region where the rack 100 stays in a waiting state when another rack 100 stays in the collection unit 13 disposed adjacently on the left side or the transportation unit 61 disposed adjacently on the right side, and the rack 100 cannot be carried out from a carrying-out position P23 or a carrying-out position P24, and the rack waiting region 431 is also a movement path for moving the rack 100 from an ascending/descending position P22 to the carrying-out position P23. The rack waiting region 431 is a rectangular region having long sides along the front-rear direction, and extends forward from the ascending/descending position P22 at which the rack 100 in the first tier is disposed, in the front-rear direction. The rack waiting region 431 has such a length that twenty racks 100 are aligned in the rack transverse direction between the ascending/descending position P22 of the rack 100 in the first tier and the carrying-out position P23 to the rack transportation path 1*a* of a unit disposed on the left side The rack waiting region 431 may be at least a region in which the racks 100 can stay in a waiting state. From the viewpoint of reducing an area in which the specimen testing system 1 is installed, the number of the racks 100 that can stay in a waiting state in the region is preferably greater than or equal to 10, more preferably greater than or equal to 15, and even more preferably greater than or equal to 20. From the viewpoint of reducing the length, in the front-rear direction, of the specimen testing system 1, the number of the racks 100 that can stay in a waiting state in the rack waiting region 431 may be 50 or less and preferably may be 40 or less.

The ascending/descending mechanism 72 moves the rack 100 in the up-down direction by moving a support portion 72*a* that supports the lower surface of the rack 100, in the up-down direction. The configuration of the ascending/descending mechanism 72 will be described below with reference to FIG. 10.

The rack 100 carried out from the carrying-in path 421 is positioned at the ascending/descending position P22 through the intermediate path 424, and the rack 100 positioned at the ascending/descending position P22 is moved to the second tier by the ascending/descending mechanism 72. In the second tier, as described below, the containers 110 held in the rack 100 are taken out from the rack 100 and stored. Thus, the rack 100 moved to the second tier becomes an empty rack. When the storage of the containers 110 has ended, the ascending/descending mechanism 72 moves the rack 100 positioned in the second tier downward to the first tier, and positions again the rack 100 at the ascending/descending position P22.

The rack 100 positioned at the ascending/descending position P22 is transported toward the front side of the specimen storage unit 70 along the rack waiting region 431 in the transverse direction (front-rear direction) of the rack 100. The rack 100 returned to the ascending/descending position P22 is transported forward of the ascending/descending position P22 by the transportation mechanism 423.

In a case where, when the rack 100 has arrived at the left end of the carrying-in path 421, no rack 100 is at the ascending/descending position P22 and no rack 100 is being moved upward to the second tier by the ascending/descending mechanism 72, the transportation mechanism 423 positions the rack 100 positioned at the left end of the carrying-in path 421, at the ascending/descending position P22. In a case where, when the rack 100 has arrived at the left end of the carrying-in path 421, the rack 100 returned from the second tier to the ascending/descending position P22 or the rack 100 that is not required to be moved upward to the second tier is positioned, the transportation mechanism 423 pushes out the rack 100 positioned at the left end of the carrying-in path 421 forward and thus collectively transports forward the rack 100 positioned at the left end of the carrying-in path 421 and the rack 100 positioned at the ascending/descending position P22. Thus, the rack 100 positioned at the left end of the carrying-in path 421 is positioned at the ascending/descending position P22, and the rack 100 positioned at the ascending/descending position P22 is transported forward of the ascending/descending position P22.

The transportation mechanisms 439 to 442 move an empty rack transported forward of the ascending/descending position P22 by the transportation mechanism 423, along the rack waiting region 431, in the transverse direction (front-rear direction) of the rack 100, and transport the empty rack to the carrying-out position P23, P24. At this time, the rack 100 on the carrying-out position P23 is caused to stay in a waiting state at the carrying-out position P23 as appropriate according to a processing state on the succeeding side. The rack 100 on the carrying-out position P24 is caused to stay in a waiting state at the carrying-out position P24 as appropriate according to a processing state on the preceding side. The reader 73 reads the rack ID from the rack 100 positioned near the front end of the rack waiting region 431. The reader 73 is a bar code reader.

The carrying-out path 451 is implemented by a conveyor belt that moves in the left-right direction, and carries out the rack 100 carried out from the rack waiting region 431 to the collection unit 13 disposed adjacently on the left side. The sensor 452 is a transmission-type photoelectric sensor, and detects the rack 100 positioned at the carrying-out position P23 on the carrying-out path 451. The carrying-out path 461 is implemented by a conveyor belt that moves in the left-right direction, and carries out the rack 100 carried out from the collection unit 13 disposed adjacently on the left side and the rack 100 carried out from the rack waiting region 431 through the carrying-out path 451, to the transportation unit 61 disposed adjacently on the right side. The sensor 462 is a transmission-type photoelectric sensor, and detects the rack 100 positioned at the carrying-out position P24 at the right end of the carrying-out path 461. The transportation mechanism 403 can also transport the rack 100 positioned at the carrying-out position P24 to the movement path 411.

With reference to FIG. 7, in the second tier of the specimen storage unit 70, a container transfer mechanism 74, a tray 75, the archive rack 130, a sensor 471, and a take-out section 472 are provided.

The ascending/descending mechanism 72 positions the rack 100 moved upward from the ascending/descending position P22 in the first tier, at the ascending/descending position P25 at which the rack 100 in the second tier is disposed. The sensor 471 is a transmission-type photoelectric sensor and detects the rack 100 positioned at the ascending/descending position P25.

The container transfer mechanism 74 can transfer the container 110 between the rack 100 and the archive rack 130. The container transfer mechanism 74 transfers the container 110, from the rack 100 moved from the first tier to the second tier by the ascending/descending mechanism 72, to the archive rack 130 disposed in the second tier. The container transfer mechanism 74 takes out all of the containers 110 from the rack 100 positioned at the ascending/descending position P25, and stores the taken-out containers 110 in the archive rack 130. When all of the containers 110 have been taken out from the rack 100, the ascending/descending mechanism 72 moves the rack 100 that has become empty to the ascending/descending position P22 in the first tier. The empty rack returned to the first tier is transported to the collection unit 13 or the specimen rearrangement unit 40.

The archive rack 130 is detachably set to the tray 75 that can be drawn forward of the specimen storage unit 70. The archive rack 130 has a plurality of holes 131 in which the containers 110 containing specimens can be held. In the archive rack 130 in FIG. 7, fifty holes 131 in total are formed in a grid-like shape such that ten rows of the holes 131 are formed in the front-rear direction, and five lines of the holes 131 are formed in the left-right direction. In FIG. 7, four trays 75 are disposed in the left-right direction, and one tray 75 can hold three archive racks 130 aligned in the front-rear direction. When the operator inputs an instruction for taking out the tray 75, the target tray 75 is unlocked. Thus, the operator is allowed to draw the target tray 75 forward and take out the target archive rack 130.

The take-out section 472 can be drawn forward of the specimen storage unit 70. The take-out section 472 has a hole 472*a* in which the container 110 can be held. The container transfer mechanism 74 can transfer the container 110 between the archive rack 130 and the take-out section 472. When the operator inputs an instruction for taking out a predetermined container 110 through a display input section 813 (see FIG. 14), the container transfer mechanism 74 transfers the target container 110 from the archive rack 130 to the take-out section 472, and the take-out section 472 is pushed forward. Thus, the operator is allowed to take out the target container 110 from the take-out section 472.

Figure 9:
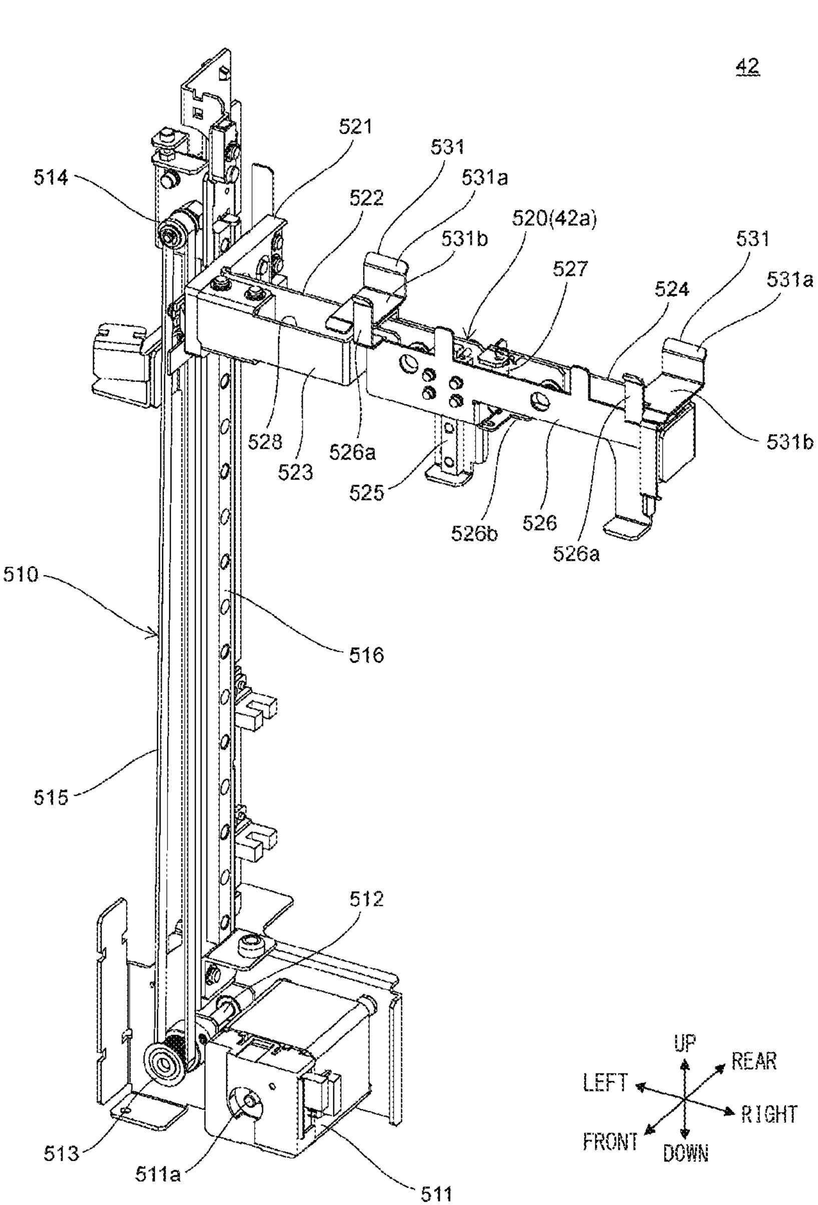
FIG. 9 is a perspective view of a configuration of an ascending/descending mechanism disposed in the specimen rearrangement unit according to the embodiment.

FIG. 9 is a perspective view of a configuration of the ascending/descending mechanism 42 disposed in the specimen rearrangement unit 40.

The ascending/descending mechanism 42 includes an upward-downward moving portion 510 and a support portion 520. The upward-downward moving portion 510 moves the support portion 520 in the up-down direction. The support portion 42*a* (see FIG. 3) of the ascending/descending mechanism 42 is implemented by the support portion 520.

The upward-downward moving portion 510 includes a motor 511, pulleys 513, 514, a belt 515, and a rail 516.

The motor 511 is implemented by a stepping motor. The motor 511 has a rotation shaft 511*a* extending in the front-rear direction. The pulley 513 is connected to the rotation shaft 511*a* via a shaft, a belt, or the like so as to rotate around the center axis extending in the front-rear direction in conjunction with the rotation shaft 511*a* of the motor 511. The pulley 514 is disposed above the pulley 513. The belt 515 is connected to the pulleys 513, 514, and is moved in the up-down direction according to driving of the motor 511. The rail 516 extends in the up-down direction.

The support portion 520 includes a connection member 521, base members 522, 523, 524, a rail 525, a movable member 526, a spring 527, and two support members 531.

The connection member 521 is fixed to the belt 515. When the belt 515 is moved in the up-down direction, the connection member 521 is moved in the up-down direction while being supported by the rail 516. The base members 522 and 523 are disposed at the connection member 521 so as to be spaced over a gap 528 in the front-rear direction. The base member 524 is fixed to the base member 522 so as to extend rightward from the base member 522. The rail 525 is disposed on the front face of the base member 522 so as to extend in the up-down direction.

The movable member 526 is disposed at the rail 525 so as to be movable along the rail 525 in the up-down direction. One end of the spring 527 is connected to the base member 522, and the other end of the spring 527 is connected to the movable member 526. In a normal state, the movable member 526 is urged by the spring 527 so as to be positioned at the upper end of the rail 525. At the upper left end and the upper right end of the movable member 526, surfaces 526*a* are formed so as to be parallel in the up-down and the left-right directions.

The two support members 531 are disposed at the upper left end and the upper right end of the base member 524. The support members 531 have surfaces 531*a* parallel in the up-down and the left-right directions, and surfaces 531*b* parallel in the front-rear and the left-right directions.

By driving the motor 511 of the upward-downward moving portion 510, the support portion 520 is moved in the up-down direction. When the support portion 520 is moved in the up-down direction in the first tier, the relay portion 307 in FIG. 3 passes through the gap 528 between the base members 522 and 523. Thus, contact between the support portion 520 and the relay portion 307 is avoided.

When the rack 100 is moved upward by the ascending/descending mechanism 42, the rack 100 is positioned between the surface 531*a* of the support member 531 and the surface 526*a* of the movable member 526. At this time, rearward movement of the rack 100 is restricted by a pair of the surfaces 531*a*, and forward movement of the rack 100 is regulated by a pair of the surfaces 526*a*. Thus, the rack 100 can be prevented from being moved in the front-rear direction during ascending/descending.

As described with reference to FIG. 4, the rack reserving section 361 is disposed forward of the ascending/descending position P15 in the second tier of the specimen rearrangement unit 40, and the rack 100 is transported between the ascending/descending position P15 and the rear end of the rack reserving section 361. In this case, the movable member 526 is moved downward, and the surface 526*a* is withdrawn downward of the surface 531*b* of the support member 531. Specifically, when the support portion 520 is moved upward, an upper surface of a flange 526*b* of the movable member 526 comes into contact with a predetermined member disposed in the second tier of the specimen rearrangement unit 40. Thus, the support member 531 is positioned at the ascending/descending position P15 in the second tier, and the surface 526*a* is thus automatically withdrawn downward, so that the rack 100 can be transported between the ascending/descending position P15 and the rear end of the rack reserving section 361.

Figure 10:
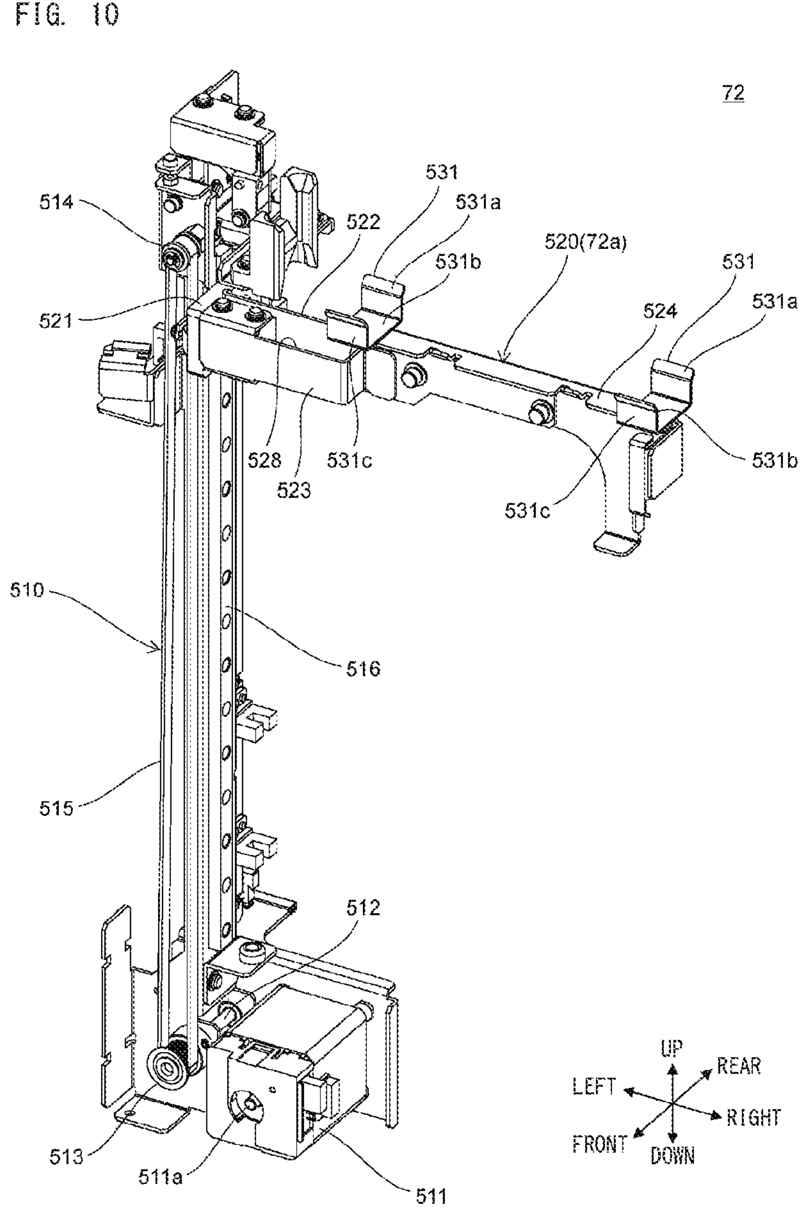
FIG. 10 is a perspective view of a configuration of an ascending/descending mechanism disposed in the specimen storage unit according to the embodiment.

FIG. 10 is a perspective view of a configuration of the ascending/descending mechanism 72 disposed in the specimen storage unit 70.

The ascending/descending mechanism 72 has almost the same configuration as the ascending/descending mechanism 42 in FIG. 9. In FIG. 10, the same components as those of the ascending/descending mechanism 42 in FIG. 9 are denoted by the same reference characters as those in FIG. 9 for convenience sake. The ascending/descending mechanism 72 does not have the rail 525, the movable member 526, and the spring 527 as compared with the ascending/descending mechanism 42 in FIG. 9. Surfaces 531*c* are formed on the front side of the support members 531 so as to be parallel in the up-down and the left-right directions, as compared with the ascending/descending mechanism 42 in FIG. 9. The support portion 72*a* (see FIG. 6) of the ascending/descending mechanism 72 is implemented by the support portion 520.

The rack 100 positioned at the ascending/descending position P25 in the second tier by the ascending/descending mechanism 72 is not transported in the second tier, unlike in the specimen rearrangement unit 40. Therefore, the ascending/descending mechanism 72 does not have the rail 525, the movable member 526, and the spring 527. In the support member 531, the surface 531*c* is formed also on the front side in addition to the surface 531*a* on the rear side. Thus, the rack 100 supported by the support member 531 can be prevented from being moved in the front-rear direction.

Next, a configuration of the container transfer mechanism 45 of the specimen rearrangement unit 40 will be described with reference to FIGS. 11 and 12.

The container transfer mechanism 74 of the specimen storage unit 70 has a configuration similar to that of the container transfer mechanism 45 of the specimen rearrangement unit 40. That is, the container transfer mechanisms 45 and 74 each include a forward-rearward moving section 610, a leftward-rightward moving section 620, an upward-downward moving section 630, and a holding section 640 as shown in FIGS. 11 and 12. Hereinafter, for convenience sake, the configuration of the container transfer mechanism 45 will be merely described.

Figure 11:
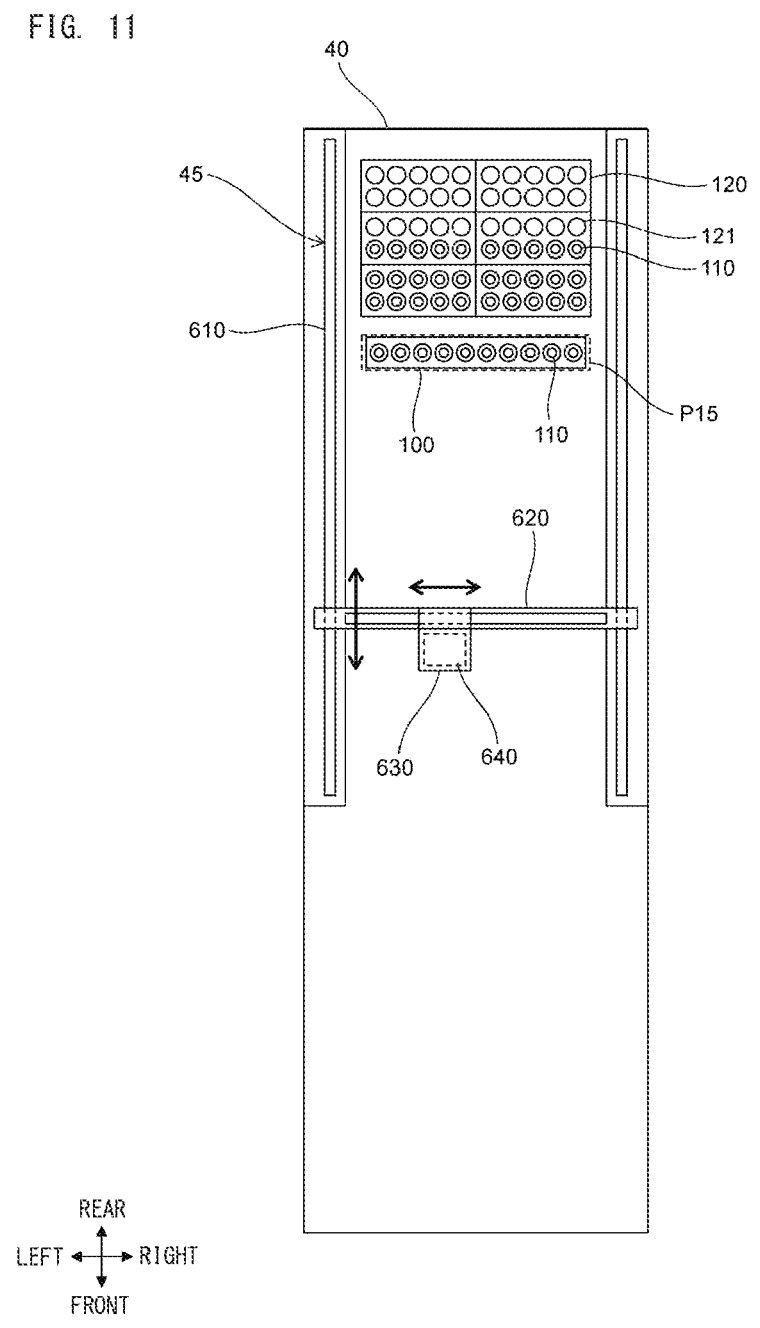

FIG. 11 is a plan view schematically showing a configuration of the container transfer mechanism 45 of the specimen rearrangement unit 40. In FIG. 11, components other than the rack 100, the container 110, and the buffer rack 120 are not shown for convenience sake.

The container transfer mechanism 45 includes the forward-rearward moving section 610, the leftward-rightward moving section 620, the upward-downward moving section 630, and the holding section 640. The container transfer mechanism 45 moves one container 110 from the buffer rack 120 in which a plurality of the containers 110 can be held, by using the holding section 640.

The forward-rearward moving section 610 includes a motor and a rail extending in the front-rear direction, and moves the leftward-rightward moving section 620 in the front-rear direction. The leftward-rightward moving section 620 includes a motor and a rail extending in the left-right direction, and moves the upward-downward moving section 630 in the left-right direction. The upward-downward moving section 630 includes a motor and a rail extending in the up-down direction, and moves the holding section 640 in the up-down direction. The holding section 640 is openable and closable, and can be moved in the up-down direction and can be moved in the horizontal direction by the forward-rearward moving section 610, the leftward-rightward moving section 620, and the upward-downward moving section 630. The holding section 640 is configured to be openable and closable and holds the container 110.

Figure 12:
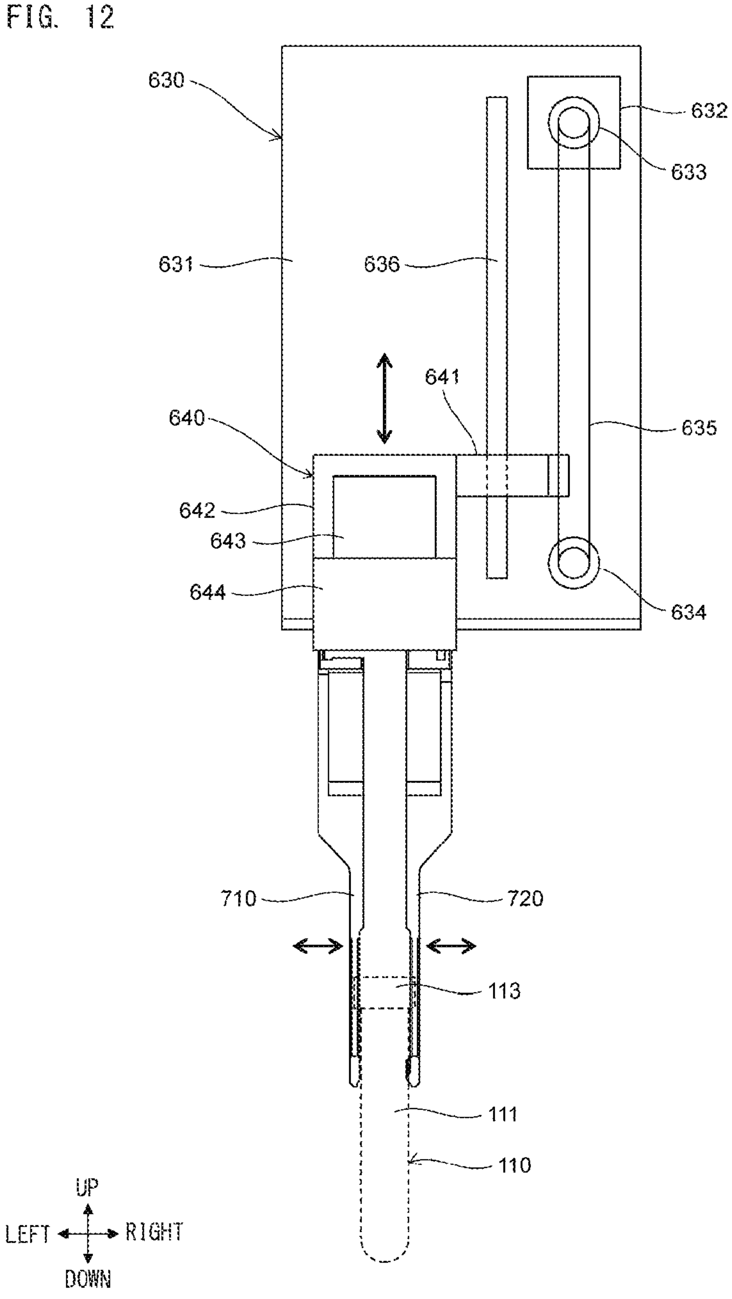
FIG. 12 is a side view schematically showing configurations of an upward-downward moving section and a holding section according to the embodiment.

FIG. 12 is a side view schematically showing configurations of the upward-downward moving section 630 and the holding section 640.

The upward-downward moving section 630 includes a base plate 631, a motor 632, pulleys 633, 634, a belt 635, and a rail 636.

The motor 632 is implemented by a stepping motor, and disposed at the base plate 631. The pulley 633 is disposed at a shaft, of the motor 632, extending in the front-rear direction. The pulley 634 is disposed at the base plate 631 below the pulley 633. The belt 635 is connected to the pulleys 633, 634, and is moved in the up-down direction according to driving of the motor 632. The rail 636 extends in the up-down direction and is disposed at the base plate 631.

The holding section 640 includes a connection member 641, a base plate 642, a motor 643, a conversion mechanism section 644, and a pair of holding members 710, 720.

The right end of the connection member 641 is fixed to the belt 635. When the belt 635 is moved in the up-down direction, the connection member 641 is moved in the up-down direction while being supported by the rail 636. The connection member 641 is fixed to the base plate 642.

The motor 643 is implemented by a stepping motor, and is disposed at the base plate 642. The rotation shaft of the motor 643 extends in the up-down direction. The conversion mechanism section 644 is disposed at the base plate 642, and the holding members 710, 720 are disposed at the conversion mechanism section 644. The conversion mechanism section 644 is configured to convert the direction in which the motor 643 rotates to directions in which the holding member 710 and the holding member 720 approach each other and separate from each other. Therefore, by driving the motor 643, the holding member 710 and the holding member 720 approach each other and separate from each other. Thus, as shown in FIG. 12, the trunk portion 111 of the container 110 is held by the inner surface of the holding member 710 and the inner surface of the holding member 720.

Figure 13:
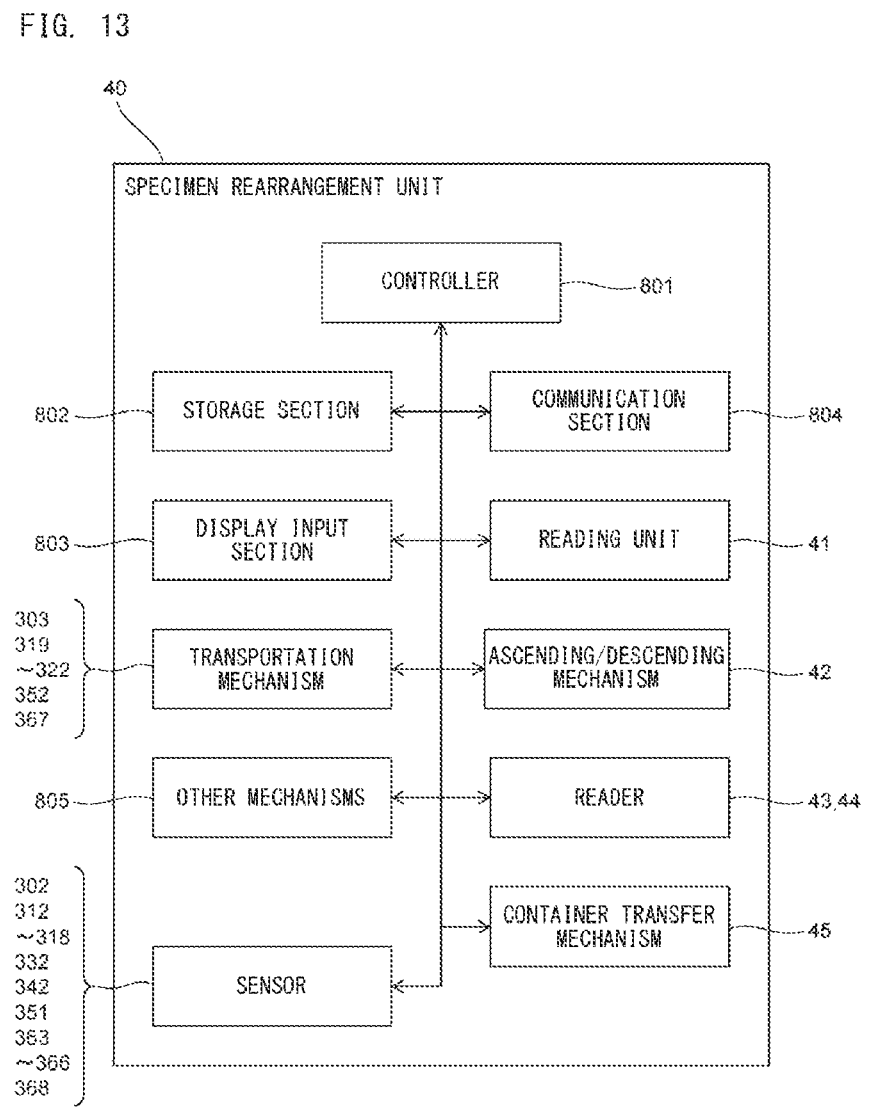

FIG. 13 is a block diagram illustrating the configuration of the specimen rearrangement unit 40.

The specimen rearrangement unit 40 includes a controller 801, a storage section 802, the display input section 803, a communication section 804, the transportation mechanisms 303, 319 to 322, 352, 367, other mechanisms 805, the sensors 302, 312 to 318, 332, 342, 351, 363 to 366, 368, the reading unit 41, the ascending/descending mechanism 42, the readers 43, 44, and the container transfer mechanism 45.

The controller 801 is, for example, implemented by a CPU. The controller 801 controls each component of hardware of the specimen rearrangement unit 40 by executing a computer program stored in the storage section 802. The storage section 802 is, for example, implemented by an SSD, an HDD, a RAM, or the like. The display input section 803 is, for example, implemented by a touch-panel type display. The display input section 803 may be configured so as to be divided into a display section such as a liquid crystal display and an organic EL display, and an input section such as a mouse and a keyboard. The communication section 804 is, for example, implemented by a network card and is connected to the transportation control unit 80 so as to be able to communicate therewith. Other mechanisms 805 include mechanisms for driving the conveyor belts in the specimen rearrangement unit 40 and a mechanism for driving the stopper 369.

Figure 14:
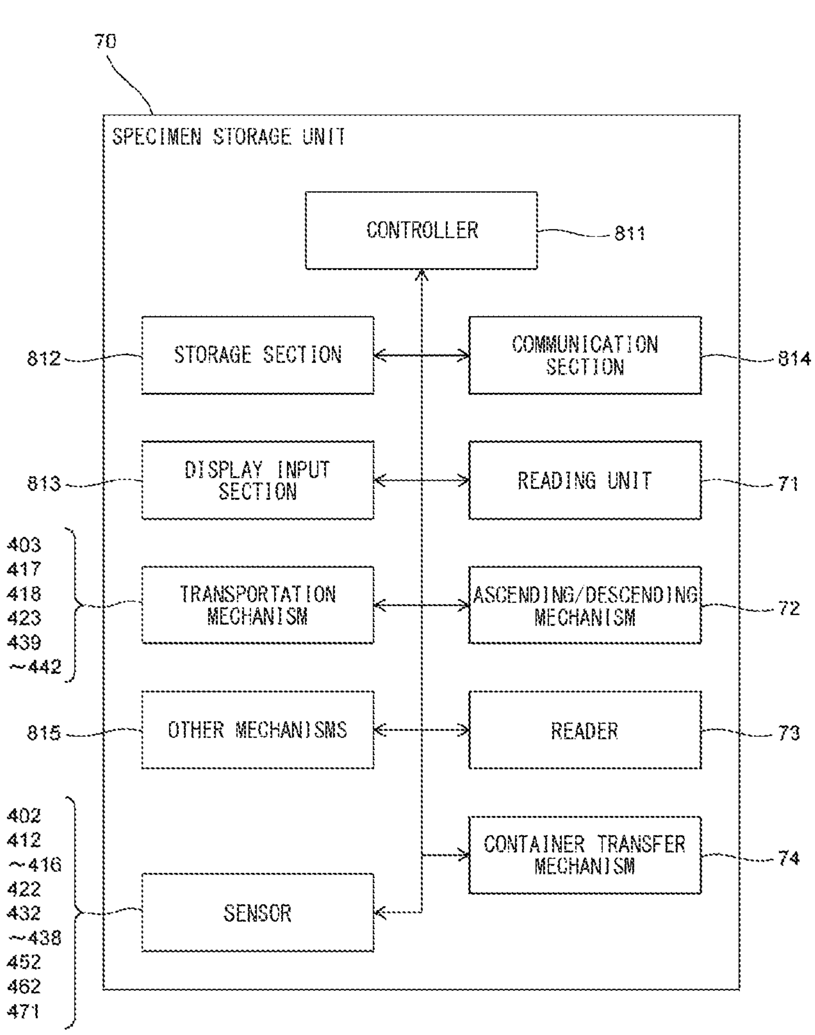
FIG. 14 is a block diagram illustrating a configuration of the specimen storage unit according to the embodiment.

FIG. 14 is a block diagram illustrating the configuration of the specimen storage unit 70.

The specimen storage unit 70 includes a controller 811, a storage section 812, the display input section 813, a communication section 814, the transportation mechanisms 403, 417, 418, 423, 439 to 442, other mechanisms 815, the sensors 402, 412 to 416, 422, 432 to 438, 452, 462, 471, the reading unit 71, the ascending/descending mechanism 72, the reader 73, and the container transfer mechanism 74.

The controller 811 is, for example, implemented by a CPU. The controller 811 controls each component of hardware of the specimen storage unit 70 by executing a computer program stored in the storage section 812. The storage section 812 is, for example, implemented by an SSD, an HDD, a RAM, or the like. The display input section 813 is, for example, implemented by a touch-panel-type display. The display input section 813 may be configured so as to be divided into a display section such as a liquid crystal display and an organic EL display, and an input section such as a mouse and a keyboard. The communication section 814 is, for example, implemented by a network card, and is connected to the transportation control unit 80 so as to be able to communicate therewith. Other mechanisms 815 include mechanisms for driving the conveyor belts in the specimen storage unit 70.

FIG. 15 is a block diagram illustrating a configuration of the transportation control unit 80.

The transportation control unit 80 includes a controller 821, a storage section 822, a display input section 823, and a communication section 824.

The controller 821 is, for example, implemented by a CPU. The controller 821 controls each component of hardware of the transportation control unit 80 by executing a computer program stored in the storage section 822. The storage section 822 is, for example, implemented by an SSD, an HDD, a RAM, or the like. The display input section 823 is, for example, implemented by a touch-panel-type display. The display input section 823 may be configured so as to be divided into a display section such as a liquid crystal display and an organic EL display, and an input section such as a mouse and a keyboard. The communication section 824 is, for example, implemented by a network card, and is connected to the feeding unit 11, the transportation unit 12, the collection unit 13, the supply unit 20, the transportation units 31, the specimen rearrangement unit 40, the transportation units 51, 61, and the specimen storage unit 70 so as to be able to communicate therewith.

Figure 16:
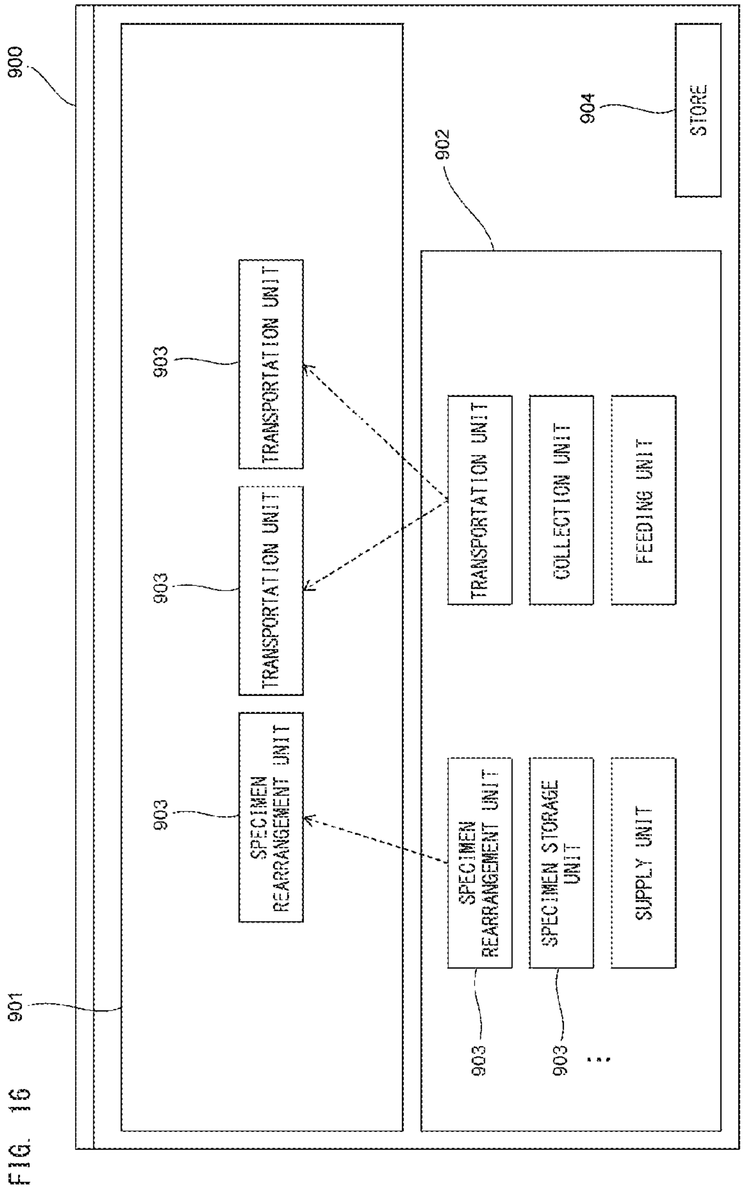
FIG. 16 schematically illustrates a screen displayed on a display input section of the transportation control unit for setting arrangement information for the specimen testing system, according to the embodiment.

FIG. 16 schematically illustrates a screen 900 displayed on the display input section 823 (see FIG. 15) of the transportation control unit 80 for setting arrangement information for the specimen testing system 1.

The screen 900 includes a layout display region 901, a block selection region 902, a plurality of blocks 903, and a storage button 904.

In the layout display region 901, the blocks 903 corresponding to the layout in the specimen testing system 1 are disposed. In the block selection region 902, the blocks 903 corresponding to all the units that can be included in the specimen testing system 1 are disposed. In the block 903, a name of the unit is displayed.

For example, an operator taps on the block 903 in the block selection region 902 through the display input section 823 to display a menu regarding the block 903. For example, the operator taps on a button for inputting an arrangement instruction, in the displayed menu, through the display input section 823, to display the block 903 in the layout display region 901. Thereafter, for example, the operator drags the block 903 displayed in the layout display region 901 through the display input section 823 to place the block 903 at a desired place in the specimen testing system 1.

The operator repeats such an operation and thus sets an arrangement of the units in the specimen testing system 1 as shown in FIG. 1. The operator operates the storage button 904, whereby the controller 821 (see FIG. 15) of the transportation control unit 80 receives setting of the arrangement created in the layout display region 901, generates arrangement information according to the received arrangement, and stores the arrangement information in the storage section 822. The controller 821 controls transportation of the rack 100 based on the arrangement information stored in the storage section 822.

Figure 17:
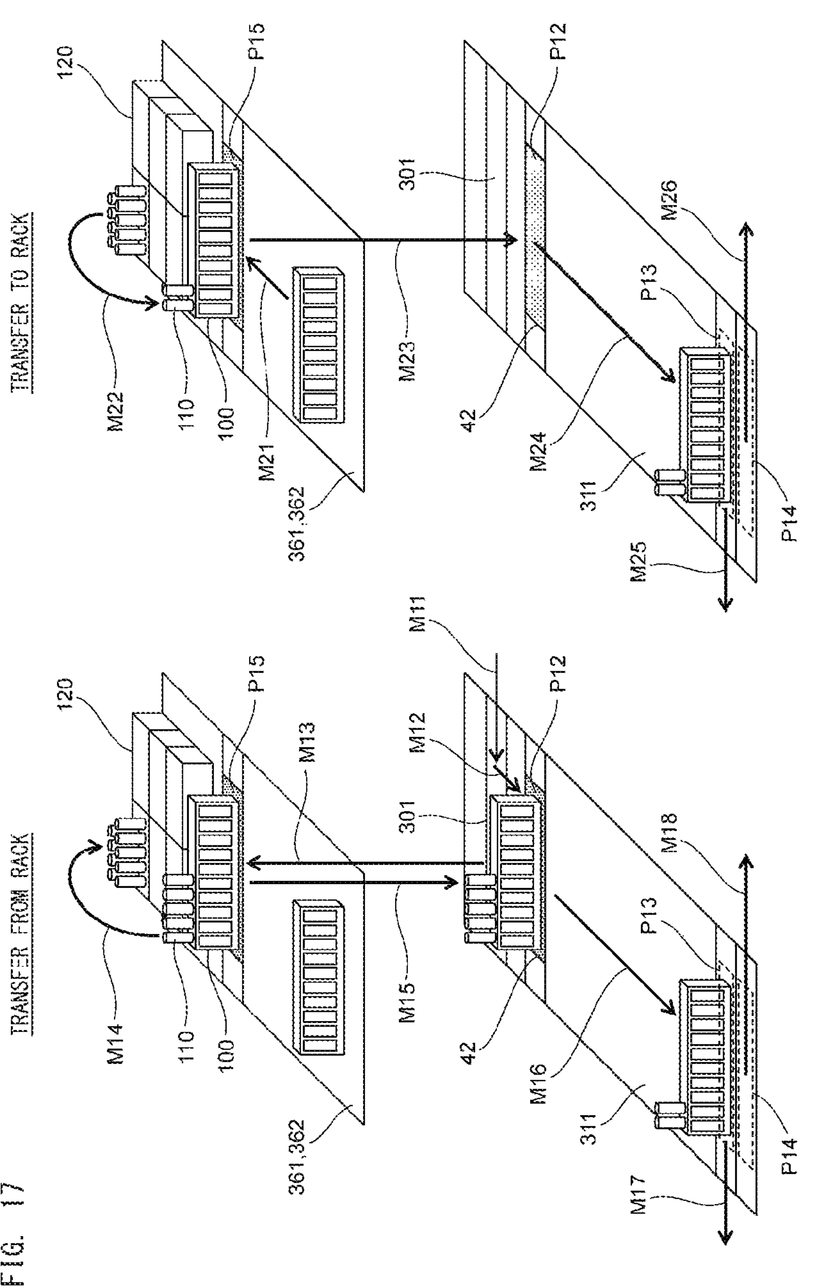
FIG. 17 illustrates a transfer operation performed by the specimen rearrangement unit according to the embodiment.

FIG. 17 illustrates a transfer operation performed by the specimen rearrangement unit 40. On the left side in FIG. 17, an operation of transferring the container 110 from the rack 100 (first rack) to the buffer rack 120 is shown. On the right side in FIG. 17, an operation of transferring the container 110 from the buffer rack 120 to the rack 100 (second rack) is shown.

As shown on the left side in FIG. 17, in an operation M11, the controller 801 controls the mechanism 805 for driving the conveyor belt of the carrying-in path 301 to carry in the rack 100 (first rack) to the carrying-in path 301 from the transportation unit 12 disposed adjacently on the right side. In an operation M12, the controller 801 controls the transportation mechanism 303 to transport forward the rack 100 (first rack) on the carrying-in path 301, and position the rack 100 (first rack) at the ascending/descending position P12 in the first tier. In an operation M13, the controller 801 controls the ascending/descending mechanism 42 to move the rack 100 (first rack) positioned at the ascending/descending position P12 to the ascending/descending position P15 in the second tier.

In an operation M14, the controller 801 controls the container transfer mechanism 45 to transfer the container 110 from the rack 100 (first rack) positioned at the ascending/descending position P15 to the buffer rack 120. In the operation M14, only the containers 110 containing specimens to be processed by the succeeding specimen processing unit are transferred from the rack 100 (first rack) to the buffer rack 120. After the transfer, in a case where the container 110 is held in the rack 100 (first rack), an operation M15 and the succeeding operations are performed. Meanwhile, in a case where all of the containers have been transferred to the buffer rack 120, and the rack 100 (first rack) has become empty, the rack 100 is caused to stay in a waiting state at the ascending/descending position P15, and, in an operation M22, the containers 110 are transferred from the buffer rack 120.

In the operation M15, the controller 801 controls the ascending/descending mechanism 42 to move the rack 100 (first rack) for which the transfer has ended, to the ascending/descending position P12 in the first tier. In an operation M16, the controller 801 controls the transportation mechanisms 303, and 319 to 322 to transport the rack 100 (first rack) to the carrying-out position P13 or P14 through the rack waiting region 311. In an operation M17, the controller 801 controls the mechanism 805 for driving the conveyor belt of the carrying-out path 331, to carry out the rack 100 (first rack) positioned at the carrying-out position P13 to the transportation unit 51 disposed adjacently on the left side. In an operation M18, the controller 801 controls the mechanism 805 for driving the conveyor belt of the carrying-out path 341, to carry out the rack 100 (first rack) positioned at the carrying-out position P14 to the transportation unit 12 disposed adjacently on the right side.

In a case where the rack 100 stays in the transportation unit 51 disposed adjacently on the left side or the transportation unit 12 disposed adjacently on the right side, and the operation M17 or the operation M18 cannot be performed, the controller 801 controls the transportation mechanisms 303, and 319 to 322, to transport the rack 100 (first rack) to the rack waiting region 311 and cause the rack 100 (first rack) to stay in a waiting state in the rack waiting region 311 in the operation M16. Thereafter, in a case where the rack 100 no longer stays in the adjacent unit, and the operation M17 or the operation M18 is performed, the controller 801 controls the transportation mechanisms 303, and 319 to 322, to transport the rack 100 (first rack) from the rack waiting region 311 to the carrying-out position P13 or P14.

As shown on the right side in FIG. 17, in a case where the container 110 is required to be transferred from the buffer rack 120, the controller 801 controls the transportation mechanism 367 to transport an empty rack (the second rack) reserved in the rack reserving section 361 and the rack setting section 362 to the ascending/descending position P15 in the second tier in an operation M21. In the operation M22, the controller 801 controls the container transfer mechanism 45, to transfer the containers 110 from the buffer rack 120 to the empty rack (the second rack) positioned at the ascending/descending position P15. Thereafter, in operations M23 to M26, as in the same manner as in the operations M15 to M18, the rack 100 (second rack) is carried out to the transportation unit 51 disposed adjacently on the left side or the transportation unit 12 disposed adjacently on the right side.

In this embodiment, a destination of the rack 100 transported forward along the rack waiting region 311 is any of the smear sample preparation unit 52, the analyzer 62, and the specimen storage unit 70 disposed in the left direction. Therefore, in general, the rack 100 is positioned at the carrying-out position P13, and thereafter carried out to the transportation unit 51 disposed adjacently on the left side.

Figure 18:
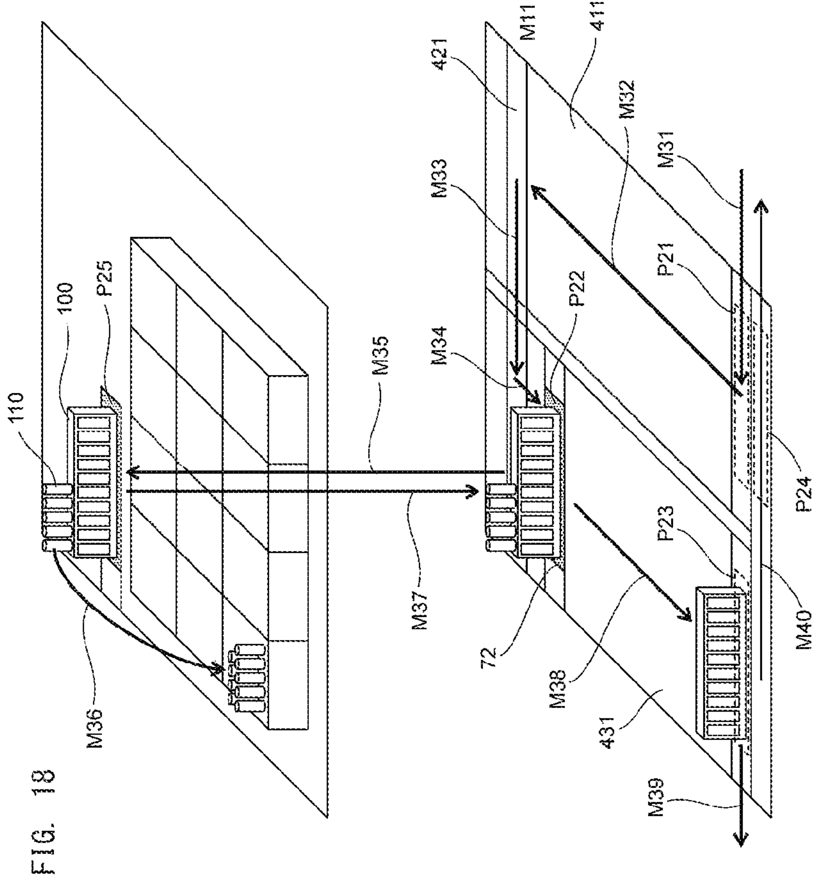
FIG. 18 illustrates a transfer operation performed by the specimen storage unit according to the embodiment.

FIG. 18 illustrates a transfer operation performed by the specimen storage unit 70.

In an operation M31, the controller 811 controls the mechanism 815 for driving the conveyor belt of the carrying-in path 401, to carry in the rack 100 (first and second racks), from the transportation unit 61 disposed adjacently on the right side, to the carrying-in position P21. In an operation M32, the controller 811 controls the transportation mechanisms 403, 417, and 418, to transport rearward the rack 100 (first and second racks) positioned at the carrying-in position P21, and position the rack 100 (first and second racks) at the right end of the carrying-in path 421. In an operation M33, the controller 811 controls the mechanism 815 for driving the conveyor belt of the carrying-in path 421, to transport the rack 100 (first and second racks) leftward.

In an operation M34, the controller 811 controls the transportation mechanism 423, to transport forward the rack 100 (first and second racks) positioned at the carrying-in path 421, and position the rack 100 (first and second racks) at the ascending/descending position P22 in the first tier. In an operation M35, the controller 811 controls the ascending/descending mechanism 72, to move the rack 100 (first and second racks) positioned at the ascending/descending position P22 to the ascending/descending position P25 in the second tier. In an operation M36, the controller 811 controls the container transfer mechanism 74, to transfer the container 110 from the rack 100 (first and second racks) positioned at the ascending/descending position P25 to the archive rack 130. Thus, the rack 100 (first and second racks) positioned at the ascending/descending position P25 becomes an empty rack.

In an operation M37, the controller 811 controls the ascending/descending mechanism 72, to move the empty rack (first and second racks) to the ascending/descending position P22 in the first tier. In an operation M38, the controller 811 controls the transportation mechanisms 423, and 439 to 442, to transport the empty rack (first and second racks) through the rack waiting region 431 to the carrying-out position P23 or P24. In an operation M39, the controller 811 controls the mechanism 815 for driving the conveyor belt of the carrying-out path 451, to carry out the empty rack (first and second racks) positioned at the carrying-out position P23 to the collection unit 13 disposed adjacently on the left side. In an operation M40, the controller 811 controls the mechanism 815 for driving the conveyor belt of the carrying-out path 461, to carry out the rack 100 (first and second racks) positioned at the carrying-out position P24 to the transportation unit 61 disposed adjacently on the right side.

In a case where the rack 100 stays in the collection unit 13 disposed adjacently on the left side or the transportation unit 61 disposed adjacently on the right side, and the operation M39 or the operation M40 cannot be performed, the controller 811 controls the transportation mechanisms 423, and 439 to 442, to transport the rack 100 (first and second racks) to the rack waiting region 431 and cause the rack 100 (first and second racks) to stay in a waiting state in the rack waiting region 431 in an operation M38. Thereafter, when the rack 100 no longer stays in the adjacent unit, and the operation M39 or the operation M40 is performed, the controller 811 controls the transportation mechanisms 423, and 439 to 442, to transport the rack 100 (first and second racks) from the rack waiting region 431 to the carrying-out position P23 or P24.

In this embodiment, a destination of an empty rack transported forward along the rack waiting region 431 is the collection unit 13 disposed adjacently on the left side in general. However, in a case where the number of the racks 100 in the rack reserving section 361 and the rack setting section 362 of the specimen rearrangement unit 40 is reduced, an empty rack that occurs in the specimen storage unit 70 is carried out to the transportation unit 61 disposed adjacently on the right side and transported to the specimen rearrangement unit 40.

As described above, in the specimen testing system 1, the rack 100 (first rack) holding the containers 110 that are left since the containers 110 are not taken by the specimen rearrangement unit 40 and the rack 100 (second rack) having the containers 110 transferred by the specimen rearrangement unit 40 are transported from the specimen rearrangement unit 40 to the specimen storage unit 70. When all of the containers 110 in the rack 100 are stored in the specimen storage unit 70, the rack 100 (first and second racks) becomes an empty rack. Meanwhile, the specimen rearrangement unit 40 needs an empty rack when the containers 110 are transferred, and, therefore, an operator needs to refill the specimen rearrangement unit 40 with empty racks as appropriate. Such an operation is bothersome for the operator.

Meanwhile, in this embodiment, the racks 100 (first and second racks) are bidirectionally transported between the specimen rearrangement unit 40 and the specimen storage unit 70. Thus, for example, while the racks 100 (first and second racks) carried out from the specimen rearrangement unit 40 can be transported to the specimen storage unit 70, empty racks (first and second racks) that occur in the specimen storage unit 70 can be transported to the specimen rearrangement unit 40. Therefore, an operation of an operator for refilling the specimen rearrangement unit 40 with empty racks can be reduced.

Transportation control for bidirectionally transporting the rack 100 between the specimen rearrangement unit 40 and the specimen storage unit 70, and a transportation process of transporting the rack 100 in the specimen testing system 1 will be described below.

Figure 19:
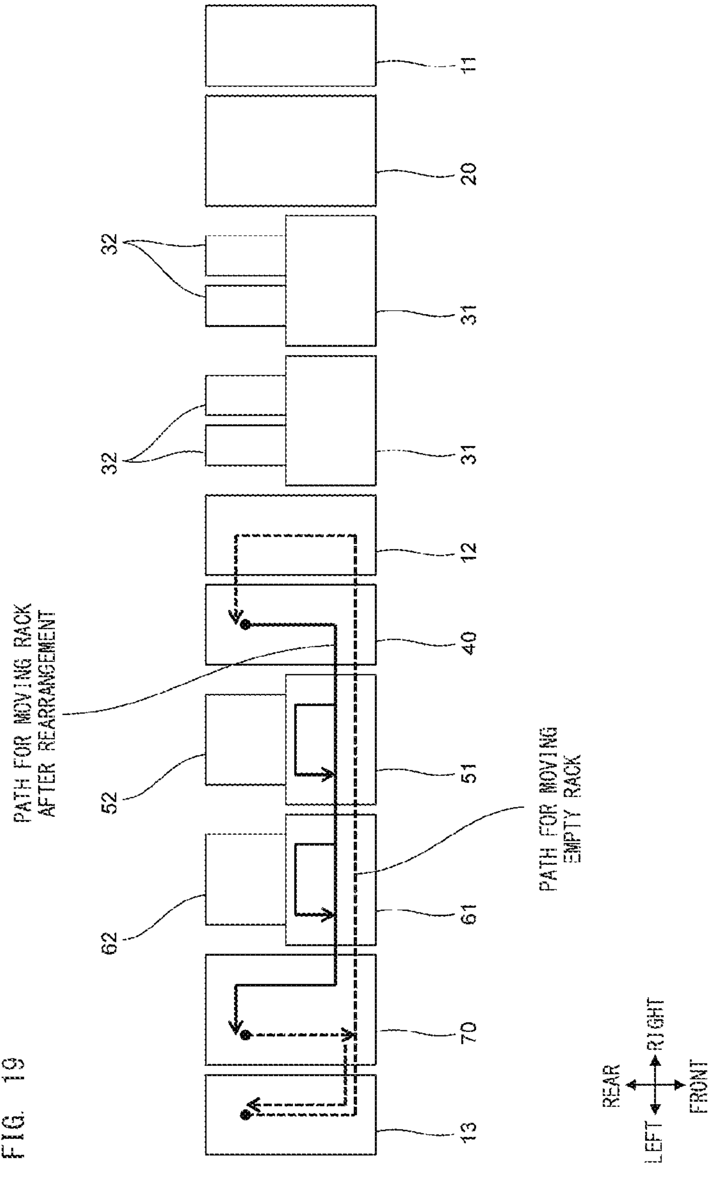
FIG. 19 schematically illustrates a path for transporting a rack between the specimen rearrangement unit and the specimen storage unit according to the embodiment.

FIG. 19 schematically illustrates a path for transporting the rack 100 between the specimen rearrangement unit 40 and the specimen storage unit 70.

As described above, each of the feeding unit 11, the transportation unit 12, the collection unit 13, the supply unit 20, the transportation units 31, the specimen rearrangement unit 40, the transportation units 51, 61, and the specimen storage unit 70 includes the rack transportation path 1*a* (see FIG. 1) for transporting the rack 100. The rack 100 is transported along the rack transportation path 1*a* of each unit, and transportation of the rack 100 is controlled by the transportation control unit 80.

A thick solid line arrow indicates a path for transporting the rack 100 for which rearrangement by the specimen rearrangement unit 40 has ended. The rack 100 for which rearrangement has been performed in the second tier of the specimen rearrangement unit 40, and the rack 100 that is carried out as it is since the rearrangement by the specimen rearrangement unit 40 is not required, are transported to the specimen storage unit 70 by the transportation units 51, 61. All of the containers 110 on the rack 100 are stored in the specimen storage unit 70, and the rack 100 becomes an empty rack. The empty rack that occurs in the specimen storage unit 70 is transported to the collection unit 13 or the specimen rearrangement unit 40.

A thick broken-line arrow indicates a path for transporting an empty rack carried out from the specimen storage unit 70 and the collection unit 13. In a case where, when an empty rack is carried out from the specimen storage unit 70, the number of the racks 100 reserved in the rack reserving section 361 and the rack setting section 362 of the specimen rearrangement unit 40 is less than or equal to a predetermined number, the empty rack is carried out from the specimen storage unit 70 in the right direction, and transported to the transportation unit 12 by the transportation units 51, 61 and the specimen rearrangement unit 40. The transportation unit 12 transports the empty rack rearward, and carries out the empty rack to the specimen rearrangement unit 40 at a rear position. The empty rack carried in by the transportation unit 12 is transported to the rack reserving section 361 and reserved in the rack reserving section 361.

Meanwhile, in a case where, when an empty rack is carried out from the specimen storage unit 70, the number of the racks 100 reserved in the rack reserving section 361 and the rack setting section 362 of the specimen rearrangement unit 40 is greater than the predetermined number, the empty rack is carried out leftward from the specimen storage unit 70 and reserved in the collection unit 13. Thereafter, when the number of the racks 100 reserved in the rack reserving section 361 and the rack setting section 362 of the specimen rearrangement unit 40 becomes less than or equal to the predetermined number, the empty rack in the collection unit 13 is transported to the transportation unit 12 through the specimen storage unit 70 by the transportation units 51, 61, carried out to the specimen rearrangement unit 40 by the transportation unit 12, and reserved in the rack reserving section 361 of the specimen rearrangement unit 40.

Next, the process of transporting the rack 100 will be described with reference to flow charts in FIGS. 20 to 28.

Figure 21:
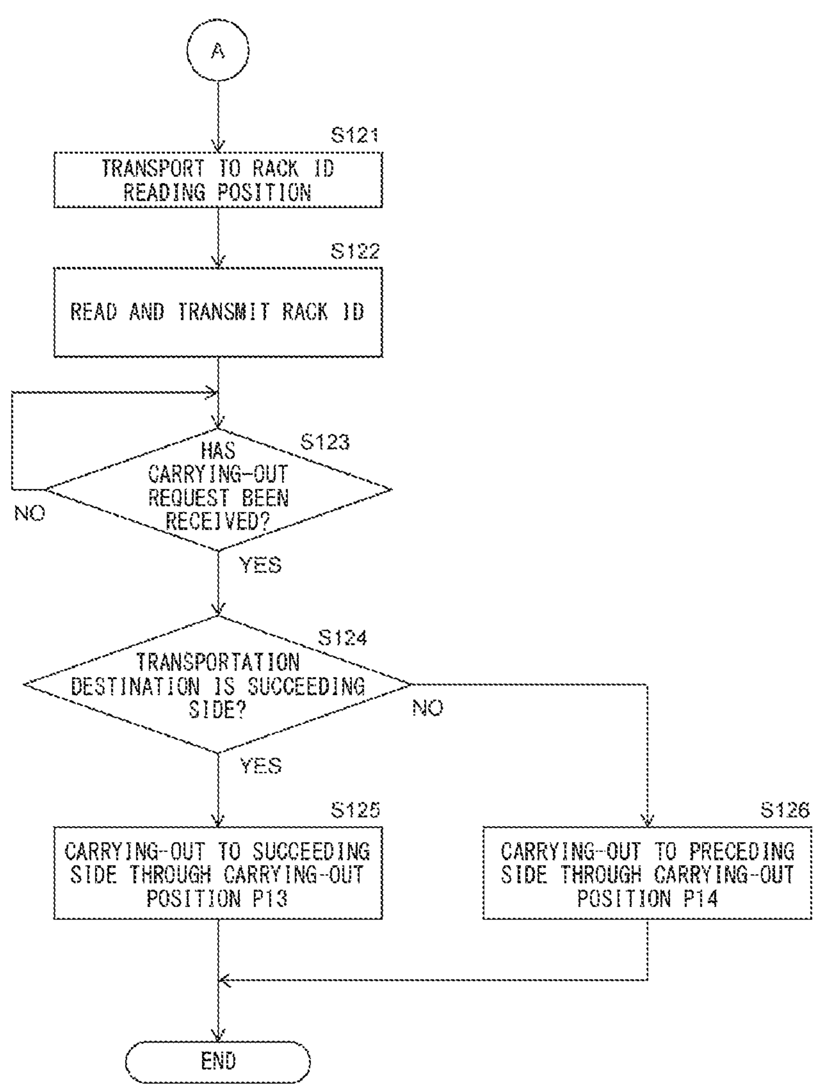
FIG. 21 is a flow chart showing a process performed by the specimen rearrangement unit for transferring a container from a rack to a buffer rack, according to the embodiment.

FIGS. 20 and 21 are each a flow chart showing a process performed by the specimen rearrangement unit 40 for transferring the container 110 from the rack 100 to the buffer rack 120. The process in FIGS. 20 and 21 is repeatedly performed for each rack 100 by the controller 801 of the specimen rearrangement unit 40.

As shown in FIG. 20, in step S101, the controller 801 of the specimen rearrangement unit 40 is in a waiting state for a process until a carrying-in request is received from the transportation control unit 80. The controller 821 of the transportation control unit 80 operates to transmit, to the specimen rearrangement unit 40, a request for carrying in the rack 100 when the rack 100 arrives at a rear position of the transportation unit 12. Upon receiving the carrying-in request from the transportation control unit 80, the controller 801 of the specimen rearrangement unit 40 controls the mechanism 805 for driving the conveyor belt of the carrying-in path 301 so as to carry in the rack 100 to the carrying-in position P11 (see FIG. 3) of the carrying-in path 301, in step S102.

In step S103, the controller 801 controls the reading unit 41 so as to read the rack ID and the specimen IDs from the rack 100 positioned at the carrying-in position P11. Furthermore, in step S103, the controller 801 transmits the read rack ID and specimen IDs to the transportation control unit 80. The controller 821 of the transportation control unit 80 transmits, to the specimen rearrangement unit 40, storage information indicating a position on the buffer rack 120 to which the container 110 having the received specimen ID is to be transferred, or storage information indicating that transfer to the buffer rack 120 is not to be performed. The storage information is generated according to whether or not a result of measurement performed by the measurement unit 32 indicates that the process is required to be performed by the smear sample preparation unit 52 and the analyzer 62 (specimen processing unit). In step S104, the controller 801 of the specimen rearrangement unit 40 obtains, from the transportation control unit 80, the storage information for each container 110 corresponding to the specimen ID transmitted in step S103.

In step S105, the controller 801 determines whether or not transfer of the container 110 is being performed for any rack 100. In other words, the controller 801 determines whether or not the rack 100 is supported by the support portion 42*a* (see FIG. 3) of the ascending/descending mechanism 42. In a case where transfer of the container 110 is being performed for any rack 100, the controller 801 causes the rack 100 positioned at the carrying-in position P11 to stay in a waiting state at the carrying-in position P11 in step S106.

In a case where transfer of the container 110 is being not performed for any rack 100, the controller 801 controls the transportation mechanism 303 (see FIG. 3) so as to transport the rack 100 positioned at the carrying-in position P11 to the ascending/descending position P12 in step S107. In step S108, the controller 801 determines whether or not one or more containers 110 on the rack 100 positioned at the ascending/descending position P12 is required to be transferred, according to the storage information received in step S104.

In a case where transfer is required for the rack 100 positioned at the ascending/descending position P12, the controller 801 controls the ascending/descending mechanism 42 so as to move upward the rack 100 positioned at the ascending/descending position P12 and position the rack 100 at the ascending/descending position P15 in the second tier, in step S109. In step S110, the controller 801 operates to transfer the container 110 on the rack 100 to the buffer rack 120 according to the storage information, for each container 110, having been received in step S104. Furthermore, in step S110, the controller 801 increments the stored number of the containers 110 held in the buffer rack 120, by one, in the storage section 802. Furthermore, in step S110, the controller 801 starts measurement of a time for which the containers 110 stay in the buffer rack 120 in a case where the first container 110 is transferred to the buffer rack 120.

When the required transfer has ended, the controller 801 controls the ascending/descending mechanism 42 so as to move downward the rack 100 positioned at the ascending/descending position P15 and position the rack 100 at the ascending/descending position P12 in the first tier, in step S111.

Meanwhile, in a case where none of the containers 110 on the rack 100 positioned at the ascending/descending position P12 is required to be transferred, the process steps of steps S109 to S111 are omitted. Thereafter, the process proceeds to step S121 in FIG. 21.

As shown in FIG. 21, in step S121, the controller 801 of the specimen rearrangement unit 40 controls the transportation mechanisms 303, and 319 to 322 so as to transport the rack 100 positioned at the ascending/descending position P12 to a reading position of the reader 43 (see FIG. 3). In step S122, the controller 801 controls the reader 43 so as to read the rack ID from the rack 100, and operates to transmit the read rack ID to the transportation control unit 80.

Upon receiving the rack ID from the specimen rearrangement unit 40, the controller 821 of the transportation control unit 80 determines a unit to which the rack 100 corresponding to the rack ID is to be transported, determines whether the destination to which the rack 100 is to be carried out from the specimen rearrangement unit 40 is the preceding side (right direction) or the succeeding side (left direction), according to the unit determined as the transportation destination and the arrangement information stored in the storage section 822, and operates to transmit the information about the preceding side or the succeeding side, as a carrying-out request, to the specimen rearrangement unit 40.

In step S123, the controller 801 of the specimen rearrangement unit 40 is in a waiting state for a process until the carrying-out request is received from the transportation control unit 80. In step S124, the controller 801 determines whether or not the transportation destination is the succeeding side (left direction), upon receiving the carrying-out request from the transportation control unit 80.

In a case where the transportation destination is the succeeding side (left direction), the controller 801 controls the transportation mechanism 322 and the mechanism 805 for driving the conveyor belt of the carrying-out path 331 so as to carry out the rack 100 on the rack waiting region 311 through the carrying-out position P13 (see FIG. 3) to the transportation unit 51 on the succeeding side, in step S125. Meanwhile, in a case where the transportation destination is the preceding side (right direction), the controller 801 controls the transportation mechanism 322 and the mechanism 805 for driving the conveyor belt of the carrying-out path 341 so as to carry out the rack 100 on the rack waiting region 311 through the carrying-out position P14 (see FIG. 3) to the transportation unit 12 on the preceding side, in step S126. When the process step of step S125 or S126 has ended, the controller 801 ends transfer of the container 110 from the rack 100 to the buffer rack 120.

Figure 22:
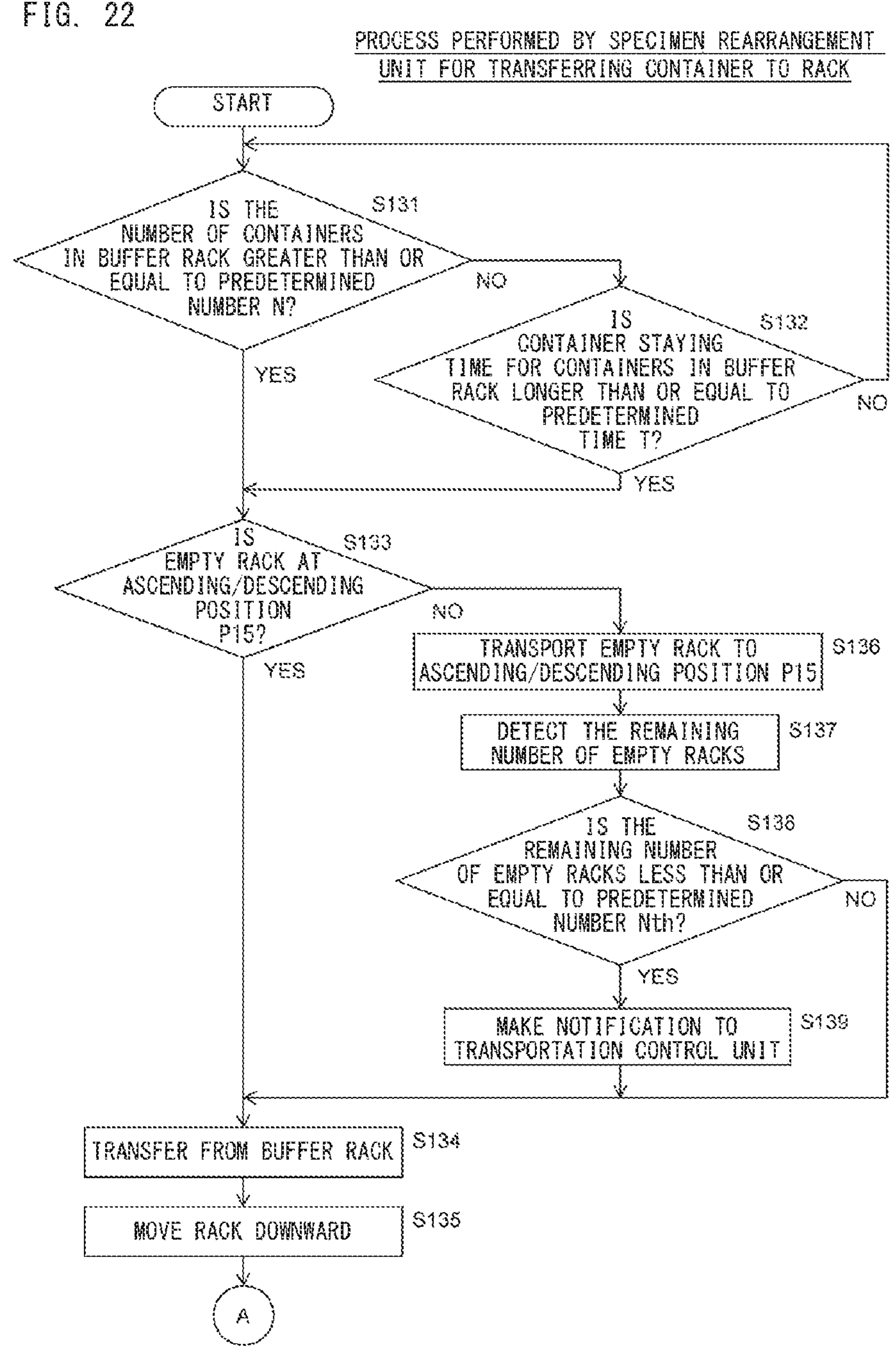
FIG. 22 is a flow chart showing a process performed by the specimen rearrangement unit for transferring a container from a buffer rack to a rack, according to the embodiment.

FIG. 22 is a flow chart showing a process performed by the specimen rearrangement unit 40 for transferring the container 110 from the buffer rack 120 to the rack 100. The process in FIG. 22 is repeatedly performed for each rack 100 by the controller 801 of the specimen rearrangement unit 40.

In step S131, the controller 801 of the specimen rearrangement unit 40 determines whether or not the number of the containers 110 held in the buffer rack 120 is greater than or equal to the predetermined number N, with reference to the number of the containers 110 held in the buffer rack 120 as stored in the storage section 802, in step S131. In a case where the number of the containers 110 held in the buffer rack 120 is not greater than or equal to the predetermined number N, the controller 801 determines whether or not a container staying time from start of the measurement in step S110 (see FIG. 20), that is, the longest container staying time among the container staying times for the containers 110 held in the buffer rack 120, is longer than or equal to the predetermined time T, in step S132. When the determination result of at least one of steps S131 and S132 is YES, the controller 801 advances the process to step S133.

In step S133, the controller 801 determines whether or not the rack 100 that has become empty since all of the containers 110 have been transferred to the buffer rack 120 is at the ascending/descending position P15 in the second tier. When the rack 100 that has become empty is at the ascending/descending position P15, the controller 801 controls the container transfer mechanism 45 so as to transfer the container 110 from the buffer rack 120 to the empty rack positioned at the ascending/descending position P15, in step S134, and controls the ascending/descending mechanism 42 so as to move downward the rack 100 positioned at the ascending/descending position P15 and position the rack 100 at the ascending/descending position P12 in the first tier, in step S135. Meanwhile, when the rack 100 that has become empty is not at the ascending/descending position P15, the controller 801 controls the transportation mechanism 367 (see FIG. 4) so as to transport an empty rack from the rack reserving section 361 and the rack setting section 362 to the ascending/descending position P15, in step S136, In step S137, the controller 801 operates to detect the remaining number of empty racks. As described above, the transportation mechanism 367 pushes out the rearmost empty rack, among the empty racks reserved in the rack reserving section 361 and the rack setting section 362, to the ascending/descending position P15. At this time, the number of the empty racks reserved in the rack reserving section 361 and the rack setting section 362 is detected according to the number of steps of the stepping motor which is counted until the transportation mechanism 367 returns to the originating position detected by the sensor 368 (see FIG. 4) from a drive position for positioning the empty rack at the ascending/descending position P15. The greater the number of the steps until return to the origination point is, the less the remaining number of empty racks is.

In step S138, whether or not the remaining number of empty racks detected in step S137 is less than or equal to a predetermined number Nth is determined. The predetermined number Nth is, for example, two. The predetermined number Nth can be set through the display input section 803 (see FIG. 13). In a case where the remaining number of empty racks is less than or equal to the predetermined number Nth, the controller 801 transmits the remaining number of empty racks to the transportation control unit 80 and thus notifies the transportation control unit 80 that empty racks are insufficient in the specimen rearrangement unit 40 in step S139. In a case where the remaining number of empty racks is greater than the predetermined number Nth, the process step of step S139 is omitted.

The controller 801 may notify the transportation control unit 80 of the remaining number of empty racks detected in step S137 each time the remaining number is detected or at predetermined timing. In this case, the process steps of steps S138 and S139 are omitted. The controller 821 of the transportation control unit 80 performs the process step of step S138 after the process step of step S411 (see FIG. 28) described below. In a case where the remaining number of empty racks is determined in step S138 to be less than or equal to the predetermined number Nth, the process step of step S412 described below is performed. In a case where the remaining number of empty racks is greater than the predetermined number Nth, the process step of step S412 is skipped.

Thereafter, the controller 801 controls, in step S134, the container transfer mechanism 45 so as to transfer the container 110 from the buffer rack 120 to the empty rack transported to the ascending/descending position P15 in step S136, and controls, in step S135, the ascending/descending mechanism 42 so as to position the rack 100 positioned at the ascending/descending position P15, at the ascending/descending position P12 in the first tier.

After step S135 has been performed, the controller 801 advances the process to step S121 in FIG. 21, and performs process steps of steps S121 to S126. Thus, the rack 100 obtained by transferring the containers 110 to an empty rack is transported forward on the rack waiting region 311. In a case where the transportation destination is the succeeding side, the rack 100 is transported through the carrying-out position P13 to the succeeding side. In a case where the transportation destination is the preceding side, the rack 100 is transported through the carrying-out position P14 to the preceding side.

Figure 24:
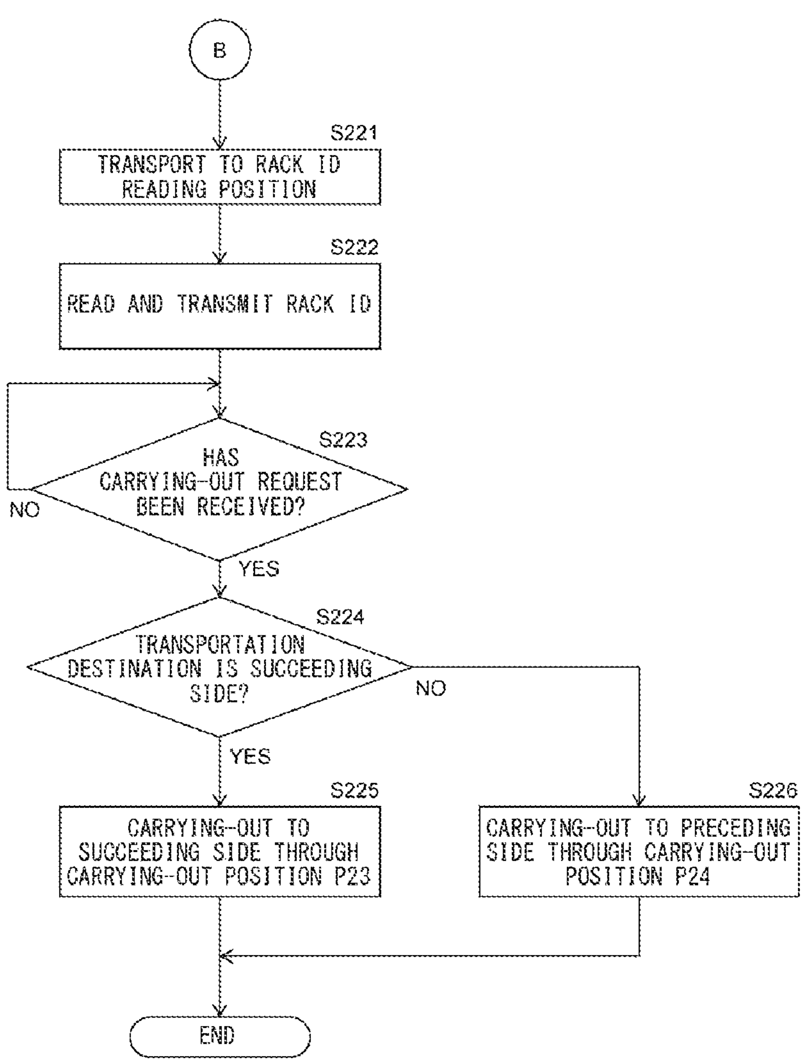
FIG. 24 is a flow chart showing a process performed by the specimen storage unit for transferring a container from a rack to the archive rack 130, according to the embodiment.

FIGS. 23 and 24 are each a flow chart showing a process performed by the specimen storage unit 70 for transferring the container 110 from the rack 100 to the archive rack 130. The process in FIGS. 23 and 24 is repeatedly performed for each rack 100 by the controller 811 of the specimen storage unit 70.

As shown in FIG. 23, in step S201, the controller 811 of the specimen storage unit 70 is in a waiting state for a process until a carrying-in request is received from the transportation control unit 80. The controller 821 of the transportation control unit 80 operates to transmit a request for carrying in the rack 100 to the specimen storage unit 70 when the rack 100 arrives at the left end position of the transportation unit 61. Upon receiving the carrying-in request from the transportation control unit 80, the controller 811 of the specimen storage unit 70 controls the mechanism 815 for driving the conveyor belt of the carrying-in path 421 so as to carry in the rack 100 through the carrying-in path 401 and the movement path 411 to the carrying-in path 421 (see FIG. 6) in step S202.

In step S203, the controller 811 controls the reading unit 71 so as to read the rack ID and the specimen IDs from the rack 100 in the carrying-in path 421. Furthermore, in step S203, the controller 811 operates to transmit the rack ID and the specimen IDs read in step S203 to the transportation control unit 80. The controller 821 of the transportation control unit 80 transmits, to the specimen storage unit 70, storage information indicating a position on the archive rack 130 to which the container 110 having the received specimen ID is to be transferred. In step S204, the controller 811 of the specimen storage unit 70 obtains, from the transportation control unit 80, the storage information for each container 110 corresponding to the specimen ID transmitted in step S203.

In step S205, the controller 811 determines whether or not transfer of the container 110 is being performed for any rack 100. In other words, the controller 811 determines whether or not the rack 100 is supported by the support portion 72*a* (see FIG. 6) of the ascending/descending mechanism 72. In a case where transfer of the container 110 is being performed for any rack 100, the controller 811 causes the rack 100 to be in a waiting state at the left end of the carrying-in path 421 in step S206.

In a case where transfer of the container 110 is being not performed in any rack 100, the controller 811 controls the transportation mechanism 423 (see FIG. 6) so as to transport the rack 100 positioned at the left end of the carrying-in path 421 to the ascending/descending position P22 in step S207.

In step S208, the controller 811 controls the ascending/descending mechanism 72 so as to move upward the rack 100 positioned at the ascending/descending position P22 and position the rack 100 at the ascending/descending position P25 in the second tier. In step S209, the controller 811 controls the container transfer mechanism 74 so as to transfer the container 110 on the rack 100 to the archive rack 130, according to the storage information received in step S204. Thus, the rack 100 positioned at the ascending/descending position P25 becomes an empty rack. When the transfer has ended, the controller 811 controls the ascending/descending mechanism 72 so as to move downward the empty rack positioned at the ascending/descending position P25 and position the empty rack at the ascending/descending position P22 in the first tier in step S210. Thereafter, the process proceeds to step S221 in FIG. 24.

As shown in FIG. 24, in step S221, the controller 811 of the specimen storage unit 70 controls the transportation mechanisms 423, and 439 to 442 so as to transport the empty rack positioned at the ascending/descending position P22 to a reading position of the reader 73 (see FIG. 6). In step S222, the controller 811 controls the reader 73 so as to read the rack ID from the empty rack, and operates to transmit the read rack ID to the transportation control unit 80.

Upon receiving the rack ID from the specimen storage unit 70, the controller 821 of the transportation control unit 80 determines a unit to which the rack 100 corresponding to the rack ID is to be transported, determines whether the destination to which the rack 100 is to be carried out from the specimen storage unit 70 is the preceding side (right direction) or the succeeding side (left direction), according to the unit determined as the transportation destination and the arrangement information stored in the storage section 822, and operates to transmit the information regarding the preceding side or the succeeding side, as a carrying-out request, to the specimen storage unit 70.

In step S223, the controller 811 of the specimen storage unit 70 is in a waiting state for a process until the carrying-out request is received from the transportation control unit 80. Upon receiving the carrying-out request from the transportation control unit 80, the controller 811 determines whether or not the transportation destination is the succeeding side (left direction) in step S224.

In a case where the transportation destination is the succeeding side (left direction), the controller 811 controls the transportation mechanism 442 and the mechanism 815 for driving the conveyor belt of the carrying-out path 451 so as to carry out the empty rack on the rack waiting region 431 through the carrying-out position P23 (see FIG. 6) to the collection unit 13 on the succeeding side, in step S225. Meanwhile, in a case where the transportation destination is the preceding side (right direction), the controller 811 controls the transportation mechanism 442 and the mechanism 815 for driving the conveyor belt of the carrying-out path 461 so as to carry out the empty rack on the rack waiting region 431 through the carrying-out position P24 (see FIG. 6) to the preceding side, in step S226. Thereafter, the empty rack is transported to the collection unit 13 or the specimen rearrangement unit 40 as the transportation destination. When the process step of step S225 or S226 has ended, the controller 811 ends the process of transferring the container 110 from the rack 100 to the archive rack 130.

Figure 25:
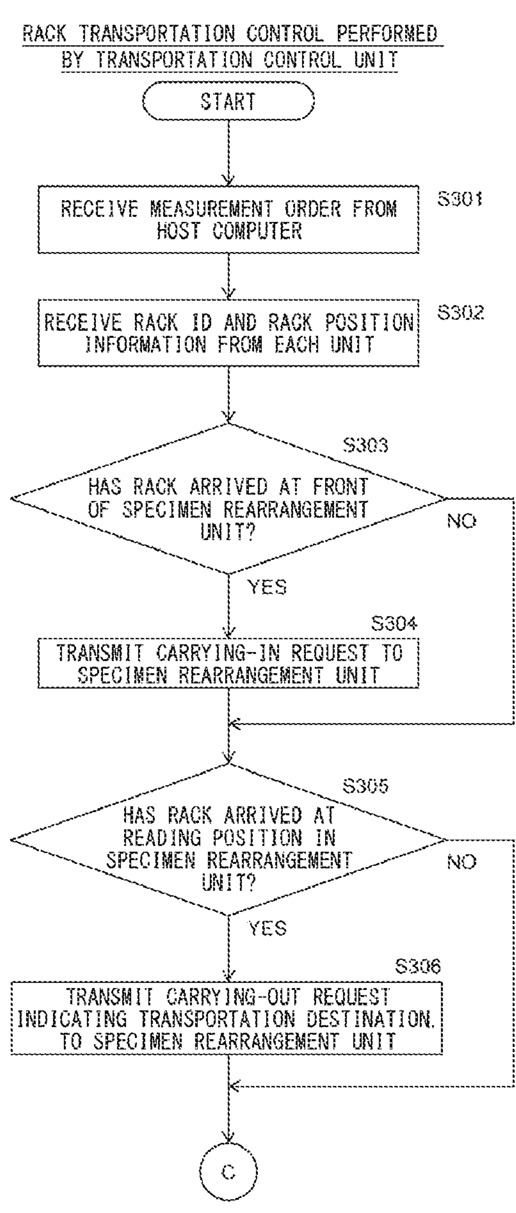
FIG. 25 is a flow chart showing control performed by the transportation control unit for transporting a rack according to the embodiment.
Figure 26:
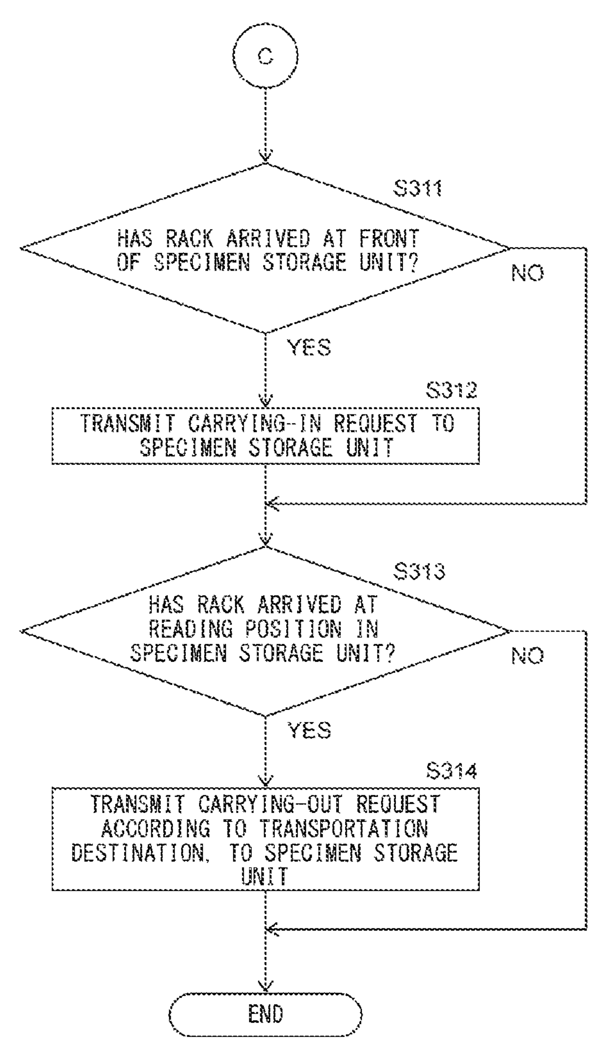
FIG. 26 is a flow chart showing control performed by the transportation control unit for transporting a rack, according to the embodiment.

FIGS. 25 and 26 are each a flow chart showing control performed by the transportation control unit 80 for transporting the rack 100. The process in FIGS. 25 and 26 is repeatedly performed by the controller 821 of the transportation control unit 80.

As shown in FIG. 25, in step S301, the controller 821 of the transportation control unit 80 receives, from the host computer 2 (see FIG. 1), a measurement order for each specimen, that is, information indicating a process to be performed and a unit (the measurement units 32, the smear sample preparation unit 52, or the analyzer 62) that performs the process, for each container 110. The controller 821 determines a transportation destination of the rack 100 holding the containers 110, according to the received measurement order.

In step S302, from the feeding unit 11, the supply unit 20, the two transportation units 31, the transportation unit 12, the specimen rearrangement unit 40, the transportation units 51, 61, the specimen storage unit 70, and the collection unit 13, the controller 821 receives the rack ID read from a reading section set in each unit and position information of the rack 100 read by the sensor set in each unit. Thus, the controller 821 obtains the position of the rack 100 in the specimen testing system 1.

Subsequently, when the controller 821 is notified of arrival of the rack 100 at the carrying-out position of each unit, the controller 821 operates to transmit a carrying-in request to a unit to which the rack 100 is to be carried in, and transmit a carrying-out request indicating the transportation destination, to the unit from which the rack 100 is to be carried out. In steps S303 to S306 in FIG. 25 and steps S311 to S314 in FIG. 26, a process performed when the units on the carrying-in side and the carrying-out side are the specimen rearrangement unit 40 and the specimen storage unit 70, respectively, is shown as an example.

In step S303, the controller 821 determines whether or not the rack 100 has arrived at a position in front of the specimen rearrangement unit 40, that is, a carrying-out position on the rear side of the transportation unit 12. When the rack 100 has arrived at the position in front of the specimen rearrangement unit 40, the controller 821 operates to transmit a carrying-in request to the specimen rearrangement unit 40 in step S304. Thus, the controller 801 of the specimen rearrangement unit 40 receives the carrying-in request, and the determination in step S101 in FIG. 20 becomes YES.

In step S305, the controller 821 determines whether or not the rack 100 has arrived at a reading position of the reader 43 of the specimen rearrangement unit 40. In step S122 in FIG. 21, the rack ID is transmitted by the controller 801 of the specimen rearrangement unit 40, and the rack ID is received by the controller 821 of the transportation control unit 80, whereby the determination in step S305 becomes YES. When the rack 100 has arrived at the reading position of the reader 43, the controller 821 operates to transmit, to the specimen rearrangement unit 40, a carrying-out request indicating the transportation destination of the rack 100, in step S306. Thus, the controller 801 of the specimen rearrangement unit 40 receives the carrying-out request, and the determination in step S123 in FIG. 21 becomes YES.

Subsequently, the process proceeds to step S311 in FIG. 26.

As shown in FIG. 26, in step S311, the controller 821 determines whether or not the rack 100 has arrived at a position in front of the specimen storage unit 70, that is, a carrying-out position at the left end of the transportation unit 61. When the rack 100 has arrived at the position in front of the specimen storage unit 70, the controller 821 operates to transmit a carrying-in request to the specimen storage unit 70 in step S312. Thus, the controller 811 of the specimen storage unit 70 receives the carrying-in request, and the determination in step S201 in FIG. 23 becomes YES.

In step S313, the controller 821 determines whether or not the rack 100 has arrived at a reading position of the reader 73 of the specimen storage unit 70. In step S222 in FIG. 24, the rack ID is transmitted by the controller 811 of the specimen storage unit 70, and the rack ID is received by the controller 821 of the transportation control unit 80, whereby the determination in step S313 becomes YES. When the rack 100 has arrived at the reading position of the reader 73, the controller 821 operates to transmit, to the specimen storage unit 70, a carrying-out request indicating the transportation destination of the rack 100, in step S314. Thus, the controller 811 of the specimen storage unit 70 receives the carrying-out request, and the determination in step S223 in FIG. 24 becomes YES.

Also for the other units (the feeding unit 11, the supply unit 20, the transportation units 31, the transportation unit 12, the transportation units 51, 61, and the collection unit 13), as in steps S303 to S306 in FIG. 25 and steps S311 to S314 in FIG. 26, the controller 821 operates to transmit a carrying-in request and a carrying-out request to corresponding units according to arrival of the rack 100. Thus, the rack 100 is transported to a unit as the transportation destination.

FIG. 27 is a flow chart showing control performed by the transportation control unit 80 for transporting the rack 100 from the specimen rearrangement unit 40 to the specimen storage unit 70. The process in FIG. 27 is repeatedly performed for each rack 100 by the controller 821 of the transportation control unit 80.

In step S401, the controller 821 of the transportation control unit 80 determines whether or not the rack 100 has been carried out from the specimen rearrangement unit 40 to the transportation unit 51 according to the result, of detecting the rack 100, received from the transportation unit 51 disposed adjacently to the left of the specimen rearrangement unit 40.

When the rack 100 has been carried out to the transportation unit 51, the controller 821 determines in step S402 whether or not the rack 100 is required to be transported to the smear sample preparation unit 52, according to the measurement order received from the host computer 2 in step S301. In a case where the rack 100 is required to be transported to the smear sample preparation unit 52, the controller 821 controls the transportation unit 51 so as to transport the rack 100 to the front of the smear sample preparation unit 52 in step S403. Subsequently, in step S404, the controller 821 determines whether or not the rack 100 is required to be transported to the analyzer 62 according to the measurement order received from the host computer 2 in step S301. In a case where the rack 100 is required to be transported to the analyzer 62, the controller 821 controls the transportation unit 61 so as to transport the rack 100 to the front of the analyzer 62 in step S405.

In step S406, the controller 821 controls the transportation units 51, 61 so as to transport the rack 100 to the specimen storage unit 70. Thus, the rack 100 is transported from the specimen rearrangement unit 40 to the specimen storage unit 70.

Figure 28:
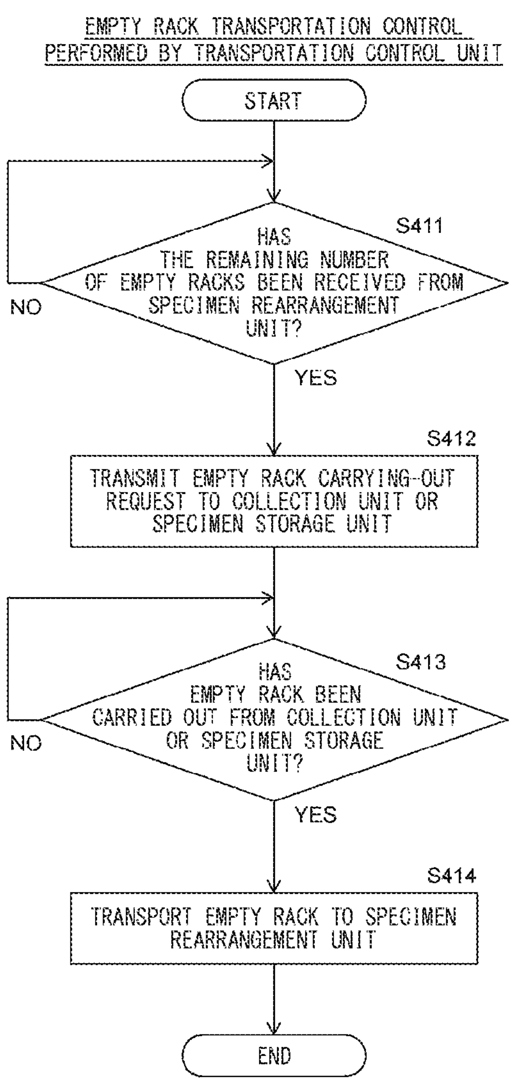
FIG. 28 is a flow chart showing control performed by the transportation control unit for transporting an empty rack, according to the embodiment.

FIG. 28 is a flow chart showing control performed by the transportation control unit 80 for transporting an empty rack. The process in FIG. 28 is repeatedly performed for each rack 100 by the controller 821 of the transportation control unit 80.

In step S411, the controller 821 of the transportation control unit 80 determines whether or not the remaining number of empty racks has been received from the specimen rearrangement unit 40. As shown in steps S137 to S139 in FIG. 22, in a case where the remaining number of the empty racks is less than or equal to Nth, the control unit 801 of the specimen rearrangement unit 40 operates to transmit the remaining number of the empty racks to the transportation control unit 80. Upon receiving the remaining number of the empty racks from the specimen rearrangement unit 40, the controller 821 of the transportation control unit 80 operates to transmit a request for carrying out empty racks, to the collection unit 13 or the specimen storage unit 70, so as to transport the empty racks to the specimen rearrangement unit 40, in step S412.

Specifically, in a case where an empty rack is in the collection unit 13, the controller 821 operates to transmit a request for carrying out the empty rack, to the collection unit 13. Upon receiving the request for carrying out the empty rack, the collection unit 13 carries out the reserved empty rack in the right direction. Meanwhile, in a case where no empty rack is in the collection unit 13, the controller 821 sets the specimen rearrangement unit 40 as the transportation destination of the empty rack that occurs in the specimen storage unit 70, and operates to transmit a request for carrying out the empty rack, to the specimen storage unit 70, so as to carry out the empty rack to the preceding side (right direction) toward the specimen rearrangement unit 40. Upon receiving the request for carrying out the empty rack, the specimen storage unit 70 carries out the empty rack in the right direction.

In step S413, the controller 821 determines whether or not the empty rack has been carried out from the collection unit 13 or the specimen storage unit 70. Specifically, in a case where the carrying-out request is transmitted to the collection unit 13 in step S412, the controller 821 determines whether or not the empty rack has been carried out from the collection unit 13, according to the result, of detecting the rack 100, received from the specimen storage unit 70 disposed adjacently to the right of the collection unit 13. Meanwhile, in a case where the carrying-out request is transmitted to the specimen storage unit 70 in step S412, the controller 821 determines whether or not the empty rack has been carried out from the specimen storage unit 70, according to the result, of detecting the rack 100, received from the transportation unit 61 disposed adjacently to the right of the specimen storage unit 70.

When the empty rack has been carried out from the collection unit 13 or the specimen storage unit 70, the controller 821 operates to transport the empty rack to the carrying-in position P11 of the specimen rearrangement unit 40 in step S414. Specifically, in a case where the empty rack has been carried out from the collection unit 13, the controller 821 controls the specimen storage unit 70, the transportation units 61, 51, the specimen rearrangement unit 40, and the transportation unit 12 so as to transport the empty rack to the specimen rearrangement unit 40. Meanwhile, in a case where the empty rack has been carried out from the specimen storage unit 70, the controller 821 controls the transportation units 61, 51, the specimen rearrangement unit 40, and the transportation unit 12 so as to transport the empty rack to the specimen rearrangement unit 40.

In steps S138, S139 in FIG. 22, in a case where the remaining number of empty racks is less than or equal to the predetermined number Nth, the remaining number of the empty racks is transmitted to the transportation control unit 80. However, when the remaining number of empty racks is detected in step S137, the remaining number of the empty racks may be always transmitted to the transportation control unit 80. In this case, upon receiving the remaining number of the empty racks in step S411 in FIG. 28, the controller 821 of the transportation control unit 80 determines whether or not the received remaining number of the empty racks is less than or equal to Nth, and, in a case where the remaining number of the empty racks is less than or equal to Nth, the process may proceed to step S412.

Figure 29:
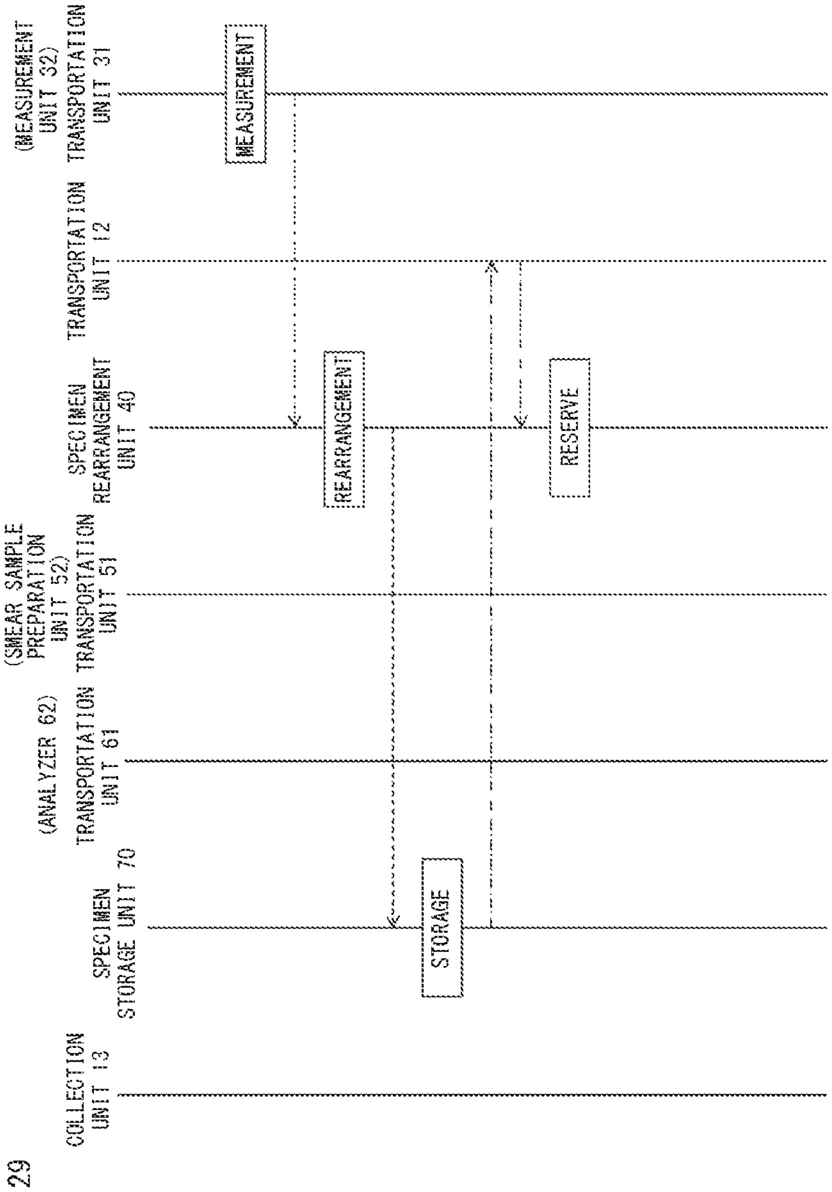
FIG. 29 is a time chart showing an example of transporting a rack, according to the embodiment.
Figure 30:
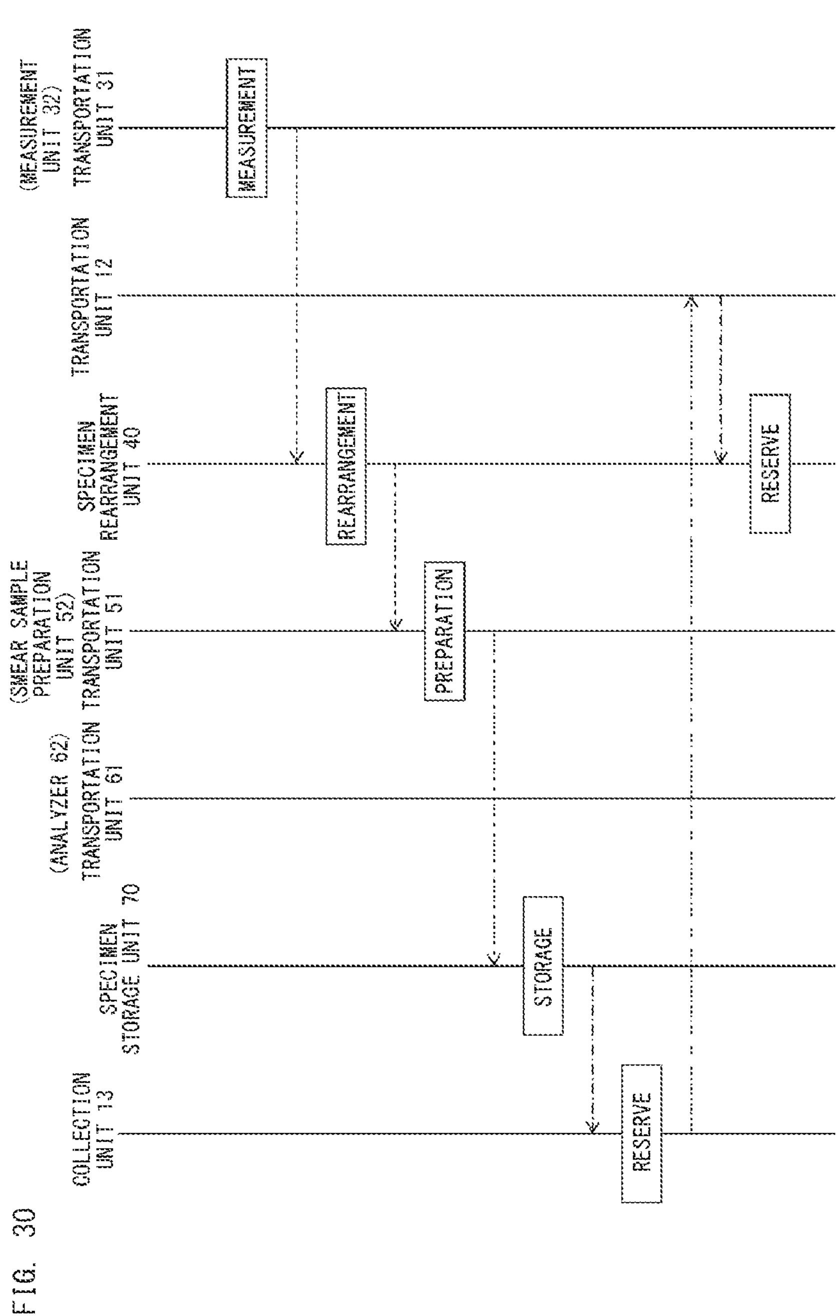
FIG. 30 is a time chart showing an example of transporting a rack, according to the embodiment.

FIGS. 29 and 30 each show a time chart for an example of transporting the rack 100. In FIGS. 29 and 30, a broken-line arrow indicates that the rack 100 holding the containers 110 is transported. An arrow represented by an alternate long and short dash line indicates that an empty rack that does not hold the containers 110 is transported.

With reference to FIG. 29, the rack 100 is transported to the front of the measurement unit 32 by the transportation unit 31, whereby a specimen in the container 110 held in the rack 100 is measured by the measurement unit 32. When the measurement by the measurement unit 32 has ended, the rack 100 is transported to the specimen rearrangement unit 40 by the transportation units 31, 12, and the containers 110 are rearranged by the specimen rearrangement unit 40. The rack 100 holding the containers 110 that are left in the rack 100 since the containers 100 are not taken by the specimen rearrangement unit 40, that is, the rack 100 holding only the containers 110 that are not required to be transported to the smear sample preparation unit 52 and the analyzer 62 on the succeeding side, is transported to the specimen storage unit 70 by the specimen rearrangement unit 40 and the transportation units 51, 61.

The containers 110 are stored in the specimen storage unit 70, and the rack 100 becomes an empty rack. At this time, when the number of the empty racks is less than or equal to the predetermined number Nth in the rack reserving section 361 and the rack setting section 362 of the specimen rearrangement unit 40, the empty rack that occurs in the specimen storage unit 70 is transported to the specimen rearrangement unit 40 by the specimen storage unit 70, the transportation units 61, 51, the specimen rearrangement unit 40, and the transportation unit 12 without passing through the collection unit 13. The empty rack transported to the specimen rearrangement unit 40 is reserved in the rack reserving section 361.

With reference to FIG. 30, when the measurement by the measurement unit 32 has ended, the rack 100 is transported to the specimen rearrangement unit 40 by the transportation units 31, 12, and the containers 110 are rearranged by the specimen rearrangement unit 40. The rack 100 having the containers 110 transferred from the buffer rack 120 by the specimen rearrangement unit 40, for example, the rack 100 holding the containers 110 that are required to be transported to the smear sample preparation unit 52 on the succeeding side, is transported to the front of the smear sample preparation unit 52 by the specimen rearrangement unit 40 and the transportation unit 51, and a smear sample is prepared from a specimen in each container 110 held in the rack 100. When the preparation of the smear sample has ended, the rack 100 is transported to the specimen storage unit 70 by the transportation units 51, 61.

The containers 110 are stored in the specimen storage unit 70, and the rack 100 becomes an empty rack. At this time, in a case where the number of empty racks is greater than the predetermined number Nth in the rack reserving section 361 and the rack setting section 362 of the specimen rearrangement unit 40, the empty rack that occurs in the specimen storage unit 70 is transported to the collection unit 13 by the specimen storage unit 70, and reserved in the collection unit 13. Thereafter, when the number of empty racks becomes less than or equal to the predetermined number Nth in the rack reserving section 361 and the rack setting section 362 of the specimen rearrangement unit 40, the empty rack reserved in the collection unit 13 is transmitted through the specimen storage unit 70 to the specimen rearrangement unit 40 by the collection unit 13, the specimen storage unit 70, the transportation units 61, 51, the specimen rearrangement unit 40, and the transportation unit 12. The empty rack transported to the specimen rearrangement unit 40 is reserved in the rack reserving section 361, Effect of the Embodiment The specimen rearrangement unit 40 transfers the container 110 (specimen container) held in the rack 100 (first rack) to another rack 100 (second rack). The specimen storage unit 70 transfers the container 110 (specimen container) that has been processed by the smear sample preparation unit 52 and the analyzer 62 (specimen processing unit) from the rack 100 (second rack) to the archive rack 130 (specimen container storage instrument) for storage. The transportation units 51, 61 transport the rack 100 among the specimen rearrangement unit 40, the smear sample preparation unit 52 and the analyzer 62 (specimen processing unit), and the specimen storage unit 70. The transportation control unit 80 controls the transportation units 51, 61 to control bidirectional transportation of the rack 100 (second rack) between the specimen rearrangement unit 40 and the specimen storage unit 70.

In this configuration, the rack 100 is bidirectionally transported between the specimen rearrangement unit 40 and the specimen storage unit 70. Thus, for example, the rack 100 (second rack) having transferred containers 110 can be transported from the specimen rearrangement unit 40 to the specimen storage unit 70, and, furthermore, the rack 100 (second rack) that has become empty since all of the containers 110 have been transferred to the archive rack 130 in the specimen storage unit 70 can be transported from the specimen storage unit 70 to the specimen rearrangement unit 40. Therefore, an operation of an operator for refilling the specimen rearrangement unit 40 with empty racks can be reduced.

Furthermore, for example, the container 110 stored in the specimen storage unit 70 is assumed to be transported again to the measurement units 32, the smear sample preparation unit 52 and the analyzer 62 (specimen processing unit), and the specimen rearrangement unit 40 due to temporary failure or abnormality in the specimen testing system 1. In this case, an operator needs to take out the container 110 from the specimen storage unit 70, set the container 110 in the rack 100, and cause the rack 100 to pass through the rack transportation path 1*a*. Such an operation is also bothersome for an operator and causes reduction of process efficiency of the specimen testing system 1.

Also in such a case, in the above-described configuration, empty racks stored in the rack reserving section 361 and the rack setting section 362 of the specimen rearrangement unit 40 or empty racks that occur through rearrangement of the containers 110 in the specimen rearrangement unit 40 are transported from the specimen rearrangement unit 40 to the specimen storage unit 70, whereby the container 110 can be transferred from the archive rack 130 in the specimen storage unit 70 to the transported empty rack. Furthermore, the rack 100 can be transported from the specimen storage unit 70 to the measurement units 32, the smear sample preparation unit 52 and the analyzer 62 (specimen processing unit), and the specimen rearrangement unit 40. Thus, an operation of an operator for taking out a predetermined container 110 from the specimen storage unit 70, setting the container 110 in the rack 100, and causing the rack 100 to pass through the rack transportation path 1*a* can be reduced. Therefore, process efficiency of the specimen testing system 1 can be enhanced. Furthermore, a specimen stored in the specimen storage unit 70 can be efficiently retested.

The transportation control unit 80 receives, through the screen 900 in FIG. 16, setting of arrangement of the smear sample preparation unit 52 and the analyzer 62 (specimen processing unit), the specimen rearrangement unit 40, and the specimen storage unit 70, generates arrangement information according to the received arrangement, and controls transportation of the rack 100 (second rack) based on the arrangement information. In this configuration, an operator is allowed to discretionarily set arrangement of the smear sample preparation unit 52 and the analyzer 62 (specimen processing unit), the specimen rearrangement unit 40, and the specimen storage unit 70, and the transportation control unit 80 can control bidirectional transportation of the rack 100 between the specimen rearrangement unit 40 and the specimen storage unit 70 according to the arrangement having been set by the operator.

The transportation control unit 80 is configured to be able to communicate with the specimen rearrangement unit 40 and the specimen storage unit 70, and controls bidirectional transportation of the rack 100 (second rack) between the specimen rearrangement unit 40 and the specimen storage unit 70 according to the information received from the specimen rearrangement unit 40 and the specimen storage unit 70. In this configuration, bidirectional transportation of a predetermined rack 100 can be smoothly controlled as appropriate according to the information (for example, the rack ID read by the reader 43, 73 or detection information from the sensor in each unit) from the specimen rearrangement unit 40 and the specimen storage unit 70.

The transportation control unit 80 performs control so as to transport the rack 100 (second rack) holding the containers 110 (specimen containers) from the specimen rearrangement unit 40 to the specimen storage unit 70 as shown in FIG. 27, and transport, to the specimen rearrangement unit 40, the rack 100 (second rack) that has become empty since the containers 110 (specimen containers) have been transferred to the archive rack 130 (specimen container storage instrument) by the specimen storage unit 70 as shown in FIG. 28. In this configuration, the number of times an operator sets empty racks in the specimen testing system 1 (for example, the rack setting section 362) due to the insufficient number of empty racks in the specimen rearrangement unit 40, can be reduced. Therefore, an operation of the operator can be reduced.

The transportation control unit 80 performs control so as to transport, to the specimen rearrangement unit 40, the racks 100 (second racks) that have become empty in the specimen storage unit 70, according to the remaining number of the empty racks (the number of stored empty racks) in the specimen rearrangement unit 40. In this configuration, exhaustion of empty racks in the specimen rearrangement unit 40 can be inhibited, and the process efficiency of the specimen rearrangement unit 40 can be maintained high.

Specifically, when the number of the stored empty racks is determined to be less than the predetermined number Nth in step S138 in FIG. 22, the specimen rearrangement unit 40 transmits the remaining number of the empty racks (request for transporting empty racks) to the transportation control unit 80. The transportation control unit 80 performs control so as to transport the rack 100 (second rack) that has become empty in the specimen storage unit 70, to the specimen rearrangement unit 40, as shown in FIG. 28, based on the remaining number (transportation request), of the empty racks, received from the specimen rearrangement unit 40. Thus, an empty rack can be smoothly transported to the specimen rearrangement unit 40.

The collection unit 13 (empty rack collection unit) collects the racks 100 that have become empty in the specimen storage unit 70. As indicted by a thick broken-line arrow in FIG. 19, the transportation control unit 80 performs control so as to transport the rack 100 (second rack) that has become empty in the specimen storage unit 70 from the specimen storage unit 70 to the collection unit 13 (empty rack collection unit), and transport the empty rack from the collection unit 13 (empty rack collection unit) to the specimen rearrangement unit 40. In this configuration, the empty rack stored in the collection unit 13 can be transported to the specimen rearrangement unit 40, and the number of times an operator sets empty racks in the specimen testing system 1 (for example, the rack setting section 362) can be further reduced.

The rack 100 (first rack) that holds the containers 110 (specimen containers) having not been rearranged into the rack 100 (second rack) is also transported by the transportation units 51, 61 among the specimen rearrangement unit 40, the smear sample preparation unit 52 and the analyzer 62 (specimen processing unit), and the specimen storage unit 70. The transportation control unit 80 performs control so as to bidirectionally transport the above-described rack 100 (first rack) between the specimen rearrangement unit 40 and the specimen storage unit 70. Thus, the rack 100 (first rack) can be transported from the specimen rearrangement unit 40 to the specimen storage unit 70, and, furthermore, the rack 100 (first rack) that has become empty since all of the containers 110 have been transferred to the archive rack 130 in the specimen storage unit 70, can be transported from the specimen storage unit 70 to the specimen rearrangement unit 40. Therefore, an operation of an operator for refilling the specimen rearrangement unit 40 with empty racks can be reduced.

The transportation control unit 80 operates to transport the rack 100 (first rack) that holds the containers 110 (specimen containers) having not been rearranged into the rack 100 (second rack), from the specimen rearrangement unit 40, to the specimen storage unit 70. The transportation control unit 80 performs control so as to transport, to the specimen rearrangement unit 40, the rack 100 (first rack) that has become empty since the specimen storage unit 70 has transferred the containers 110 (specimen containers) to the archive rack 130 (specimen container storage instrument). Also in this case, exhaustion of empty racks in the specimen rearrangement unit 40 can be inhibited, and process efficiency of the specimen rearrangement unit 40 can be maintained high.

As shown in FIGS. 29 and 30, the transportation units 51, 61 transport the rack 100 (second rack) among the smear sample preparation unit 52 and the analyzer 62 (specimen processing unit), the specimen rearrangement unit 40, and the specimen storage unit 70. The rack transportation system 1*b* (see FIG. 1) includes the transportation units 51, 61 and the transportation control unit 80, and, as shown in FIG. 19, performs control so as to bidirectionally transport the rack 100 (second rack) between the specimen rearrangement unit 40 and the specimen storage unit 70. The rack transportation system 1*b* can reduce an operation of an operator for refilling the specimen rearrangement unit 40 with empty racks, similarly to the specimen testing system 1.

<Modifications>

In the specimen testing system 1 in FIG. 1, the specimen storage unit 70, the collection unit 13, the feeding unit 11, the supply unit 20, the two transportation units 31, the transportation unit 12, the specimen rearrangement unit 40, and the transportation units 51, 61 may be aligned in line toward the left direction in order, respectively, so as to be adjacent to each other.

Figure 31:
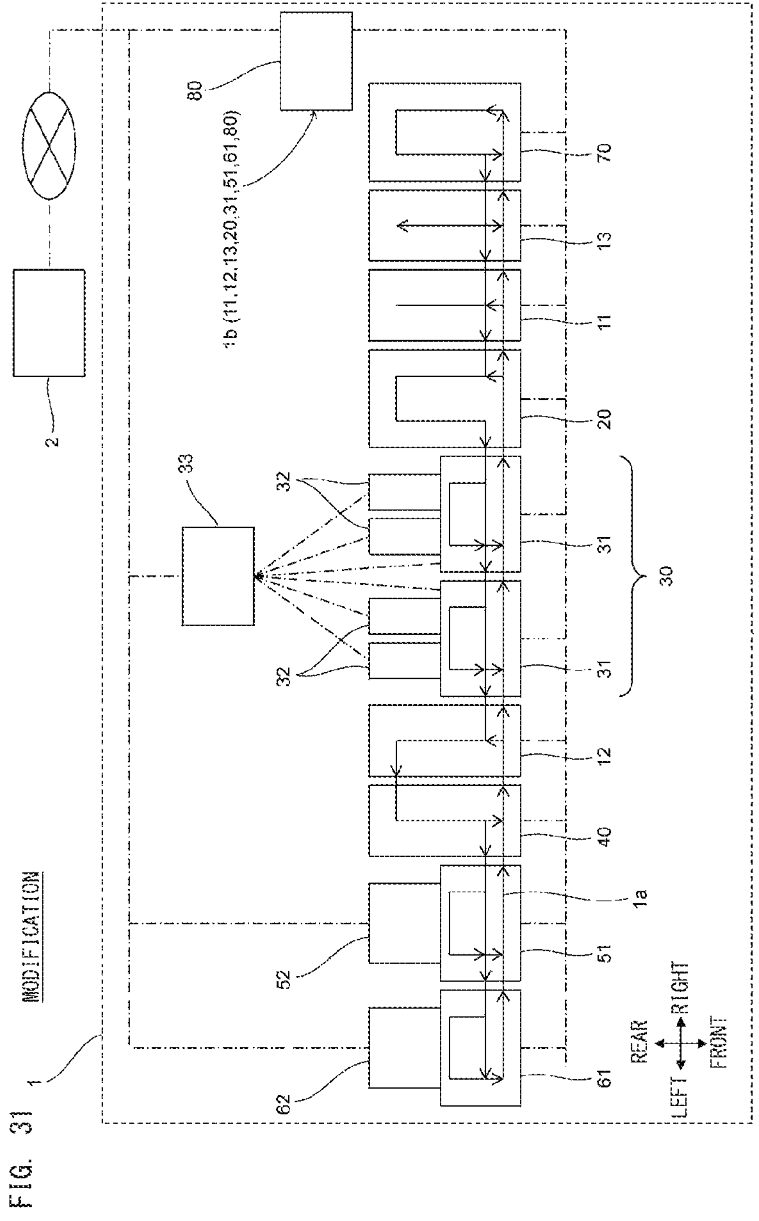
FIG. 31 schematically illustrates a configuration of a specimen testing system according to a modification.

FIG. 31 schematically illustrates a configuration of the specimen testing system 1 according to a modification.

The feeding unit 11, the transportation unit 12, the collection unit 13, the supply unit 20, and the transportation units 31, 51, 61 transport the rack 100 among the measurement units 32, the smear sample preparation unit 52, the analyzer 62, the specimen rearrangement unit 40, and the specimen storage unit 70. In this modification, the rack transportation system 1*b* includes the feeding unit 11, the transportation unit 12, the collection unit 13, the supply unit 20, the transportation units 31, 51, 61, and the transportation control unit 80.

Also in this modification, as in FIG. 1, the transportation units 12, 31 transport the rack 100 between the measurement units 32 and the specimen rearrangement unit 40, and the transportation units 51, 61 transport the rack 100 between the smear sample preparation unit 52 and the analyzer 62 (specimen processing unit), and the specimen rearrangement unit 40. Meanwhile, the transportation units 31, the supply unit 20, the feeding unit 11, and the collection unit 13 (transportation unit) transport the rack 100 between the measurement units 32 and the specimen storage unit 70. Furthermore, the transportation units 51, 61, the specimen rearrangement unit 40, the transportation unit 12, the transportation units 31, the supply unit 20, the feeding unit 11, and the collection unit 13 (transportation unit) transport the rack 100 between the smear sample preparation unit 52 and the analyzer 62 (specimen processing unit), and the specimen storage unit 70. In this configuration, as in the embodiment, the rack 100 can be smoothly transported.

The collection unit 13, the feeding unit 11, the supply unit 20, the two transportation units 31, the transportation unit 12, and the transportation units 51, 61 (transportation unit) transport the rack 100 between the specimen rearrangement unit 40 and the specimen storage unit 70. A path in this case will be described with reference to FIG. 32.

Figure 32:
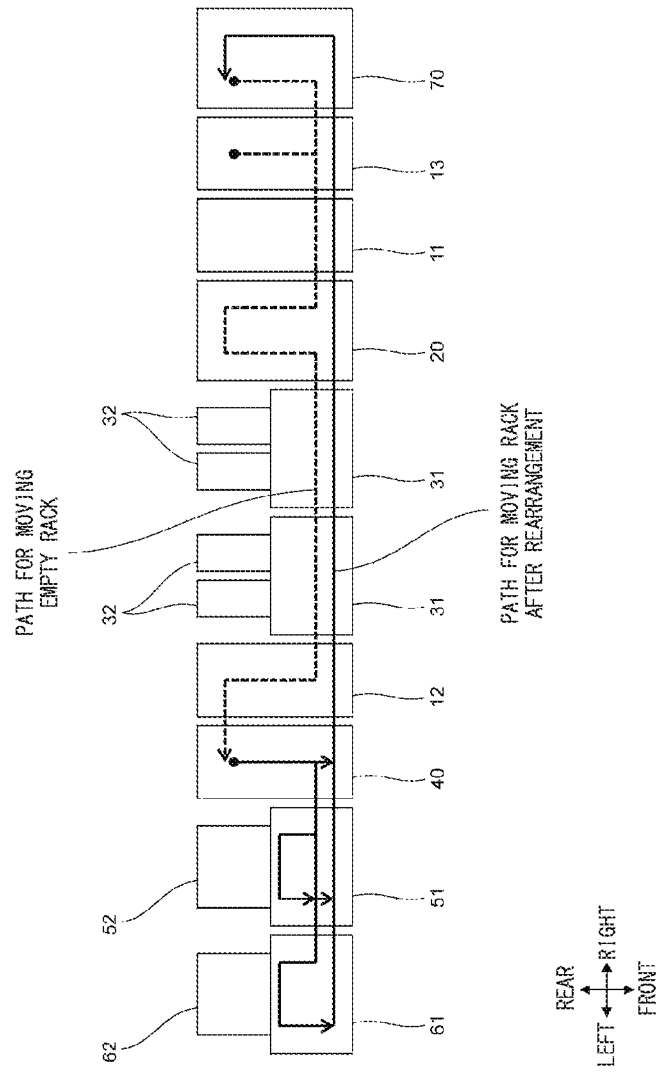
FIG. 32 schematically illustrates a path for transporting a rack between the specimen rearrangement unit and the specimen storage unit, according to the modification.

FIG. 32 schematically illustrates a path for transporting the rack 100 between the specimen rearrangement unit 40 and the specimen storage unit 70 according to the modification. The rack 100 is transported along the rack transportation path 1*a* (see FIG. 31) of each unit, and the transportation of the rack 100 is controlled by the transportation control unit 80.

A thick solid line arrow indicates a path for transporting the rack 100 for which rearrangement has ended in the specimen rearrangement unit 40. The rack 100 for which rearrangement has been performed in the second tier of the specimen rearrangement unit 40, and the rack 100 that is carried out as it is since rearrangement is not required to be performed by the specimen rearrangement unit 40 are transported as appropriate by the transportation units 51, 61, and are thereafter transported to the specimen storage unit 70 by the specimen rearrangement unit 40, the transportation unit 12, the two transportation units 31, the supply unit 20, the feeding unit 11, and the collection unit 13. All of the containers 110 on the rack 100 are stored in the specimen storage unit 70, and the rack 100 becomes an empty rack.

The empty rack that occurs in the specimen storage unit 70 is transported to the collection unit 13 or the specimen rearrangement unit 40.

A thick broken-line arrow indicates a path for transporting the rack 100 carried out from the specimen storage unit 70 and the collection unit 13. In a case where, when the empty rack is carried out from the specimen storage unit 70, the number of the racks 100 reserved in the rack reserving section 361 and the rack setting section 362 of the specimen rearrangement unit 40 is less than or equal to the predetermined number, the empty rack is carried out leftward from the specimen storage unit 70, and is transported to the specimen rearrangement unit 40 by the collection unit 13, the feeding unit 11, the supply unit 20, the two transportation units 31, and the transportation unit 12.

Meanwhile, in a case where, when the empty rack is carried out from the specimen storage unit 70, the number of the racks 100 reserved in the rack reserving section 361 and the rack setting section 362 of the specimen rearrangement unit 40 is greater than the predetermined number, the empty rack is carried out leftward from the specimen storage unit 70 and reserved in the collection unit 13. Thereafter, when the number of the racks 100 reserved in the rack reserving section 361 and the rack setting section 362 of the specimen rearrangement unit 40 becomes less than or equal to the predetermined number, the empty rack in the collection unit 13 is transported to the specimen rearrangement unit 40 by the feeding unit 11, the supply unit 20, the two transportation units 31, and the transportation unit 12 without passing through the specimen storage unit 70.

Figure 33:
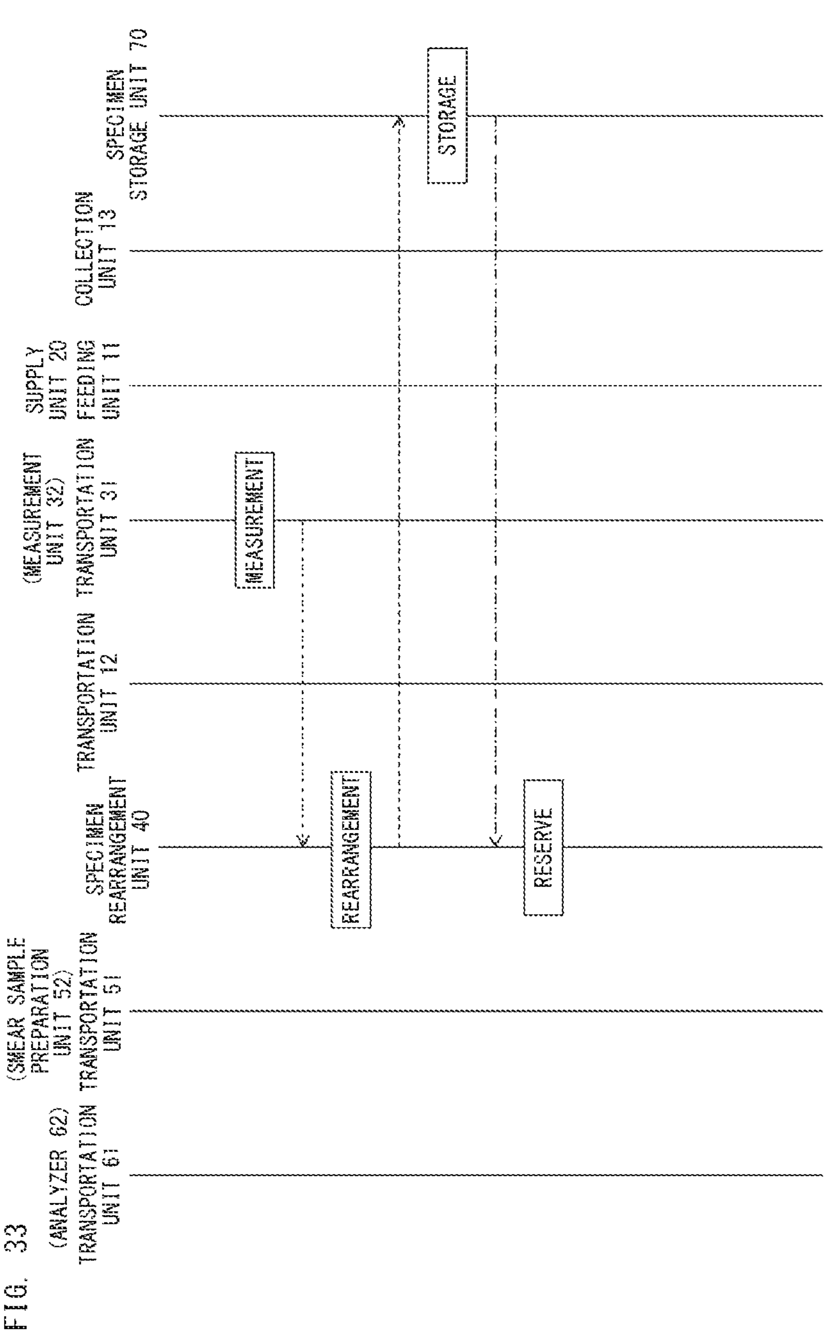
FIG. 33 is a time chart showing an example of transporting a rack, according to the modification.
Figure 34:
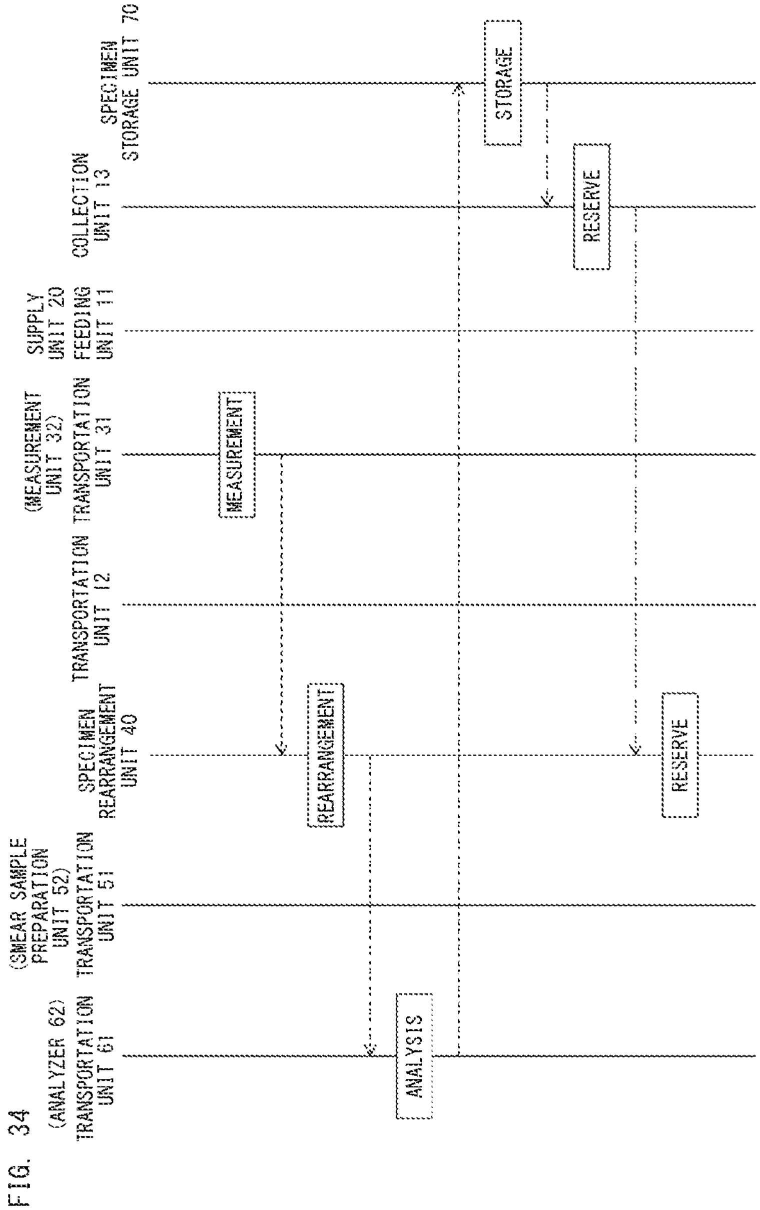
FIG. 34 is a time chart showing an example of transporting a rack, according to the modification.

FIGS. 33 and 34 each show a time chart for an example of transporting the rack 100 according to the modification. In FIGS. 33 and 34, a broken-line arrow indicates that the rack 100 holding the containers 110 is transported, and an arrow indicated by an alternate long and short dash line indicates that an empty rack that does not hold the containers 110 is transported.

With reference to FIG. 33, when the measurement by the measurement unit 32 has ended, the rack 100 is transported to the specimen rearrangement unit 40 by the transportation units 31, 12, and the containers 110 are rearranged by the specimen rearrangement unit 40. The rack 100 holding the containers 110 that are left since the containers 110 are not taken by the specimen rearrangement unit 40, that is, the rack 100 holding only the containers 110 that are not required to be transported to the smear sample preparation unit 52 and the analyzer 62 on the succeeding side is transported to the specimen storage unit 70 by the specimen rearrangement unit 40, the transportation units 12, 31, the supply unit 20, the feeding unit 11, and the collection unit 13.

The containers 110 are stored in the specimen storage unit 70, and the rack 100 becomes an empty rack. At this time, when the number of the empty racks is less than or equal to the predetermined number Nth in the rack reserving section 361 and the rack setting section 362 of the specimen rearrangement unit 40, the empty rack that occurs in the specimen storage unit 70 is not reserved in the collection unit 13 and is transported to the specimen rearrangement unit 40 by the collection unit 13, the feeding unit 11, the supply unit 20, and the transportation units 31, 12. The empty rack transported to the specimen rearrangement unit 40 is reserved in the rack reserving section 361.

With reference to FIG. 34, when the measurement by the measurement unit 32 has ended, the rack 100 is transported to the specimen rearrangement unit 40 by the transportation units 31, 12, and the containers 110 are rearranged by the specimen rearrangement unit 40. The rack 100 having the containers 110 transferred from the buffer rack 120 in the specimen rearrangement unit 40, for example, the rack 100 holding the containers 110 that are required to be transported to the analyzer 62 on the succeeding side, is transported to the front of the analyzer 62 by the specimen rearrangement unit 40 and the transportation units 51, 61, and specimens in the containers 110 held in the rack 100 are analyzed by the analyzer 62. When the analysis by the analyzer 62 has ended, the rack 100 is transported to the specimen storage unit 70 by the transportation units 61, 51, the specimen rearrangement unit 40, the transportation units 12, 31, the supply unit 20, the feeding unit 11, and the collection unit 13.

The containers 110 are stored in the specimen storage unit 70, and the rack 100 becomes an empty rack. At this time, when the number of empty racks is greater than the predetermined number Nth in the rack reserving section 361 and the rack setting section 362 of the specimen rearrangement unit 40, the empty rack that occurs in the specimen storage unit 70 is transported to the collection unit 13 by the specimen storage unit 70, and reserved in the collection unit 13. Thereafter, when the number of empty racks becomes less than or equal to the predetermined number Nth in the rack reserving section 361 and the rack setting section 362 of the specimen rearrangement unit 40, the empty rack reserved in the collection unit 13 is transported to the specimen rearrangement unit 40 by the collection unit 13, the feeding unit 11, the supply unit 20, and the transportation units 31, 12 without passing through the specimen storage unit 70. The empty rack transported to the specimen rearrangement unit 40 is reserved in the rack reserving section 361.

Thus, also in this modification, the collection unit 13, the feeding unit 11, the supply unit 20, and the transportation units 31, 12, 51, 61 transport the rack 100 among the smear sample preparation unit 52 and the analyzer 62 (specimen processing unit), the specimen rearrangement unit 40, and the specimen storage unit 70. In this configuration, the rack 100 can be smoothly transported among the specimen processing unit, the specimen rearrangement unit 40, and the specimen storage unit 70.

<Other Modifications>

In the above-described embodiment, the number of the specimen rearrangement units 40 and the number of the specimen storage units 70 are each one in the specimen testing system 1. However, instead of this configuration, a plurality of the specimen rearrangement units 40 and a plurality of the specimen storage units 70 may be disposed. Also in this case, the transportation control unit 80 performs control so as to bidirectionally transport the rack 100 among the measurement units 32, the smear sample preparation unit 52, the analyzer 62, the plurality of the specimen rearrangement units 40, and the plurality of the specimen storage units 70.

The arrangement of the units in the specimen testing system 1 is not limited to the arrangements shown in FIGS. 1 and 31

In the above-described embodiment, the second tier of the specimen rearrangement unit 40 is disposed above the first tier. However, the second tier may be disposed below the first tier.

In the specimen rearrangement unit 40, in a case where the width, in the front-rear direction, of the intermediate path 304 is set so as to reserve the rack 100, the rack 100 from which the rack ID and the specimen IDs have been read in the carrying-in path 301 may be reserved in the intermediate path 304. Similarly, in the specimen storage unit 70, in a case where the width, in the front-rear direction, of the intermediate path 424 is set so as to reserve the rack 100, the rack 100 from which the rack ID and the specimen IDs have been read in the carrying-in path 421 may be reserved in the intermediate path 424. In these cases, while the rack 100 is moved upward/downward at the ascending/descending position P12, P22, the succeeding rack 100 can be caused to be in a waiting state in the intermediate path 304, 424. Therefore, the process for the succeeding rack 100 can be quickly performed, and the process efficiency can be further enhanced.

As shown in FIGS. 3 and 6, the ascending/descending mechanism 42, 72 moves the support portion 42*a*, 72*a* that supports the lower surface of the rack 100 in the up-down direction to move the rack 100 upward/downward. However, instead of this configuration, the ascending/descending mechanism 42, 72 may move holding portions that hold the left and the right side surfaces of the rack 100 or the front and the rear side surfaces thereof in the up-down direction to move the rack 100 upward/downward.

As shown in FIG. 12, the holding members 710 and 720 approach each other and separate from each other in the left-right direction to hold the container 110. However, instead of this configuration, the holding members 710 and 720 may approach each other and separate from each other in the front-rear direction to hold the container 110. Furthermore, instead of the holding members 710 and 720 being used, the container 110 may be held by three or more bar-like members that approach the container 110 and separate from the container 110 in a planar view.

The rack waiting regions 311, 431, the movement path 411, the rack reserving section 361, and the rack setting section 362 are each configured as a plate-member having the upper surface parallel to the horizontal plane. However, the rack waiting regions 311, 431, the movement path 411, the rack reserving section 361, and the rack setting section 362 may be configured as a conveyor belt that moves in the front-rear direction. In this case, a transportation mechanism for transporting the rack 100 on the rack waiting regions 311, 431, the movement path 411, the rack reserving section 361, and the rack setting section 362 includes a motor for driving the conveyor belt.

As shown in FIGS. 4 and 7, the container 110 is transferred at the ascending/descending position P15 in the second tier in the specimen rearrangement unit 40, and at the ascending/descending position P25 in the second tier in the specimen storage unit 70. However, instead of this configuration, the container 110 may be transferred at another position, in the second tier, different from the ascending/descending position P15, P25.

In the above-described embodiment, the transportation control unit 80 performs control so as to bidirectionally transport the first and the second racks between the specimen rearrangement unit 40 and the specimen storage unit 70. However, the control may be performed so as to bidirectionally transport only the second racks between the specimen rearrangement unit 40 and the specimen storage unit 70. For example, in the specimen rearrangement unit 40, the container 110 containing a specimen that is required to be processed by the succeeding specimen processing unit is transferred from the first rack to the second rack, and the container 110 containing a specimen that is not required to be processed by the succeeding specimen processing unit is transferred to another second rack, and the transportation control unit 80 may perform control so as to bidirectionally transport only the second racks between the specimen rearrangement unit 40 and the specimen storage unit 70.

Various modifications of the embodiments of the present invention can be made as appropriate, without departing from the scope of the technological idea defined by the claims.

What is claimed is:

1. A specimen testing system comprising:

a blood cell counting unit configured to count blood cells in a blood specimen in a specimen container held in a first rack, the first rack being capable of holding a plurality of specimen containers;

a specimen rearrangement unit configured to transfer at least one but not all of the specimen containers held in the first rack to a second rack which is empty, whereby the first rack holds the remaining specimen containers having not been transferred to the second rack and the second rack holds the at least one specimen container having been transferred from the first rack;

a smear sample preparation unit configured to prepare a smear sample of the blood specimen in the remaining specimen containers held in the first rack or the blood specimen in the at least one specimen container held in the second rack;

a specimen storage unit comprising:

a tray movable between inside the specimen storage unit and outside the specimen storage unit, and on which an archive rack having holes is detachably set, the archive rack being capable of holding the specimen containers in the holes, and a container transfer device configured to transfer the remaining specimen containers from the first rack and the at least one specimen container from the second rack to the archive rack on the tray positioned inside the specimen storage unit;

a transportation unit configured to transport the racks among the specimen rearrangement unit, the smear sample preparation unit, the blood cell counting unit, and the specimen storage unit; and a transportation control unit programmed to control the transportation unit, wherein the transportation control unit is programmed to control bidirectional transportation of the first and second racks between the specimen rearrangement unit and the specimen storage unit, and wherein the transportation control unit is programmed to perform control so as to transport the first rack holding the remaining specimen containers and the second rack holding the at least one specimen container from the specimen rearrangement unit to the specimen storage unit, during which one of the first rack and the second rack stops at the smear sample preparation unit to provide the blood specimen to the smear sample preparation unit and the other of the first rack and the second rack passes through the smear sample preparation unit, and transport, from the specimen storage unit to the specimen rearrangement unit, the first rack that has become empty after the specimen storage unit has transferred all of the remaining specimen containers on the first rack to the archive rack on the tray and the second rack that has become empty after the specimen storage unit has transferred all of the at least one specimen container on the second rack to the archive rack on the tray.

2. The specimen testing system of claim 1, wherein the transportation control unit is programmed to receive setting of arrangement of the specimen rearrangement unit, the smear sample preparation unit, and the specimen storage unit, generate arrangement information according to the received arrangement, and control transportation of the first and second racks based on the arrangement information.

3. The specimen testing system of claim 1, wherein the transportation control unit is programmed to be able to communicate with the specimen rearrangement unit and the specimen storage unit, and control bidirectional transportation of the first and second racks between the specimen rearrangement unit and the specimen storage unit according to information received from the specimen rearrangement unit and the specimen storage unit.

4. The specimen testing system of claim 1, wherein the transportation control unit is programmed to perform control so as to transport the first and second racks that have become empty in the specimen storage unit, to the specimen rearrangement unit, according to a number of empty racks stored in the specimen rearrangement unit.

5. The specimen testing system of claim 4, wherein the specimen rearrangement unit transmits, to the transportation control unit, a transportation request for transporting empty racks when the number of the empty racks stored is less than a predetermined number, and the transportation control unit is programmed to perform control so as to transport, to the specimen rearrangement unit, the first and second racks that have become empty in the specimen storage unit, based on the transportation request received from the specimen rearrangement unit.

6. The specimen testing system of claim 1, further comprising an empty rack collection unit configured to collect the first and second racks that have become empty in the specimen storage unit, wherein the transportation control unit is programmed to perform control so as to transport the first and second racks that have become empty in the specimen storage unit from the specimen storage unit to the empty rack collection unit, and transport the empty first and second racks from the empty rack collection unit to the specimen rearrangement unit.

7. The specimen testing system of claim 6, wherein the transportation control unit is programmed to perform control so as to transport the first and second racks that have become empty in the specimen storage unit, from the empty rack collection unit through the specimen storage unit to the specimen rearrangement unit.

8. The specimen testing system of claim 6, wherein the transportation control unit is programmed to perform control so as to transport the first and second racks that have become empty in the specimen storage unit, from the empty rack collection unit, to the specimen rearrangement unit, without causing the empty first and second racks to pass through the specimen storage unit.

* * * * *